US009584591B1

(12) United States Patent
Weel

(10) Patent No.: US 9,584,591 B1
(45) Date of Patent: Feb. 28, 2017

(54) METHOD AND DEVICE FOR SHARING A PLAYLIST AT A DEDICATED MEDIA PLAYER DEVICE

(71) Applicant: BLACK HILLS MEDIA, LLC, Wilmington, DE (US)

(72) Inventor: Martin Weel, Modjeska, CA (US)

(73) Assignee: Black Hills Media, LLC, Wilmington, DE (US)

( * ) Notice: Subject to any disclaimer, the term of this patent is extended or adjusted under 35 U.S.C. 154(b) by 170 days.

(21) Appl. No.: 14/209,296

(22) Filed: Mar. 13, 2014

Related U.S. Application Data

(60) Continuation of application No. 13/893,599, filed on May 14, 2013, now abandoned, which is a continuation of application No. 13/555,557, filed on Jul. 23, 2012, now Pat. No. 8,458,356, which is a continuation of application No. 12/114,286, filed on May 2, 2008, now Pat. No. 8,230,099, which is a
(Continued)

(51) Int. Cl.
G06F 3/00 (2006.01)
H04L 29/08 (2006.01)
H04N 21/41 (2011.01)
H04N 21/482 (2011.01)

(52) U.S. Cl.
CPC ......... H04L 67/10 (2013.01); H04N 21/4126 (2013.01); H04N 21/482 (2013.01)

(58) Field of Classification Search
CPC ....... H04L 67/06; H04L 67/10; H04L 67/306; H04N 21/482; H04N 21/4126
See application file for complete search history.

(56) References Cited

U.S. PATENT DOCUMENTS 3,609,227 A 9/1971 Kuljian
4,829,500 A 5/1989 Saunders
4,920,432 A 4/1990 Eggers et al.
(Continued)

FOREIGN PATENT DOCUMENTS

CN 1493064 4/2004
EP 0663737 7/1995
(Continued)

OTHER PUBLICATIONS

Non-Published U.S. Appl. No. 09/653,964 to Steve Perlman, filed Sep. 1, 2000 (first publicly available Mar. 30, 2010) 98 pages.
(Continued)

Primary Examiner — Mohamed Wasel

(57) ABSTRACT

A playlist is received, based on information identifying a user-association to the playlist at a remote playlist source, at a media player device from the remote playlist source coupled to the media player device over an Internet network connection, the playlist comprising a plurality of item identifiers identifying a corresponding plurality of items. The playlist is communicated from the media player device to a wireless handheld remote control coupled to the media player device over a LAN connection using the Transmission Control Protocol/Internet Protocol (TCP/IP). At least one item identifier is received from the wireless handheld remote control. At least one item corresponding to the at least one item identifier is rendered by the media player device. The media player device, the wireless handheld remote control, and the remote playlist source are all separate devices.

70 Claims, 6 Drawing Sheets

Related U.S. Application Data division of application No. 10/840,110, filed on May 5, 2004, now Pat. No. 8,028,038.

(56) References Cited

U.S. PATENT DOCUMENTS

| | | |
|---|---|---|
| 5,168,481 A | 12/1992 | Culbertson et al. |
| 5,262,875 A | 11/1993 | Mincer et al. |
| 5,418,713 A | 5/1995 | Allen |
| 5,440,334 A | 8/1995 | Walters et al. |
| 5,493,692 A | 2/1996 | Theimer et al. |
| 5,550,576 A | 8/1996 | Klosterman |
| 5,553,126 A | 9/1996 | Tang |
| 5,577,128 A | 11/1996 | Farinelli |
| 5,581,461 A | 12/1996 | Coll et al. |
| 5,581,479 A | 12/1996 | McLaughlin et al. |
| 5,616,876 A | 4/1997 | Cluts |
| 5,618,045 A | 4/1997 | Kagan et al. |
| 5,625,608 A | 4/1997 | Grewe et al. |
| 5,710,970 A | 1/1998 | Walters et al. |
| 5,734,719 A | 3/1998 | Anderson et al. |
| 5,754,939 A | 5/1998 | Herz et al. |
| 5,781,889 A | 7/1998 | Martin |
| 5,790,426 A * | 8/1998 | Robinson .......... G06F 17/30699 702/179 |
| 5,794,217 A | 8/1998 | Allen |
| 5,796,727 A | 8/1998 | Harrison et al. |
| 5,819,160 A | 10/1998 | Foladare et al. |
| 5,832,499 A | 11/1998 | Gustman |
| 5,852,610 A | 12/1998 | Olaniyan |
| 5,857,149 A | 1/1999 | Suzuki |
| 5,874,986 A | 2/1999 | Gibbon et al. |
| 5,878,223 A | 3/1999 | Becker et al. |
| 5,878,429 A | 3/1999 | Morris et al. |
| 5,884,048 A | 3/1999 | Takano |
| 5,884,282 A * | 3/1999 | Robinson .......... G06F 17/30699 705/12 |
| 5,903,892 A | 5/1999 | Ali et al. |
| 5,903,901 A | 5/1999 | Kawakura et al. |
| 5,907,831 A | 5/1999 | Lotvin et al. |
| 5,923,902 A | 7/1999 | Inagaki |
| 5,926,624 A | 7/1999 | Katz et al. |
| 5,933,822 A | 8/1999 | Braden-Harder et al. |
| 5,949,492 A | 9/1999 | Mankovitz |
| 5,949,776 A | 9/1999 | Mahany et al. |
| 5,959,945 A | 9/1999 | Kleiman |
| 5,991,306 A | 11/1999 | Burns et al. |
| 6,014,090 A | 1/2000 | Rosen et al. |
| 6,014,569 A | 1/2000 | Bottum |
| 6,026,150 A | 2/2000 | Frank et al. |
| 6,032,202 A | 2/2000 | Lea |
| 6,038,591 A | 3/2000 | Wolfe et al. |
| 6,038,601 A | 3/2000 | Kemper et al. |
| 6,038,668 A | 3/2000 | Chipman et al. |
| 6,041,311 A | 3/2000 | Chislenko et al. |
| 6,041,326 A | 3/2000 | Amro et al. |
| 6,049,711 A | 4/2000 | Ben-Yehezkel et al. |
| 6,051,389 A | 4/2000 | Ahl et al. |
| 6,055,566 A | 4/2000 | Kikinis |
| 6,064,379 A | 5/2000 | DeMoney |
| 6,088,455 A | 7/2000 | Logan et al. |
| 6,088,722 A | 7/2000 | Herz et al. |
| 6,092,142 A | 7/2000 | Mehta |
| 6,104,334 A | 8/2000 | Allport |
| 6,122,658 A | 9/2000 | Chaddha |
| 6,127,941 A | 10/2000 | Van Ryzin |
| 6,131,130 A | 10/2000 | Van Ryzin |
| 6,134,590 A | 10/2000 | Perlman |
| 6,161,132 A | 12/2000 | Roberts |
| 6,166,735 A | 12/2000 | Dom et al. |
| 6,182,128 B1 | 1/2001 | Kelkar et al. |
| 6,192,282 B1 | 2/2001 | Smith et al. |
| 6,192,340 B1 | 2/2001 | Abecassis |
| 6,195,436 B1 | 2/2001 | Scibora et al. |
| 6,195,654 B1 | 2/2001 | Wachtel |
| 6,195,657 B1 | 2/2001 | Rucker et al. |
| 6,199,076 B1 | 3/2001 | Logan et al. |
| D440,553 S | 4/2001 | Bolas et al. |
| 6,212,282 B1 | 4/2001 | Mershon |
| 6,226,672 B1 | 5/2001 | DeMartin et al. |
| 6,229,621 B1 | 5/2001 | Kulakowski et al. |
| 6,233,682 B1 | 5/2001 | Fritsch |
| 6,240,069 B1 | 5/2001 | Alperovich et al. |
| 6,243,725 B1 | 6/2001 | Hempleman et al. |
| 6,243,760 B1 | 6/2001 | Armbruster et al. |
| 6,246,672 B1 | 6/2001 | Lumelsky |
| 6,248,946 B1 | 6/2001 | Dwek |
| 6,253,069 B1 | 6/2001 | Mankovitz |
| 6,255,961 B1 | 7/2001 | Van Ryzin et al. |
| 6,256,303 B1 | 7/2001 | Drakoulis et al. |
| 6,256,554 B1 | 7/2001 | DiLorenzo |
| 6,263,503 B1 | 7/2001 | Margulis |
| 6,317,722 B1 * | 11/2001 | Jacobi .................. G06Q 30/02 705/14.51 |
| 6,349,203 B1 | 2/2002 | Asaoka et al. |
| 6,349,329 B1 | 2/2002 | Mackintosh et al. |
| 6,354,748 B1 | 3/2002 | Vrvilo |
| 6,372,974 B1 | 4/2002 | Gross et al. |
| 6,374,237 B1 | 4/2002 | Reese |
| 6,389,467 B1 | 5/2002 | Eyal |
| 6,389,469 B1 | 5/2002 | Vekslar et al. |
| 6,446,080 B1 | 9/2002 | Van Ryzin et al. |
| 6,456,234 B1 | 9/2002 | Johnson |
| 6,460,076 B1 | 10/2002 | Srinivasan |
| 6,473,792 B1 | 10/2002 | Yavitz et al. |
| 6,484,199 B2 | 11/2002 | Eyal |
| 6,496,122 B2 | 12/2002 | Sampsell |
| 6,501,389 B1 | 12/2002 | Aguirre |
| 6,502,194 B1 | 12/2002 | Berman et al. |
| 6,519,648 B1 | 2/2003 | Eyal |
| 6,526,335 B1 | 2/2003 | Treyz et al. |
| 6,526,411 B1 | 2/2003 | Ward |
| 6,529,136 B2 | 3/2003 | Cao et al. |
| 6,539,232 B2 | 3/2003 | Hendrey et al. |
| 6,542,750 B2 | 4/2003 | Hendrey et al. |
| 6,546,421 B1 | 4/2003 | Wynblatt et al. |
| 6,549,942 B1 | 4/2003 | Janky |
| 6,567,847 B1 | 5/2003 | Inoue |
| 6,587,127 B1 | 7/2003 | Leeke et al. |
| 6,608,907 B1 | 8/2003 | Lee |
| 6,609,039 B1 | 8/2003 | Schoen |
| 6,618,593 B1 | 9/2003 | Drutman et al. |
| 6,622,018 B1 | 9/2003 | Erekson |
| 6,628,928 B1 | 9/2003 | Crosby et al. |
| 6,631,410 B1 | 10/2003 | Kowalski et al. |
| 6,640,145 B2 | 10/2003 | Hoffberg et al. |
| 6,643,376 B1 | 11/2003 | Ackerman |
| 6,647,411 B2 | 11/2003 | Towell et al. |
| 6,647,417 B1 | 11/2003 | Hunter et al. |
| 6,657,116 B1 | 12/2003 | Gunnerson |
| 6,662,231 B1 * | 12/2003 | Drosset ............. G06F 17/30017 707/E17.009 |
| 6,675,015 B1 | 1/2004 | Martini et al. |
| 6,675,268 B1 | 1/2004 | DeKoning et al. |
| 6,678,215 B1 | 1/2004 | Treyz et al. |
| 6,690,657 B1 | 2/2004 | Lau |
| 6,701,355 B1 | 3/2004 | Brandt et al. |
| 6,711,622 B1 | 3/2004 | Fuller et al. |
| 6,721,741 B1 | 4/2004 | Eyal et al. |
| 6,725,275 B2 | 4/2004 | Eyal et al. |
| 6,728,585 B2 | 4/2004 | Neoh |
| 6,735,628 B2 | 5/2004 | Eyal |
| 6,741,869 B1 | 5/2004 | Lehr |
| 6,754,468 B1 | 6/2004 | Sieben et al. |
| 6,769,028 B1 | 7/2004 | Sass et al. |
| 6,778,869 B2 | 8/2004 | Champion |
| 6,779,115 B1 | 8/2004 | Naim |
| 6,792,280 B1 | 9/2004 | Hori et al. |
| 6,793,142 B2 | 9/2004 | Yap |
| 6,823,225 B1 | 11/2004 | Sass |
| 6,823,519 B1 | 11/2004 | Baird et al. |
| 6,834,208 B2 | 12/2004 | Gonzales et al. |
| 6,839,705 B1 | 1/2005 | Grooters |
| 6,853,841 B1 | 2/2005 | St. Pierre |
| 6,865,600 B1 | 3/2005 | Brydon et al. |

(56) References Cited

U.S. PATENT DOCUMENTS

| | | |
|---|---|---|
| 6,865,609 B1 | 3/2005 | Gubbi |
| 6,876,642 B1 | 4/2005 | Adams et al. |
| 6,876,643 B1 | 4/2005 | Aggarwal |
| 6,882,299 B1 | 4/2005 | Allport |
| 6,885,362 B2 | 4/2005 | Suomela |
| 6,892,230 B1 | 5/2005 | Gu |
| 6,925,489 B1 | 8/2005 | Curtin |
| 6,933,433 B1 | 8/2005 | Porteus et al. |
| 6,937,860 B2 | 8/2005 | Jahn |
| 6,946,988 B2 | 9/2005 | Edwards et al. |
| 6,947,571 B1 | 9/2005 | Rhoads et al. |
| 6,954,443 B2 | 10/2005 | Forstadius et al. |
| 6,954,763 B2 | 10/2005 | Nunome et al. |
| 6,965,770 B2 | 11/2005 | Walsh et al. |
| 6,970,127 B2 | 11/2005 | Rakib |
| 6,970,703 B2 | 11/2005 | Fuchs et al. |
| 6,975,266 B2 | 12/2005 | Abraham et al. |
| 6,982,780 B2 | 1/2006 | Morley et al. |
| 6,990,497 B2 | 1/2006 | O'Rourke et al. |
| 6,993,532 B1 | 1/2006 | Platt et al. |
| 7,000,188 B1 | 2/2006 | Eustace |
| 7,010,263 B1 | 3/2006 | Patsiokas |
| 7,010,537 B2 | 3/2006 | Eyal et al. |
| 7,020,704 B1 | 3/2006 | Lipscomb et al. |
| 7,020,710 B2 | 3/2006 | Weber et al. |
| 7,022,905 B1 | 4/2006 | Hinman et al. |
| 7,028,082 B1 | 4/2006 | Rosenberg et al. |
| 7,028,327 B1 | 4/2006 | Dougherty et al. |
| 7,035,618 B2 | 4/2006 | Schnurr |
| 7,035,912 B2 | 4/2006 | Arteaga |
| 7,043,477 B2 | 5/2006 | Mercer et al. |
| 7,047,092 B2 | 5/2006 | Wimsatt |
| 7,047,315 B1 | 5/2006 | Srivastava |
| 7,058,410 B2 | 6/2006 | Hiyama et al. |
| 7,065,579 B2 | 6/2006 | Traversat |
| 7,072,932 B1 | 7/2006 | Stahl |
| 7,075,000 B2 * | 7/2006 | Gang ................ G06F 17/30743 84/600 |
| 7,076,204 B2 | 7/2006 | Richenstein |
| 7,076,523 B2 | 7/2006 | Schneider et al. |
| 7,081,579 B2 | 7/2006 | Alcalde et al. |
| 7,085,571 B2 | 8/2006 | Kalhan et al. |
| 7,099,296 B2 | 8/2006 | Belcea |
| 7,103,643 B1 | 9/2006 | Jacobs et al. |
| 7,107,045 B1 | 9/2006 | Knoop |
| 7,109,975 B2 | 9/2006 | Fedorak et al. |
| 7,120,871 B1 | 10/2006 | Harrington |
| 7,123,925 B2 | 10/2006 | Robinson et al. |
| 7,130,608 B2 | 10/2006 | Hollstrom et al. |
| 7,130,616 B2 | 10/2006 | Janik |
| 7,134,040 B2 | 11/2006 | Ayres |
| 7,136,399 B2 | 11/2006 | Lanigan |
| 7,136,934 B2 | 11/2006 | Carter et al. |
| 7,143,939 B2 | 12/2006 | Henzerling |
| 7,152,110 B2 | 12/2006 | Pierce |
| 7,171,018 B2 | 1/2007 | Rhoads et al. |
| 7,181,023 B1 | 2/2007 | Andrews et al. |
| 7,187,947 B1 | 3/2007 | White et al. |
| 7,188,352 B2 | 3/2007 | Nathan et al. |
| 7,194,322 B2 | 3/2007 | Kaneko et al. |
| 7,200,638 B2 | 4/2007 | Lake |
| 7,203,753 B2 | 4/2007 | Yeager et al. |
| 7,206,568 B2 | 4/2007 | Sudit |
| 7,215,949 B2 | 5/2007 | Sauriol |
| 7,218,611 B2 | 5/2007 | Mimura et al. |
| 7,228,054 B2 | 6/2007 | Cowgill |
| 7,240,106 B2 | 7/2007 | Cochran et al. |
| 7,248,893 B2 | 7/2007 | Christensen et al. |
| 7,249,147 B2 | 7/2007 | Juszkiewicz |
| 7,249,367 B2 | 7/2007 | Bove, Jr. et al. |
| 7,260,638 B2 | 8/2007 | Crosbie |
| 7,263,368 B2 | 8/2007 | Knauerhase et al. |
| 7,266,595 B1 | 9/2007 | Black et al. |
| 7,269,854 B2 | 9/2007 | Simmons et al. |
| 7,272,357 B2 | 9/2007 | Nishiga et al. |
| 7,277,765 B1 | 10/2007 | Beckmann et al. |
| 7,277,955 B2 | 10/2007 | Elliott |
| 7,292,588 B2 | 11/2007 | Milley et al. |
| 7,293,277 B1 | 11/2007 | Nathan |
| 7,296,091 B1 | 11/2007 | Dutta et al. |
| 7,299,271 B2 | 11/2007 | Sato |
| 7,299,304 B2 | 11/2007 | Saint-Hilaire et al. |
| 7,301,900 B1 | 11/2007 | Laksono |
| 7,302,224 B2 | 11/2007 | Sibley |
| 7,308,489 B2 | 12/2007 | Weast |
| 7,319,379 B1 | 1/2008 | Melvin |
| 7,325,043 B1 | 1/2008 | Rosenberg et al. |
| 7,340,768 B2 | 3/2008 | Rosenberger |
| 7,343,160 B2 | 3/2008 | Morton |
| 7,343,414 B2 | 3/2008 | Lipscomb et al. |
| 7,373,109 B2 | 5/2008 | Pohja et al. |
| 7,403,769 B2 | 7/2008 | Kopra et al. |
| 7,426,329 B2 | 9/2008 | Calhoon et al. |
| 7,428,023 B2 | 9/2008 | Allen et al. |
| 7,451,177 B1 | 11/2008 | Johnson et al. |
| 7,454,511 B2 | 11/2008 | Weast |
| 7,454,518 B1 | 11/2008 | Cain et al. |
| 7,468,934 B1 | 12/2008 | Janik |
| 7,469,283 B2 | 12/2008 | Eyal et al. |
| 7,472,353 B1 * | 12/2008 | Wolff ................ G11B 27/031 707/999.01 |
| 7,483,958 B1 | 1/2009 | Elabbady et al. |
| 7,490,171 B2 | 2/2009 | Saint-Hilaire et al. |
| 7,496,665 B2 | 2/2009 | Karaoguz et al. |
| 7,503,059 B1 | 3/2009 | Rothschild |
| 7,512,685 B2 | 3/2009 | Lunsford |
| 7,512,702 B1 | 3/2009 | Srivastava et al. |
| 7,516,212 B2 | 4/2009 | Nguyen et al. |
| 7,525,289 B2 | 4/2009 | Janik et al. |
| 7,535,465 B2 | 5/2009 | Morse et al. |
| 7,555,543 B2 | 6/2009 | Encarnacion et al. |
| 7,567,987 B2 | 7/2009 | Shappell |
| 7,571,014 B1 | 8/2009 | Lambourne et al. |
| 7,590,084 B2 | 9/2009 | Perlman |
| 7,606,872 B2 | 10/2009 | Stevenson et al. |
| 7,613,736 B2 * | 11/2009 | Hicken ............ G06F 17/30743 |
| 7,627,343 B2 | 12/2009 | Fadell et al. |
| 7,643,894 B2 | 1/2010 | Braithwaite et al. |
| 7,647,385 B2 | 1/2010 | Encarnacion et al. |
| 7,652,844 B2 | 1/2010 | Edwards et al. |
| 7,660,601 B2 | 2/2010 | Janik et al. |
| 7,668,832 B2 | 2/2010 | Yeh et al. |
| 7,668,939 B2 | 2/2010 | Encarnacion et al. |
| 7,688,803 B1 | 3/2010 | Young et al. |
| 7,693,992 B2 | 4/2010 | Watson |
| 7,698,723 B2 | 4/2010 | Hicks |
| 7,702,363 B2 | 4/2010 | Cao |
| 7,702,403 B1 | 4/2010 | Gladwin et al. |
| 7,711,838 B1 | 5/2010 | Boulter et al. |
| 7,712,125 B2 | 5/2010 | Herigstad et al. |
| 7,734,688 B2 | 6/2010 | Langdon |
| 7,739,335 B2 | 6/2010 | Siegel et al. |
| 7,742,606 B2 | 6/2010 | Kreifeldt et al. |
| 7,768,234 B2 | 8/2010 | Janik et al. |
| 7,783,722 B1 | 8/2010 | Rosenberg et al. |
| 7,786,705 B2 | 8/2010 | Janik et al. |
| 7,797,272 B2 | 9/2010 | Picker et al. |
| 7,827,581 B1 | 11/2010 | Eiger |
| 7,840,691 B1 | 11/2010 | De Bonet et al. |
| 7,856,485 B2 | 12/2010 | Prager et al. |
| 7,870,088 B1 | 1/2011 | Chen et al. |
| 7,890,661 B2 | 2/2011 | Spurgat et al. |
| 7,899,915 B2 | 3/2011 | Reisman |
| 7,904,579 B2 | 3/2011 | Janik et al. |
| 7,917,557 B2 | 3/2011 | Shteyn et al. |
| 7,917,645 B2 | 3/2011 | Ikezoye et al. |
| 7,920,824 B2 | 4/2011 | Janik et al. |
| 7,926,085 B2 | 4/2011 | Del Beccaro et al. |
| 7,928,310 B2 | 4/2011 | Georges et al. |
| 7,996,873 B1 | 8/2011 | Nathan et al. |
| 8,005,724 B2 | 8/2011 | Dunning et al. |
| 8,014,423 B2 | 9/2011 | Thaler et al. |
| 8,023,998 B2 | 9/2011 | Croome |
| 8,024,419 B2 | 9/2011 | Gudorf |

(56) References Cited

U.S. PATENT DOCUMENTS

| | | |
|---|---|---|
| 8,028,038 B2 | 9/2011 | Weel |
| 8,028,093 B2 | 9/2011 | Karaoguz et al. |
| 8,028,323 B2 | 9/2011 | Weel |
| 8,036,265 B1 | 10/2011 | Reynolds et al. |
| 8,045,952 B2 | 10/2011 | Qureshey et al. |
| 8,050,652 B2 | 11/2011 | Qureshey et al. |
| 8,082,355 B1 | 12/2011 | Weber et al. |
| 8,086,287 B2 | 12/2011 | Mooney |
| 8,135,796 B1 | 3/2012 | Abdelaziz et al. |
| 8,145,699 B2 | 3/2012 | Parham et al. |
| 8,160,495 B2 | 4/2012 | Khedouri et al. |
| 8,214,422 B1 | 7/2012 | Woodward et al. |
| 8,214,873 B2 | 7/2012 | Weel |
| 8,230,099 B2 | 7/2012 | Weel |
| 8,281,001 B2 | 10/2012 | Busam et al. |
| 8,359,351 B2 | 1/2013 | Istvan et al. |
| 8,381,252 B2 | 2/2013 | Young |
| 8,433,240 B2 | 4/2013 | Slotznick |
| 2001/0005368 A1 | 6/2001 | Rune |
| 2001/0032335 A1 | 10/2001 | Jones |
| 2001/0034763 A1 | 10/2001 | Jacobs et al. |
| 2001/0039659 A1 | 11/2001 | Simmons et al. |
| 2001/0042107 A1 | 11/2001 | Palm |
| 2001/0042109 A1 | 11/2001 | Bolas et al. |
| 2001/0044321 A1 | 11/2001 | Ausems et al. |
| 2001/0048449 A1 | 12/2001 | Baker |
| 2001/0053994 A1 | 12/2001 | Atcheson et al. |
| 2001/0054043 A1 | 12/2001 | Harlan |
| 2001/0054060 A1 | 12/2001 | Fillebrown |
| 2002/0002039 A1 | 1/2002 | Qureshey et al. |
| 2002/0007418 A1 | 1/2002 | Hegde et al. |
| 2002/0013852 A1 | 1/2002 | Janik |
| 2002/0019829 A1 | 2/2002 | Shapiro |
| 2002/0022453 A1 | 2/2002 | Balog et al. |
| 2002/0023084 A1 | 2/2002 | Eyal et al. |
| 2002/0026442 A1 | 2/2002 | Lipscomb |
| 2002/0032019 A1 | 3/2002 | Marks et al. |
| 2002/0040255 A1 | 4/2002 | Neoh |
| 2002/0042915 A1 | 4/2002 | Kubischta et al. |
| 2002/0048224 A1 | 4/2002 | Dygert et al. |
| 2002/0049760 A1 | 4/2002 | Scott et al. |
| 2002/0065902 A1 | 5/2002 | Janik et al. |
| 2002/0068558 A1 | 6/2002 | Janik |
| 2002/0072326 A1 | 6/2002 | Qureshey et al. |
| 2002/0072817 A1 | 6/2002 | Champion |
| 2002/0073204 A1 | 6/2002 | Dutta et al. |
| 2002/0080719 A1 | 6/2002 | Parkvall et al. |
| 2002/0083148 A1 | 6/2002 | Shaw et al. |
| 2002/0086659 A1 | 7/2002 | Lauper |
| 2002/0086676 A1 | 7/2002 | Hendrey et al. |
| 2002/0087996 A1 | 7/2002 | Bi et al. |
| 2002/0111698 A1 | 8/2002 | Graziano et al. |
| 2002/0116476 A1 | 8/2002 | Eyal et al. |
| 2002/0122410 A1 | 9/2002 | Kulikov |
| 2002/0123276 A1 | 9/2002 | Peetz |
| 2002/0138630 A1 | 9/2002 | Solomon et al. |
| 2002/0144259 A1 | 10/2002 | Gutta et al. |
| 2002/0151327 A1 | 10/2002 | Levitt |
| 2002/0165793 A1 | 11/2002 | Brand et al. |
| 2002/0166123 A1 | 11/2002 | Schrader et al. |
| 2002/0168938 A1 | 11/2002 | Chang |
| 2002/0170062 A1 | 11/2002 | Chen et al. |
| 2002/0173273 A1 | 11/2002 | Spurgat et al. |
| 2002/0173339 A1 | 11/2002 | Safadi |
| 2002/0174243 A1 | 11/2002 | Spurgat et al. |
| 2002/0174426 A1 | 11/2002 | Gutta et al. |
| 2002/0184635 A1 | 12/2002 | Istvan |
| 2002/0194260 A1 | 12/2002 | Headley et al. |
| 2002/0194619 A1 | 12/2002 | Chang et al. |
| 2003/0011467 A1 | 1/2003 | Suomela |
| 2003/0014759 A1 | 1/2003 | Van Stam |
| 2003/0018799 A1 | 1/2003 | Eyal |
| 2003/0022675 A1 | 1/2003 | Mergler |
| 2003/0023427 A1 | 1/2003 | Cassin et al. |
| 2003/0033420 A1 | 2/2003 | Eyal et al. |
| 2003/0037170 A1 | 2/2003 | Zeller et al. |
| 2003/0045955 A1 | 3/2003 | Janik |
| 2003/0050062 A1 | 3/2003 | Chen et al. |
| 2003/0058805 A1 | 3/2003 | Meyerson |
| 2003/0065721 A1 | 4/2003 | Roskind |
| 2003/0080874 A1 | 5/2003 | Yumoto et al. |
| 2003/0093790 A1 | 5/2003 | Logan et al. |
| 2003/0093797 A1 | 5/2003 | Bazzaz |
| 2003/0115351 A1 | 6/2003 | Giobbi |
| 2003/0126211 A1 | 7/2003 | Anttila et al. |
| 2003/0126239 A1 | 7/2003 | Hwang |
| 2003/0126293 A1 | 7/2003 | Bushey |
| 2003/0130009 A1 | 7/2003 | Kung |
| 2003/0134648 A1 | 7/2003 | Reed et al. |
| 2003/0140343 A1 | 7/2003 | Falvo et al. |
| 2003/0147624 A1 | 8/2003 | Trajkovic et al. |
| 2003/0165128 A1 | 9/2003 | Sisodia |
| 2003/0177219 A1 | 9/2003 | Taib et al. |
| 2003/0182315 A1 | 9/2003 | Plastina et al. |
| 2003/0204439 A1 | 10/2003 | Cullen, III |
| 2003/0212802 A1 | 11/2003 | Rector et al. |
| 2003/0217102 A1 | 11/2003 | Jystad et al. |
| 2003/0225834 A1 | 12/2003 | Lee et al. |
| 2003/0227478 A1 | 12/2003 | Chatfield |
| 2003/0229549 A1 | 12/2003 | Wolinsky et al. |
| 2003/0229900 A1 | 12/2003 | Reisman |
| 2003/0236843 A1 | 12/2003 | Weber et al. |
| 2004/0002938 A1* | 1/2004 | Deguchi ............... G06F 17/30 |
| 2004/0024912 A1 | 2/2004 | Fukao et al. |
| 2004/0030929 A1 | 2/2004 | Bi et al. |
| 2004/0031058 A1 | 2/2004 | Reisman |
| 2004/0055014 A1 | 3/2004 | Edelson |
| 2004/0057348 A1* | 3/2004 | Shteyn ............... G11B 27/329 369/30.38 |
| 2004/0078382 A1 | 4/2004 | Mercer et al. |
| 2004/0086120 A1 | 5/2004 | Akins, III et al. |
| 2004/0090984 A1 | 5/2004 | Saint-Hilaire et al. |
| 2004/0103280 A1 | 5/2004 | Balfanz et al. |
| 2004/0107219 A1 | 6/2004 | Rosenberger |
| 2004/0107242 A1 | 6/2004 | Vert et al. |
| 2004/0119894 A1 | 6/2004 | Higgins et al. |
| 2004/0120285 A1 | 6/2004 | Paila et al. |
| 2004/0133914 A1 | 7/2004 | Smith et al. |
| 2004/0148393 A1 | 7/2004 | Breiter et al. |
| 2004/0158579 A1* | 8/2004 | Gopalakrishnan G06F 17/30017 |
| 2004/0160307 A1 | 8/2004 | Saikkonen et al. |
| 2004/0162830 A1 | 8/2004 | Shirwadkar et al. |
| 2004/0167672 A1 | 8/2004 | McIlhany et al. |
| 2004/0174863 A1 | 9/2004 | Caspi et al. |
| 2004/0181604 A1 | 9/2004 | Immonen |
| 2004/0199661 A1 | 10/2004 | Murdock |
| 2004/0203901 A1 | 10/2004 | Wilson et al. |
| 2004/0203998 A1 | 10/2004 | Knauerhase et al. |
| 2004/0205028 A1 | 10/2004 | Verosub et al. |
| 2004/0215694 A1 | 10/2004 | Podolsky |
| 2004/0225519 A1 | 11/2004 | Martin |
| 2004/0225746 A1 | 11/2004 | Niell et al. |
| 2004/0246372 A1 | 12/2004 | Megeid |
| 2004/0249708 A1 | 12/2004 | Jacobs et al. |
| 2004/0255340 A1 | 12/2004 | Logan |
| 2004/0260407 A1 | 12/2004 | Wimsatt |
| 2004/0260427 A1 | 12/2004 | Wimsatt |
| 2004/0260786 A1 | 12/2004 | Barile |
| 2004/0267899 A1 | 12/2004 | Rahman et al. |
| 2004/0267965 A1 | 12/2004 | Vasudevan et al. |
| 2005/0015800 A1 | 1/2005 | Holcomb |
| 2005/0021369 A1 | 1/2005 | Cohen et al. |
| 2005/0021470 A1 | 1/2005 | Martin et al. |
| 2005/0025320 A1 | 2/2005 | Barry |
| 2005/0033780 A1 | 2/2005 | Simelius et al. |
| 2005/0038876 A1 | 2/2005 | Chaudhuri |
| 2005/0044561 A1 | 2/2005 | McDonald |
| 2005/0048972 A1 | 3/2005 | Dorenbosch et al. |
| 2005/0050027 A1 | 3/2005 | Yeh et al. |
| 2005/0059379 A1 | 3/2005 | Sovio et al. |
| 2005/0060264 A1 | 3/2005 | Schrock et al. |
| 2005/0060350 A1 | 3/2005 | Baum et al. |
| 2005/0071221 A1 | 3/2005 | Selby |

(56) References Cited

U.S. PATENT DOCUMENTS

| | | | |
|---|---|---|---|
| 2005/0071881 A1 | 3/2005 | Deshpande | |
| 2005/0091693 A1 | 4/2005 | Amine et al. | |
| 2005/0113946 A9 | 5/2005 | Janik | |
| 2005/0120301 A1 | 6/2005 | Humpleman et al. | |
| 2005/0120373 A1 | 6/2005 | Thomas et al. | |
| 2005/0130677 A1 | 6/2005 | Meunier et al. | |
| 2005/0160270 A1 | 7/2005 | Goldberg et al. | |
| 2005/0165888 A1 | 7/2005 | Elliot | |
| 2005/0171799 A1 | 8/2005 | Hull et al. | |
| 2005/0174975 A1 | 8/2005 | Mgrdechian et al. | |
| 2005/0187976 A1 | 8/2005 | Goodman et al. | |
| 2005/0197846 A1 | 9/2005 | Pezaris et al. | |
| 2005/0210507 A1* | 9/2005 | Hawkins | G06F 17/30035 725/46 |
| 2005/0234995 A1 | 10/2005 | Plastina et al. | |
| 2005/0240494 A1* | 10/2005 | Cue | G06Q 10/107 705/26.1 |
| 2005/0245233 A1 | 11/2005 | Anderson | |
| 2005/0251453 A1 | 11/2005 | Lu | |
| 2005/0251565 A1 | 11/2005 | Weel | |
| 2005/0251566 A1 | 11/2005 | Weel | |
| 2005/0251576 A1 | 11/2005 | Weel | |
| 2005/0251807 A1 | 11/2005 | Weel | |
| 2005/0262204 A1 | 11/2005 | Szeto et al. | |
| 2005/0272413 A1 | 12/2005 | Bourne | |
| 2006/0020662 A1 | 1/2006 | Robinson | |
| 2006/0059260 A1* | 3/2006 | Kelly | G11B 27/00 709/225 |
| 2006/0085821 A9 | 4/2006 | Simmons et al. | |
| 2006/0135059 A1 | 6/2006 | Hill | |
| 2006/0143236 A1* | 6/2006 | Wu | G06F 17/30053 |
| 2006/0149631 A1 | 7/2006 | Brazell et al. | |
| 2006/0168264 A1 | 7/2006 | Baba et al. | |
| 2006/0212442 A1 | 9/2006 | Conrad et al. | |
| 2006/0212444 A1 | 9/2006 | Handman et al. | |
| 2006/0256669 A1 | 11/2006 | Sakuma et al. | |
| 2006/0287746 A1 | 12/2006 | Braithwaite et al. | |
| 2006/0294201 A1* | 12/2006 | Kito | H04L 63/102 709/217 |
| 2007/0038999 A1 | 2/2007 | Millington | |
| 2007/0088804 A1 | 4/2007 | Qureshey et al. | |
| 2007/0089132 A1 | 4/2007 | Qureshey et al. | |
| 2007/0089135 A1 | 4/2007 | Qureshey et al. | |
| 2007/0180063 A1 | 8/2007 | Qureshey et al. | |
| 2007/0247979 A1* | 10/2007 | Brillon | G06Q 30/0603 369/30.06 |
| 2007/0260508 A1 | 11/2007 | Barry et al. | |
| 2008/0033821 A1* | 2/2008 | Jacobi | G06Q 30/02 705/14.53 |
| 2008/0109095 A1 | 5/2008 | Braithwaite et al. | |
| 2008/0114481 A1 | 5/2008 | Braithwaite et al. | |
| 2008/0133520 A1* | 6/2008 | Hempleman | G06F 17/30038 |
| 2008/0133759 A1 | 6/2008 | Weel | |
| 2008/0176511 A1* | 7/2008 | Tan | H04H 60/80 709/201 |
| 2008/0208379 A1 | 8/2008 | Weel | |
| 2008/0209013 A1 | 8/2008 | Weel | |
| 2008/0312946 A1 | 12/2008 | Valentine et al. | |
| 2009/0157842 A1* | 6/2009 | Shaffer | G06F 17/30 709/217 |
| 2009/0193472 A1 | 7/2009 | Braithwaite et al. | |
| 2009/0276709 A1* | 11/2009 | Venneman | G06F 17/30766 715/716 |
| 2010/0172512 A1 | 7/2010 | Braithwaite et al. | |
| 2011/0026727 A1 | 2/2011 | Braithwaite et al. | |
| 2011/0044468 A1 | 2/2011 | Braithwaite et al. | |
| 2011/0044469 A1 | 2/2011 | Braithwaite et al. | |
| 2011/0157476 A1 | 6/2011 | Arling et al. | |
| 2012/0042007 A1 | 2/2012 | Weel | |
| 2012/0042094 A1 | 2/2012 | Qureshey et al. | |
| 2012/0143729 A1 | 6/2012 | Qureshey et al. | |

FOREIGN PATENT DOCUMENTS

| | | |
|---|---|---|
| EP | 0789502 | 8/1997 |
| EP | 984584 | 3/2000 |
| JP | 2000-148169 | 5/2000 |
| JP | 2001-222288 | 8/2001 |
| JP | 2002-006868 | 1/2002 |
| JP | 2002-082679 | 3/2002 |
| JP | 2003-255962 | 9/2003 |
| JP | 2003-288085 | 10/2003 |
| JP | 2004-061673 | 2/2004 |
| WO | WO 97/26601 | 7/1997 |
| WO | WO 97/44747 | 11/1997 |
| WO | WO 99/05877 | 2/1999 |
| WO | WO 99/18518 | 4/1999 |
| WO | WO 99/38266 | 7/1999 |
| WO | WO 99/43111 | 8/1999 |
| WO | WO 99/57646 | 11/1999 |
| WO | WO 00/03830 | 1/2000 |
| WO | WO 00/52935 | 9/2000 |
| WO | WO 01/17142 | 3/2001 |
| WO | WO 01/24551 | 4/2001 |
| WO | WO 01/36064 | 5/2001 |
| WO | WO 01/53994 | 7/2001 |
| WO | WO 01/61894 | 8/2001 |
| WO | WO 02/21841 | 3/2002 |
| WO | WO 02/29506 | 4/2002 |
| WO | WO 02/062092 | 8/2002 |
| WO | WO 2004/027606 | 4/2004 |

OTHER PUBLICATIONS

"Defendant Sonos Inc.'s Initial Disclosures," Civil Action No. 2:13-cv-06062, Oct. 28, 2013, 21 pages.

2:14-cv-471—*BHM v. Pioneer Corporation, et al.*—Pioneer/Yamaha Courtesy Invalidity Contentions, Jan. 29, 2014, 37 pages.

ITC Investigation No. 337-TA-882 Respondents and Intervenors Joint Notice of Prior Art—Appendix A1—UPnP AV 1.0 Chart directed to U.S. Pat. No. 8,028,323, 181 pages.

ITC Investigation No. 337-TA-882 Respondents and Intervenors Joint Notice of Prior Art—Appendix A2—UPnP AV 1.0 Chart directed to U.S. Pat. No. 8,214,873, 269 pages.

ITC Investigation No. 337-TA-882 Respondents and Intervenors Joint Notice of Prior Art—Appendix A3—UPnP AV 1.0 Chart directed to U.S. Pat. No. 8,230,099, 54 pages.

ITC Investigation No. 337-TA-882 Respondents and Intervenors Joint Notice of Prior Art—Appendix B1—UPnP Version 1.0 Chart directed to U.S. Pat. No. 8,028,323, 222 pages.

ITC Investigation No. 337-TA-882 Respondents and Intervenors Joint Notice of Prior Art—Appendix B2—UPnP Version 1.0 Chart directed to U.S. Pat. No. 8,214,873, 324 pages.

ITC Investigation No. 337-TA-882 Respondents and Intervenors Joint Notice of Prior Art—Appendix B3—UPnP Version 1.0 Chart directed to U.S. Pat. No. 8,230,099, 67 pages.

ITC Investigation No. 337-TA-882 Respondents and Intervenors Joint Notice of Prior Art—Appendix C1—Encarnacion Chart directed to U.S. Pat. No. 8,028,323, 189 pages.

ITC Investigation No. 337-TA-882 Respondents and Intervenors Joint Notice of Prior Art—Appendix C2—Encarnacion Chart directed to U.S. Pat. No. 8,214,873, 266 pages.

ITC Investigation No. 337-TA-882 Respondents and Intervenors Joint Notice of Prior Art—Appendix C3—Encarnacion Chart directed to U.S. Pat. No. 8,230,099, 79 pages.

ITC Investigation No. 337-TA-882 Respondents and Intervenors Joint Notice of Prior Art—Appendix D1—Weast Chart directed to U.S. Pat. No. 8,028,323, 152 pages.

ITC Investigation No. 337-TA-882 Respondents and Intervenors Joint Notice of Prior Art—Appendix D2—Weast Chart directed to U.S. Pat. No. 8,214,873, 225 pages.

ITC Investigation No. 337-TA-882 Respondents and Intervenors Joint Notice of Prior Art—Appendix D3—Weast Chart directed to U.S. Pat. No. 8,230,099, 60 pages.

ITC Investigation No. 337-TA-882 Respondents and Intervenors Joint Notice of Prior Art—Appendix E1—Khedouri Chart directed to U.S. Pat. No. 8,028,323, 212 pages.

(56) References Cited

OTHER PUBLICATIONS

ITC Investigation No. 337-TA-882 Respondents and Intervenors Joint Notice of Prior Art—Appendix E2—Khedouri Chart directed to U.S. Pat. No. 8,214,873, 352 pages.
ITC Investigation No. 337-TA-882 Respondents and Intervenors Joint Notice of Prior Art—Appendix E3—Khedouri Chart directed to U.S. Pat. No. 8,230,099, 85 pages.
ITC Investigation No. 337-TA-882 Respondents and Intervenors Joint Notice of Prior Art—Appendix F1—Chen 062 Chart directed to U.S. Pat. No. 8,028,323, 170 pages.
ITC Investigation No. 337-TA-882 Respondents and Intervenors Joint Notice of Prior Art—Appendix F2—Chen 062 Chart directed to U.S. Pat. No. 8,214,873, 244 pages.
ITC Investigation No. 337-TA-882 Respondents and Intervenors Joint Notice of Prior Art—Appendix F3—Chen 062 Chart directed to U.S. Pat. No. 8,230,099, 63 pages.
ITC Investigation No. 337-TA-882 Respondents and Intervenors Joint Notice of Prior Art—Appendix G1—IEEE 2003 Article Chart directed to U.S. Pat. No. 8,028,323, 110 pages.
ITC Investigation No. 337-TA-882 Respondents and Intervenors Joint Notice of Prior Art—Appendix G2—IEEE 2003 Article Chart directed to U.S. Pat. No. 8,214,873, 169 pages.
ITC Investigation No. 337-TA-882 Respondents and Intervenors Joint Notice of Prior Art—Appendix G3—IEEE 2003 Article Chart directed to U.S. Pat. No. 8,230,099, 39 pages.
ITC Investigation No. 337-TA-882 Respondents and Intervenors Joint Notice of Prior Art—Appendix H1—Janik 616 Chart directed to U.S. Pat. No. 8,028,323, 88 pages.
ITC Investigation No. 337-TA-882 Respondents and Intervenors Joint Notice of Prior Art—Appendix H2—Janik 616 Chart directed to U.S. Pat. No. 8,214,873, 132 pages.
ITC Investigation No. 337-TA-882 Respondents and Intervenors Joint Notice of Prior Art—Appendix H3—Janik 616 Chart directed to U.S. Pat. No. 8,230,099, 60 pages.
ITC Investigation No. 337-TA-882 Respondents and Intervenors Joint Notice of Prior Art—Appendix I1—Palm Chart directed to U.S. Pat. No. 8,028,323, 214 pages.
ITC Investigation No. 337-TA-882 Respondents and Intervenors Joint Notice of Prior Art—Appendix I2—Palm Chart directed to U.S. Pat. No. 8,214,873, 321 pages.
ITC Investigation No. 337-TA-882 Respondents and Intervenors Joint Notice of Prior Art—Appendix I3—Palm Chart directed to U.S. Pat. No. 8,230,099, 73 pages.
ITC Investigation No. 337-TA-882 Respondents and Intervenors Joint Notice of Prior Art—Appendix J1—Caspi Chart directed to U.S. Pat. No. 8,028,323, 172 pages.
ITC Investigation No. 337-TA-882 Respondents and Intervenors Joint Notice of Prior Art—Appendix J2—Caspi Chart directed to U.S. Pat. No. 8,214,873, 259 pages.
ITC Investigation No. 337-TA-882 Respondents and Intervenors Joint Notice of Prior Art—Appendix J3—Caspi Chart directed to U.S. Pat. No. 8,230,099, 60 pages.
ITC Investigation No. 337-TA-882 Respondents and Intervenors Joint Notice of Prior Art—Appendix K—Saint-Hilaire Chart directed to U.S. Pat. No. 8,230,099, 40 pages.
ITC Investigation No. 337-TA-882 Respondents and Intervenors Joint Notice of Prior Art—Appendix L—Bi Chart directed to U.S. Pat. No. 8,230,099, 53 pages.
ITC Investigation No. 337-TA-882 Respondents and Intervenors Joint Notice of Prior Art—Appendix M—Falvo Chart directed to U.S. Pat. No. 8,230,099, 53 pages.
ITC Investigation No. 337-TA-882 Respondents and Intervenors Joint Notice of Prior Art—Appendix N—Sound Blaster Chart directed to U.S. Pat. No. 8,230,099, 103 pages.
ITC Investigation No. 337-TA-882 Respondents and Intervenors Joint Notice of Prior Art—Appendix O—Champion Chart directed to U.S. Pat. No. 8,230,099, 43 pages.
ITC Investigation No. 337-TA-882 Respondents and Intervenors Joint Notice of Prior Art—Appendix P—Allen Chart directed to U.S. Pat. No. 8,230,099, 56 pages.
"3Com Demonstrates Kerbango Internet Radio at NAB Radio Show," San Francisco, CA, Sep. 21, 2000, 2 pages.
"3COM Plans to Acquire Kerbango, Developers of the First Internet Radio," Business Wire, Santa Clara, California, Jun. 27, 2000, 3 pages.
Alvear, Jose, "3Com to Acquire Kerbango for $80 Million," Streaming Media Magazine, Jun. 27, 2000.
U.S. Appl. No. 60/174,706, Palm, filed Jan. 6, 2000, 10 pages.
U.S. Appl. No. 60/212,831, Fleenor, filed Jun. 21, 2000, 14 pages.
Kouvelas, "A Combined Network, System and User Based Approach to improving the Quality of Multicast Audio," Department of Computer Science, University College London, May 1998, 125 pages.
"A complete implementation of the Universal Plug and Play Standard for networked devices," SimpleDevices, May 2, 2004, http://web.archive.org/web/20040502165533/http://simpledevices.com/up np enabler.shtml.
Mauve, M., "A General Framework and Communication Protocol for the Real-Time Transmission of Interactive Media," Reihe Informatik 16/98, 16 pages.
Gbaguidi, C., et al., "A Generic Service Management Architecture for Multimedia Multipoint Communications," Swiss Federal Institute of Technology, Telecommunications Laboratory / Telecommunications Services Group (1995) 12 pages.
"A new way to bring enhanced content and services to your connected media devices," SimpleDevices, Apr. 13, 2004, http://web.archive.org/web/20040413143604/http://simpledevices.com/mu sic explorer.shtml.
Yang, et al., "A Real-Time Synchronization Model and Transport Protocol for Multimedia Applications," Copyright 1994 IEEE, Communications and Multimedia Laboratory, Department of Computer Science and Information Engineering, National Taiwan University, 8 pages.
Alexander Sinitsyn, "A Synchronization Framework for Personal Mobile Servers," Philips Research, Proceedings of the Second IEEE Annual Conference on Pervasive Computing and Communications Workshops (PERCOMW'04), 2004 IEEE.
"About SimpleDevices, Inc.," SimpleDevices, Inc., May 1, 2004, http://web.archive.org/web/20040501022142/http://www.simpledevices.co m/aboutus.shtml.
"AddressBook:1 Service," For UPnP Verson 1.0, Standardized DCP (SDCP) Dec. 10, 2012, Document Version 1.0, Service Template Version 2.00, 35 pages.
Kawaguchi, N., et al., "Ad-Hoc On-Demand Communication System Based on Mobile Agents," Proceedings of the 3rd International Symposium on Wireless Personal Multimedia Communications (WPMC2000) 2000, 6 pages.
Schneider, "Adhoc Personal Ubiquitous Multimedia Services Via UPnP," Siemens Corporate Research, 2001 IEEE International Conference on Multimedia and Expo ISBN 0-7695-1198-8/01.
"Alcatel and Korean WiderThan.com extend cooperation agreement with global reseller alliance," Pressi.com, Feb. 17, 2003.
"ALi and Oregan Offer Industry Leading 802.11a/b/g Networked DVD Player and Digital Media Adapter Solutions," Business Wire, Jan. 5, 2004.
Hiles, "All MHS Use Cases," Digital Home Working Group, v0.5, Feb. 27, 2004, pp. 1-259.
"Allegro Media Server Lets Users Stream iTunes," Online Reporter, Jan. 24, 2004.
Declaration of Kevin Almeroth, Ph.D., with regard to U.S. Pat. No. 8,028,323, Apr. 20, 2014 (Inter Partes Review No. IPR2014-00709), 32 pages.
Declaration of Kevin Almeroth, Ph.D., with regard to U.S. Pat. No. 8,214,873, May 1, 2014 (Inter Partes Review No. IPR2014-00723), 32 pages.
Declaration of Kevin Almeroth, Ph.D., with regard to U.S. Pat. No. 8,230,099, Apr. 30, 2014 (Inter Partes Review No. IPR2014-00711), 33 pages.
"AltaVista Radio Now Available on 3Com Kerbango Internet Tuning Service—The Heart of the Soon to be Released Kerbango Internet Radio," San Francisco, Sep. 21, 2000, NAB Radio Show, 3 pages.

(56) References Cited

OTHER PUBLICATIONS

"Amazon.com: Kerbango 100E Internet Radio: MP3 Players & Accessories," Amazon.com, first available Sep. 4, 1999) printed Sep. 2, 2013.
Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.
"Anthem—Overview," at <http://www.intercastingcorp.com/platform/anthem>, copyright 2004-2007, Intercasting Corp., printed Jan. 16, 2008, 2 pages.
"Apogee claims to be first with content-based billing.(Apogee Networks)(Brief Article)(Product Announcement)," New Media Age, HighBeam Research, Mar. 8, 2001.
"Apogee unveils platform for accurate billing of WAP-based Internet service.(Company Business and Marketing)(Brief Article)," Telecomworldwire, HighBeam Research, Mar. 1, 2001.
"Apple—iPod + iTunes," at <http://www.apple.com/itunes/>, copyright 2007 by Paramount Pictures, printed Feb. 7, 2007, 2 pages.
"Apple—iPod classic," at <http://www.apple.com/ipodclassic/>, printed Oct. 26, 2007, 1 page.
"Arcadyan Ships First Digital Media Receiver for European Market," Business Wire, Dec. 17, 2003.
Caesar, Matthew, "Architecture of iMode," Apr. 3, 2002.
Ramanathan, et al., "Architectures for Personalized Multimedia," IEEE MultiMedia (1994), vol. 1, Issue 1, 10 pages.
"Arrakis Digilink DC4-100," Protocol Update—Jul. 10, 2000, Arrakis Systems, Inc., 2 pages.
"Audio Point: Welcome to the Coolest Way to Listed to Digital Music Over Your Conventional Stereo Equipment," Home Director, Inc., Revision Sep. 2002, 2 pages.
Dipert, B., ed., "Audio Receivers Tune In to Binary Broadcasts," Apr. 26, 2001, 5 pages.
Bloom, B., "Audio Request ARQ1-20 Home MP3/CD Player/Recorder With HD Storage," Equipment Review No. 2, Mar./Apr. 2001, Audiophile Audition, 7 pages.
"Audio Request: Music the Way You Want It," Copyright 2001, ReQuest, Inc., 75 pages.
"Audio ReQuest User Manual: ReQuest Serious Play," Copyright 2005, ReQuest, Inc., 44 pages.
"Audio ReQuest Users Manual for ARQTera ARQFusion ARQnitro ARQ2 Pro ARQ Zone ARQ1 Pro," ReQuest, Inc., date unknown, 63 pages.
"Audio: 1 Sample Service Template for UPnP Version 1.0," Contributing Members of the UPnP Forum, 2001.
"AudioTron: Digital Music Player for Home Networks—Accessories," Turtle Beach Connected Audio, Feb. 12, 2003 (Archived at http://web.archive.org/web/20030212144240/http://www.turtlebeach.com/site/products/audiotron/accessories.asp) 2 pages.
"AudioTron: Digital Music Player for Home Networks—Accessories," Turtle Beach Connected Audio, Aug. 6, 2002 (Archived at http://web.archive.org/web/20020806183335/http://www.turtlebeach.com/site/products/audiotron/accessories.asp) 2 pages.
"AudioTron Digital Music and Internet Radio Player—Reference Manual," AudioTron Reference Manual, Version 3.0, May 2002, Copyright 2002 Voyetra Turtle Beach, Inc., 70 pages.
Heathering, B., "AudioTron Digital Music Player," Feb. 24, 2003, Home Toys Inc. Copyright 1996-2002 (Archived at http://web.archive.org. . .www.hometoys.com/htinews/apr01/reviews/audiotron/audiotron.com) 2 pages.
"AudioTron: Digital Music Player for Home Networks," Turtle Beach Connected Audio, Apr. 1, 2003 (Archived at http://web.archive.org/web/20030401095445/http://www.turtlebeach.com/site/products/audiotron/producthome.asp) 2 pages.
"AudioTron: Digital Music Player for Home Networks—Frequently Asked Questions," Turtle Beach Connected Audio, Feb. 12, 2003 (Archived at http://web.archive.org/web/20030212144110/http://www.turtlebeach.com/site/products/audiotron/faqs.asp) 10 pages.
"AudioTron: Digital Music Player for Home Networks—In Detail," Turtle Beach Connected Audio, Apr. 1, 2003 (Archived at http://web.archive.org/web/20030401211824/http://www.turtlebeach.com/site/products/audiotron/indetail.asp) 2 pages.
"AudioTron: Digital Music Player for Home Networks—In Detail," Turtle Beach Connected Audio, Jun. 9, 2002 (Archived at http://web.archive.org/web/20020609155522/http://www.turtlebeach.com/site/products/audiotron/indetail.asp) 2 pages.
"AudioTron: Digital Music Player for Home Networks—Partner Products," Turtle Beach Connected Audio, Feb. 2, 2003 (Archived at http://web.archive.org/web/20030202062712/http://www.turtlebeach.com/site/products/audiotron/partners.asp) 2 pages.
"AudioTron: Digital Music Player for Home Networks—Product Downloads," Turtle Beach Connected Audio, Aug. 7, 2002 (Archived at http://web.archive.org/web/20020807224358/http://www.turtlebeach.com/site/products/audiotron/downloads.asp) 1 page.
"AudioTron: Digital Music Player for Home Networks—Products & Awards," Turtle Beach Connected Audio, Feb. 10, 2003 (Archived at http://web.archive.org/web/20030210104730/http://www.turtlebeach.com/site/products/audiotron/reviews.asp) 3 pages.
"AudioTron: Digital Music Player for Home Networks—Product Reviews & Awards," Turtle Beach Connected Audio, Aug. 6, 2002 (Archived at http://web.archive.org/web/20020806184002/http://www.turtlebeach.com/site/products/audiotron/reviews.asp) 3 pages.
"AudioTron Setup Guide—Digital Music Player for Home Networks," Copyright 2001-2002, Voyetra Turtle Beach, Inc., 38 pages.
"AudioTron: Digital Music Player for Home Networks—Specifications," Turtle Beach Connected Audio, Feb. 2, 2003 (Archived at http://web.archive.org/web/20030202062309/http://www.turtlebeach.com/site/products/audiotron/specs.asp) 2 pages.
"AudioTron: Digital Music Player for Home Networks—Specifications," Turtle Beach Connected Audio, Aug. 6, 2002 (Archived at http://web.archive.org/web/20020806184248/http://www.turtlebeach.com/site/products/audiotron/specs.asp) 2 pages.
"AudioTron: Digital Music Player for Home Networks—Requirements," Turtle Beach Connected Audio, Feb. 2, 2003 (Archived at http://web.archive.org/web/20030202063415/http://www.turtlebeach.com/site/products/audiotron/whatdoineed.asp) 2 pages.
"AudioTron: Digital Music Player for Home Networks—System Requirements," Turtle Beach Connected Audio, Apr. 9, 2002 (Archived at http://web.archive.org/web/20020409132409/http://www.turtlebeach.com/site/products/audiotron/whatdoineed.asp) 1 page.
"AudioTron: Digital Music Player for Home Networks—Top 10 Things to Look at Before You Buy a Digital Audio Receiver," Turtle Beach Connected Audio, Feb. 28, 2003 (Archived at http://web.archive.org/web/20030228031931/http://www.turtlebeach.com/site/products/audiotron/comparisons.asp) 2 pages.
"AudioTron: Digital Music Player for Home Networks—User Comments," Turtle Beach Connected Audio, Feb. 12, 2003 (Archived at http://web.archive.org/web/20030212144608/http://www.turtlebeach.com/site/products/audiotron/feedback.asp) 2 pages.
"AudioTron: Digital Music Player for Home Networks—User Comments," Turtle Beach Connected Audio, Aug. 7, 2002 (Archived at http://web.archive.org/web/20020807224930/http://www.turtlebeach.com/site/products/audiotron/feedback.asp) 2 pages.
"AudioTron: Digital Music Player for Home Networks—Product Downloads," Turtle Beach Connected Audio, Feb. 12, 2003 (Archived at http://web.archive.org/web/20030212145129/http://www.turtlebeach.com/site/products/audiotron/downloads.asp) 1 page.
"AvantGo arrives in UK.(Industry Trend or Event), (Brief Article)," New Media Age, HighBeam Research, Nov. 30, 2000.
AVS Forum, "CD Changers (200-300)," Jul. 22, 2000, 4 pages.
Buerk, L., et al, "AVTransport: 1 Service Template Version 1.01," For UPnP Version 1.0, Standardized DCP, Jun. 25, 2002, UPnP Forum, 67 pages.
"AVTransport:1 Service, Annex A—Control Point Requirements," for UPnP Version 1.0, Standardized DCP Annex, Oct. 6, 2010, Service Template Version: 2:00, 4 pages.

(56) References Cited

OTHER PUBLICATIONS

"AVTransport:2 Service Template Version 1.01," for UPnP Version 1.0, Standardized DCP, Sep. 30, 2008, Document Version 1.0, 96 pages.
"AVTransport:2 Service, Annex A—Control Point Requirements," for UPnP Version 1.0, Standardized DCP Annex, Oct. 6, 2010, Service Template Version: 2.00, 5 pages.
"AVTransport:3 Service," For UPnP Version 1.0, Standardized DCP (SDCP), Dec. 31, 2010, Service Template Version 1.01, 131 pages.
"AVTransport1.SyntaxTests.xml," date unknown, 3 pages.
"AVTransport1.xml," date unknown, 7 pages.
"AVTransport2.SyntaxTests.xml," date unknown, 4 pages.
"AVTransport2.xml," date unknown, 12 pages.
"Basic:1.0 Device Definition Version 1.0 for UPnP Version 1.0," Contributing Members of the UPnP Forum, 2002.
"BasicManagement:1 Service Template Version 1.01," For UPnP Version 1.0, Standardized DCP (SDCP) Jul. 20, 2010, 72 pages.
"BasicManagement:2 Service Template Version 1.01," for UPnP Version 1.0, Standardized DCP (SDCP) Feb. 16, 2012, 145pages.
Dismissal Order in *Black Hills Media, LLC* v. *Yamaha Corp. of America*, Case No. 2:13-cv-06054 (C.D. Cal.) Dated Jan. 14, 2014, 7 pages.
Order Staying *Black Hills Media, LLC* v. *Yahama Corp. of America*, Case No. 8:14-cv-00101 (C.D. Cal.) dated May 8, 2014, 9 pages.
2:14-cv-471—*BHM* v. *Pioneer Corporation, et al.*—Pioneer/Yamaha Courtesy Invalidity Contentions—Exhibit E-1—Janik Chart—U.S. Patent Publication No. 2002/0068558 to Janik, in view of U.S Patent Publication No. 2002/0065902 to Janik, directed to U.S. Pat. No. 8,214,873 to Weel, Jan. 29, 2014, 5 pages.
2:14-cv-471—*BHM* v. *Pioneer Corporation, et al.*—Pioneer/Yamaha Courtesy Invalidity Contentions—Exhibit E-10d—cd3o Device Chart—cd3o System, directed to U.S. Pat. No. 8,214,873 to Weel, Jan. 29, 2014, 22 pages.
2:14-cv-471—*BHM* v. *Pioneer Corporation, et al.*—Pioneer/Yamaha Courtesy Invalidity Contentions—Exhibit E-10m—cd3o Manual Chart—cd3o Network MP3 Player Product Manual, directed to U.S. Pat. No. 8,214,873 to Weel, Jan. 29, 2014, 8 pages.
2:14-cv-471—*BHM* v. *Pioneer Corporation, et al.*—Pioneer/Yamaha Courtesy Invalidity Contentions—Exhibit E-11d—Lansonic DAS-750 Device Chart—Lansonic DAS-750 System, directed to U.S. Pat. No. 8,214,873 to Weel Jan. 29, 2014, 26 pages.
2:14-cv-471—*BHM* v. *Pioneer Corporation, et al.*—Pioneer/Yamaha Courtesy Invalidity Contentions—Exhibit E-11m—Lansonic DAS-750 Manual Chart—Lansonic Digital Audio Server Operating Instructions Version 2.2.0 DAS-750-PRO, directed to U.S. Pat. No. 8,214,873 to Weel Jan. 29, 2014, 7 pages.
2:14-cv-471—*BHM* v. *Pioneer Corporation, et al.*—Pioneer/Yamaha Courtesy Invalidity Contentions—Exhibit E-12d—Lansonic DAS-950 Device Chart—Lansonic DAS-950 System, directed to U.S. Pat. No. 8,214,873 to Weel Jan. 29, 2014, 24 pages.
2:14-cv-471—*BHM* v. *Pioneer Corporation, et al.*—Pioneer/Yamaha Courtesy Invalidity Contentions—Exhibit E-12p—Lansonic DAS-950 Archived Web Chart—Lansonic DAS-950 Pro Series Archived Web Page dated Feb. 2, 2002, directed to U.S. Pat. No. 8,214,873 to Weel Jan. 29, 2014, 17 pages.
2:14-cv-471—*BHM* v. *Pioneer Corporation, et al.*—Pioneer/Yamaha Courtesy Invalidity Contentions—Exhibit E-13—Juszkiewicz Chart—U.S. Pat. No. 7,249,147 to Juszkiewicz, directed to U.S. Pat. No. 8,214,873 to Weel, Jan. 29, 2014, 8 pages.
2:14-cv-471—*BHM* v. *Pioneer Corporation, et al.*—Pioneer/Yamaha Courtesy Invalidity Contentions—Exhibit E-14—IEEE 2003 Article Chart—Non-Patent Literature Document entitled, "Streaming Multimedia Content Over Home Network With an Intelligent Controller," (IEEE 2003 Article) directed to U.S. Pat. No. 8,214,873 to Weel, Jan. 29, 2014, 24 pages.
2:14-cv-471—*BHM* v. *Pioneer Corporation, et al.*—Pioneer/Yamaha Courtesy Invalidity Contentions—Exhibit E-2—Bi + Erekson Chart—U.S. Patent Publication No. 2002/0087996 to Bi, et al. in view of U.S. Pat. No. 6,622,018 to Erekson, directed to U.S. Pat. No. 8,214,873 to Weel, Jan. 29, 2014, 4 pages.
2:14-cv-471—*BHM* v. *Pioneer Corporation, et al.*—Pioneer/Yamaha Courtesy Invalidity Contentions—Exhibit E-3—Berman + Van Ryzin Chart—U.S. Pat. No. 6,502,194 to Berman, et al. in view of U.S. Pat. No. 6,127,941 to Van Ryzin, directed to U.S. Pat. No. 8,214,873 to Weel, Jan. 29, 2014, 4 pages.
2:14-cv-471—*BHM* v. *Pioneer Corporation, et al.*—Pioneer/Yamaha Courtesy Invalidity Contentions—Exhibit E-4—UPnP AV 1.0 Chart—Non-Patent Literature Document entitled, "UPnP AV Architecture:1," directed to U.S. Pat. No. 8,214,873 to Weel, Jan. 29, 2014, 28 pages.
2:14-cv-471—*BHM* v. *Pioneer Corporation, et al.*—Pioneer/Yamaha Courtesy Invalidity Contentions—Exhibit E-5—Encarnacion Chart—U.S. Pat. No. 7,668,939 to Encarnacion, directed to U.S. Pat. No. 8,214,873 to Weel, Jan. 29, 2014, 30 pages.
2:14-cv-471—*BHM* v. *Pioneer Corporation, et al.*—Pioneer/Yamaha Courtesy Invalidity Contentions—Exhibit E-6—Weast Chart—U.S. Pat. No. 7,454,511 to Weast, directed to U.S. Pat. No. 8,214,873 to Weel, Jan. 29, 2014, 20 pages.
2:14-cv-471—*BHM* v. *Pioneer Corporation, et al.*—Pioneer/Yamaha Courtesy Invalidity Contentions—Exhibit E-7—Chen Chart—U.S. Patent Publication No. 2002/0170062 to Chen, directed to U.S. Pat. No. 8,214,873 to Weel, Jan. 29, 2014, 29 pages.
2:14-cv-471—*BHM* v. *Pioneer Corporation, et al.*—Pioneer/Yamaha Courtesy Invalidity Contentions—Exhibit E-8—Khedouri Chart—U.S. Pat. No. 8,160,495 to Khedouri, directed to U.S. Pat. No. 8,214,873 to Weel, Jan. 29, 2014, 30 pages.
2:14-cv-471—*BHM* v. *Pioneer Corporation, et al.*—Pioneer/Yamaha Courtesy Invalidity Contentions—Exhibit E-9d—TurtleBeach AudioTron Device Chart—TurtleBeach AudioTron System, directed to U.S. Pat. No. 8,214,873 to Weel, Jan. 29, 2014, 41 pages.
2:14-cv-471—*BHM* v. *Pioneer Corporation, et al.*—Pioneer/Yamaha Courtesy Invalidity Contentions—Exhibit E-9m—TurtleBeach AudioTron Manual Chart—TurtleBeach AudioTron Reference Manual, directed to U.S. Pat. No. 8,214,873 to Weel, Jan. 29, 2014, 17 pages.
2:14-cv-471—*BHM* v. *Pioneer Corporation, et al.*—Pioneer/Yamaha Courtesy Invalidity Contentions—Exhibit F-1—Bi Chart—U.S. Patent Publication No. 2002/0087996 to Bi, et al., directed to U.S. Pat. No. 8,230,099 to Weel, Jan. 29, 2014, 5 pages.
2:14-cv-471—*BHM* v. *Pioneer Corporation, et al.*—Pioneer/Yamaha Courtesy Invalidity Contentions—Exhibit F-10d—TurtleBeach AudioTron Device Chart—TurtleBeach AudioTron System, directed to U.S. Pat. No. 8,230,099 to Weel, Jan. 29, 2014, 28 pages.
2:14-cv-471—*BHM* v. *Pioneer Corporation, et al.*—Pioneer/Yamaha Courtesy Invalidity Contentions—Exhibit F-10m—TurtleBeach AudioTron Manual Chart—TurtleBeach AudioTron Reference Manual, directed to U.S. Pat. No. 8,230,099 to Weel, Jan. 29, 2014, 10 pages.
2:14-cv-471—*BHM* v. *Pioneer Corporation, et al.*—Pioneer/Yamaha Courtesy Invalidity Contentions—Exhibit F-11d—cd3o Device Chart—cd3o System, directed to U.S. Pat. No. 8,230,099 to Weel, Jan. 29, 2014, 17 pages.
2:14-cv-471—*BHM* v. *Pioneer Corporation, et al.*—Pioneer/Yamaha Courtesy Invalidity Contentions—Exhibit F-11m—cd3o Manual Chart—cd3o Network MP3 Player Product Manual, directed to U.S. Pat. No. 8,230,099 to Weel, Jan. 29, 2014, 7 pages.
2:14-cv-471—*BHM* v. *Pioneer Corporation, et al.*—Pioneer/Yamaha Courtesy Invalidity Contentions—Exhibit F-12d—Lansonic DAS-750 Device Chart—Lansonic DAS-750 System, directed to U.S. Pat. No. 8,230,099 to Weel Jan. 29, 2014, 17 pages.
2:14-cv-471—*BHM* v. *Pioneer Corporation, et al.*—Pioneer/Yamaha Courtesy Invalidity Contentions—Exhibit F-12m—Lansonic DAS-750 Manual Chart—Lansonic Digital Audio Server Operating Instructions Version 2.2.0 DAS-750-PRO, directed to U.S. Pat. No. 8,230,099 to Weel Jan. 29, 2014, 6 pages.
2:14-cv-471—*BHM* v. *Pioneer Corporation, et al.*—Pioneer/Yamaha Courtesy Invalidity Contentions—Exhibit F-13d—Lansonic DAS-950 Device Chart—Lansonic DAS-950 System, directed to U.S. Pat. No. 8,230,099 to Weel Jan. 29, 2014, 16 pages.

(56) References Cited

OTHER PUBLICATIONS

2:14-cv-471—*BHM* v. *Pioneer Corporation, et al.*—Pioneer/Yamaha Courtesy Invalidity Contentions—Exhibit F-13p—Lansonic DAS-950 Archived Web Chart—Lansonic DAS-950 Pro Series Archived Web Page dated Feb. 2, 2002, directed to U.S. Pat. No. 8,230,099 to Weel Jan. 29, 2014, 16 pages.
2:14-cv-471—*BHM* v. *Pioneer Corporation, et al.*—Pioneer/Yamaha Courtesy Invalidity Contentions—Exhibit F-14—Juszkiewicz Chart—U.S. Pat. No. 7,249,147 to Juszkiewicz, directed to U.S. Pat. No. 8,230,099 to Weel, Jan. 29, 2014, 9 pages.
2:14-cv-471—*BHM* v. *Pioneer Corporation, et al.*—Pioneer/Yamaha Courtesy Invalidity Contentions—Exhibit F-15—IEEE 2003 Chart—Non-Patent Literature Document entitled, "Streaming Multimedia Content Over Home Network With an Intelligent Controller," (IEEE 2003 Article) directed to U.S. Pat. No. 8,230,099 to Weel, Jan. 29, 2014, 14 pages.
2:14-cv-471—*BHM* v. *Pioneer Corporation, et al.*—Pioneer/Yamaha Courtesy Invalidity Contentions—Exhibit F-2—Gladwin Chart—WIPO Publication No. WO 01/17142 to Gladwin, et al., directed to U.S. Pat. No. 8,230,099 to Weel, Jan. 29, 2014, 5 pages.
2:14-cv-471—*BHM* v. *Pioneer Corporation, et al.*—Pioneer/Yamaha Courtesy Invalidity Contentions—Exhibit F-3—Berman Chart—U.S. Pat. No. 6,502,194 to Berman, et al., directed to U.S. Pat. No. 8,230,099 to Weel, Jan. 29, 2014, 6 pages.
2:14-cv-471—*BHM* v. *Pioneer Corporation, et al.*—Pioneer/Yamaha Courtesy Invalidity Contentions—Exhibit F-4—Janik + Janik Chart—U.S. Patent Publication No. 2002/0068558 to Janik, in view of U.S. Patent Publication No. 2002/0065902 to Janik, et al., directed to U.S. Pat. No. 8,230,099 to Weel, Jan. 29, 2014, 6 pages.
2:14-cv-471—*BHM* v. *Pioneer Corporation, et al.*—Pioneer/Yamaha Courtesy Invalidity Contentions—Exhibit F-5—UPnP AV 1.0 Chart—Non-Patent Literature Document entitled, "UPnP AV Architecture:1," directed to U.S. Pat. No. 8,230,099 to Weel, Jan. 29, 2014, 24 pages.
2:14-cv-471—*BHM* v. *Pioneer Corporation, et al.*—Pioneer/Yamaha Courtesy Invalidity Contentions—Exhibit F-6—Allen Chart—U.S. Pat. No. 7,428,023 to Allen, directed to U.S. Pat. No. 8,230,099 to Weel, Jan. 29, 2014, 25 pages.
2:14-cv-471—*BHM* v. *Pioneer Corporation, et al.*—Pioneer/Yamaha Courtesy Invalidity Contentions—Exhibit F-7—Champion Chart—U.S. Pat. No. 8,230,099 to Champion, directed to U.S. Pat. No. 8,230,099 to Weel, Jan. 29, 2014, 10 pages.
2:14-cv-471—*BHM* v. *Pioneer Corporation, et al.*—Pioneer/Yamaha Courtesy Invalidity Contentions—Exhibit F-8—Janik Chart—U.S. Pat. No. 7,130,616 to Janik, directed to U.S. Pat. No. 8,230,099 to Weel, Jan. 29, 2014, 16 pages.
2:14-cv-471—*BHM* v. *Pioneer Corporation, et al.*—Pioneer/Yamaha Courtesy Invalidity Contentions—Exhibit F-9—Sound Blaster Chart—Non-Patent Literature Document entitled, "Creative Sound Blaster Wireless Music User's Guide Version 1.0," directed to U.S. Pat. No. 8,230,099 to Weel, Jan. 29, 2014, 36 pages.
2:14-cv-471—*BHM* v. *Pioneer Corporation, et al.*—Pioneer/Yamaha Courtesy Invalidity Contentions—Exhibit G-1—Bi Chart—U.S. Patent Publication No. 2002/0087996 to Bi, et al., directed to U.S. Pat. No. 8,458,356 to Weel, Jan. 29, 2014, 4 pages.
2:14-cv-471—*BHM* v. *Pioneer Corporation, et al.*—Pioneer/Yamaha Courtesy Invalidity Contentions—Exhibit G-10—TurtleBeach AudioTron Device Chart—TurtleBeach AudioTron System, directed to U.S. Pat. No. 8,458,356 to Weel, Jan. 29, 2014, 15 pages.
2:14-cv-471—*BHM* v. *Pioneer Corporation, et al.*—Pioneer/Yamaha Courtesy Invalidity Contentions—Exhibit G-10m—TurtleBeach AudioTron Manual Chart—TurtleBeach AudioTron Reference Manual, directed to U.S. Pat. No. 8,458,356 to Weel, Jan. 29, 2014, 5 pages.
2:14-cv-471—*BHM* v. *Pioneer Corporation, et al.*—Pioneer/Yamaha Courtesy Invalidity Contentions—Exhibit G-11d—cd3o Device Chart—cd3o System, directed to U.S. Pat. No. 8,458,356 to Weel, Jan. 29, 2014, 9 pages.
2:14-cv-471—*BHM* v. *Pioneer Corporation, et al.*—Pioneer/Yamaha Courtesy Invalidity Contentions—Exhibit G-11m—cd3o Manual Chart—cd3o Network MP3 Player Product Manual, directed to U.S. Pat. No. 8,458,356 to Weel, Jan. 29, 2014, 5 pages.
2:14-cv-471—*BHM* v. *Pioneer Corporation, et al.*—Pioneer/Yamaha Courtesy Invalidity Contentions—Exhibit G-12d—Lansonic DAS-750 Device Chart—Lansonic DAS-750 System, directed to U.S. Pat. No. 8,458,356 to Weel Jan. 29, 2014, 10 pages.
2:14-cv-471—*BHM* v. *Pioneer Corporation, et al.*—Pioneer/Yamaha Courtesy Invalidity Contentions—Exhibit G-12m—Lansonic DAS-750 Manual Chart—Lansonic Digital Audio Server Operating Instructions Version 2.2.0 DAS-750-PRO, directed to U.S. Pat. No. 8,458,356 to Weel Jan. 29, 2014, 4 pages.
2:14-cv-471—*BHM* v. *Pioneer Corporation, et al.*—Pioneer/Yamaha Courtesy Invalidity Contentions—Exhibit G-13d—Lansonic DAS-950 Device Chart—Lansonic DAS-950 System, directed to U.S. Pat. No. 8,458,356 to Weel Jan. 29, 2014, 10 pages.
2:14-cv-471—*BHM* v. *Pioneer Corporation, et al.*—Pioneer/Yamaha Courtesy Invalidity Contentions—Exhibit G-13M—Lansonic DAS-950 Archived Web Chart—Lansonic DAS-950 Pro Series Archived Web Page dated Feb. 2, 2002, directed to U.S. Pat. No. 8,458,356 to Weel Jan. 29, 2014, 10 pages.
2:14-cv-471—*BHM* v. *Pioneer Corporation, et al.*—Pioneer/Yamaha Courtesy Invalidity Contentions—Exhibit G-14—Juszkiewicz Chart—U.S. Pat. No. 7,249,147 to Juszkiewicz, directed to U.S. Pat. No. 8,458,356 to Weel, Jan. 29, 2014, 10 pages.
2:14-cv-471—*BHM* v. *Pioneer Corporation, et al.*—Pioneer/Yamaha Courtesy Invalidity Contentions—Exhibit G-15—IEEE 2003 Chart—Non-Patent Literature Document entitled, "Streaming Multimedia Content Over Home Network With an Intelligent Controller," (IEEE 2003 Article) directed to U.S. Pat. No. 8,458,356 to Weel, Jan. 29, 2014, 12 pages.
2:14-cv-471—*BHM* v. *Pioneer Corporation, et al.*—Pioneer/Yamaha Courtesy Invalidity Contentions—Exhibit G-2—Gladwin Chart—WIPO Publication No. WO 01/17142 to Gladwin, et al., directed to U.S. Pat. No. 8,458,356 to Weel, Jan. 29, 2014, 3 pages.
2:14-cv-471—*BHM* v. *Pioneer Corporation, et al.*—Pioneer/Yamaha Courtesy Invalidity Contentions—Exhibit G-3—Berman Chart—U.S. Pat. No. 6,502,194 to Berman, et al., directed to U.S. Pat. No. 8,458,356 to Weel, Jan. 29, 2014, 3 pages.
2:14-cv-471—*BHM* v. *Pioneer Corporation, et al.*—Pioneer/Yamaha Courtesy Invalidity Contentions—Exhibit G-4—Janik + Janik Chart—U.S. Patent Publication No. 2002/0068558 to Janik, in view of U.S. Patent Publication No. 2002/0065902 to Janik, et al., directed to U.S. Pat. No. 8,458,356 to Weel, Jan. 29, 2014, 6 pages.
2:14-cv-471—*BHM* v. *Pioneer Corporation, et al.*—Pioneer/Yamaha Courtesy Invalidity Contentions—Exhibit G-5—UPnP AV 1.0 Chart—Non-Patent Literature Document entitled, "UPnP AV Architecture:1," directed to U.S. Pat. No. 8,458,356 to Weel, Jan. 29, 2014, 16 pages.
2:14-cv-471—*BHM* v. *Pioneer Corporation, et al.*—Pioneer/Yamaha Courtesy Invalidity Contentions—Exhibit G-6—Janik Chart—U.S. Pat. No. 7,130,616 to Janik, directed to U.S. Pat. No. 8,458,356 to Weel, Jan. 29, 2014, 10 pages.
2:14-cv-471—*BHM* v. *Pioneer Corporation, et al.*—Pioneer/Yamaha Courtesy Invalidity Contentions—Exhibit G-7—Sound Blaster Chart—Non-Patent Literature Document entitled, "Creative Sound Blaster Wireless Music User's Guide Version 1.0," directed to U.S. Pat. No. 8,458,356 to Weel, Jan. 29, 2014, 33 pages.
2:14-cv-471—*BHM* v. *Pioneer Corporation, et al.*—Pioneer/Yamaha Courtesy Invalidity Contentions—Exhibit G-8—Allen Chart—U.S. Pat. No. 7,428,023 to Allen, directed to U.S. Pat. No. 8,458,356 to Weel, Jan. 29, 2014, 15 pages.
2:14-cv-471—*BHM* v. *Pioneer Corporation, et al.*—Pioneer/Yamaha Courtesy Invalidity Contentions—Exhibit G-9—Champion Chart—U.S. Pat. No. 8,458,356 to Champion, directed to U.S. Pat. No. 8,458,356 to Weel, Jan. 29, 2014, 6 pages.
2:14-cv-471—*BHM* v. *Pioneer Corporation, et al.*—Pioneer/Yamaha Courtesy Invalidity Contentions—Exhibit H-10d—'323—TurtleBeach AudioTron Device Chart—TurtleBeach AudioTron System, directed to U.S. Pat. No. 8,028,323 to Weel, Jan. 29, 2014, 27 pages.

(56) References Cited

OTHER PUBLICATIONS

2:14-cv-471—*BHM* v. *Pioneer Corporation, et al.*—Pioneer/Yamaha Courtesy Invalidity Contentions—Exhibit H-10m—'323—TurtleBeach AudioTron Manual Chart—TurtleBeach AudioTron Reference Manual, directed to U.S. Pat. No. 8,028,323 to Weel, Jan. 29, 2014, 12 pages.
2:14-cv-471—*BHM* v. *Pioneer Corporation, et al.*—Pioneer/Yamaha Courtesy Invalidity Contentions—Exhibit H-11d—'323—Lansonic DAS-750 Device Chart—Lansonic DAS-750 System, directed to U.S. Pat. No. 8,028,323 to Weel Jan. 29, 2014, 16 pages.
2:14-cv-471—*BHM* v. *Pioneer Corporation, et al.*—Pioneer/Yamaha Courtesy Invalidity Contentions—Exhibit H-11m—'323—Lansonic DAS-750 Manual Chart—Lansonic Digital Audio Server Operating Instructions Version 2.2.0 DAS-750-PRO, directed to U.S. Pat. No. 8,028,323 to Weel Jan. 29, 2014, 5 pages.
2:14-cv-471—*BHM* v. *Pioneer Corporation, et al.*—Pioneer/Yamaha Courtesy Invalidity Contentions—Exhibit H-12d—'323—Lansonic DAS-950 Device Chart—Lansonic DAS-950 System, directed to U.S. Pat. No. 8,028,323 to Weel Jan. 29, 2014, 16 pages.
2:14-cv-471—*BHM* v. *Pioneer Corporation, et al.*—Pioneer/Yamaha Courtesy Invalidity Contentions—Exhibit H-12P—'323—Lansonic DAS-950 Archived Web Chart—Lansonic DAS-950 Pro Series Archived Web Page dated Feb. 2, 2002, directed to U.S. Pat. No. 8,028,323 to Weel Jan. 29, 2014, 12 pages.
2:14-cv-471—*BHM* v. *Pioneer Corporation, et al.*—Pioneer/Yamaha Courtesy Invalidity Contentions—Exhibit H-1d—'323—cd3o Device Chart—cd3o System, directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-1m—'323—cd3o Manua Chart—cd3o Network MP3 Player Product Manual, directed to U.S. Pat. No. 8,028,323 to Weel, Jan. 29, 2014, 6 pages.
2:14-cv-471—*BHM* v. *Pioneer Corporation, et al.*—Pioneer/Yamaha Courtesy Invalidity Contentions—Exhibit H-2—'323—Janik + Janik Chart—U.S. Patent Publication No. 2002/0068558 to Janik, in view of U.S. Patent Publication No. 2002/0065902 to Janik, et al., directed to U.S. Pat. No. 8,028,323 to Weel, Jan. 29, 2014, 4 pages.
2:14-cv-471—*BHM* v. *Pioneer Corporation, et al.*—Pioneer/Yamaha Courtesy Invalidity Contentions—Exhibit H-3—'323—Bi Chart—U.S. Patent Publication No. 2002/0087996 to Bi, et al., directed to U.S. Pat. No. 8,028,323 to Weel, Jan. 29, 2014, 3 pages.
2:14-cv-471—*BHM* v. *Pioneer Corporation, et al.*—Pioneer/Yamaha Courtesy Invalidity Contentions—Exhibit H-4—'323—Berman + Van Ryzin Chart—U.S. Pat. No. 6,502,194 to Berman, et al. in view of U.S. Pat. No. 6,127,941 to Van Ryzin, directed to U.S. Pat. No. 8,028,323 to Weel, Jan. 29, 2014, 4 pages.
2:14-cv-471—*BHM* v. *Pioneer Corporation, et al.*—Pioneer/Yamaha Courtesy Invalidity Contentions—Exhibit H-5—'323—UPnP AV 1.0 Chart—Non-Patent Literature Document entitled, "UPnP AV Architecture:1," directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-6—'323—Encarnacion Chart—U.S. Pat. No. 7,668,939 to Encarnacion, directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-7—'323—Weast Chart—U.S. Pat. No. 7,454,511 to Weast, directed to U.S. Pat. No. 8,028,323 to Weel, Jan. 29, 2014, 13 pages.
2:14-cv-471—*BHM* v. *Pioneer Corporation, et al.*—Pioneer/Yamaha Courtesy Invalidity Contentions—Exhibit H-8—'323—Chen Chart—U.S. Patent Publication No. 2002/0170062 to Chen, directed to U.S. Pat. No. 8,028,323 to Weel, Jan. 29, 2014, 20 pages.
2:14-cv-471—*BHM* v. *Pioneer Corporation, et al.*—Pioneer/Yamaha Courtesy Invalidity Contentions—Exhibit H-9—'323—Khedouri Chart—U.S. Pat. No. 8,160,495 to Khedouri, directed to U.S. Pat. No. 8,028,323 to Weel, Jan. 29, 2014, 21 pages.

"Billboard Music Charts—Latest Music News—Music Videos," http://www.billboard.com/bbcom/index.jsp, printed Feb. 7, 2007, 2 pages.
"BinaryLight:1 Device Template Version 1.01," for UPnP Version 1.0, Standardized DCP, Nov. 23, 2003, 7 pages.
Pique, J. G., et al., "Bluetooth," date unknown, 12 pages.
Kardach, "Bluetooth Architecture Overview," Intel Corporation, Technology Journal Q2, 2000, 7 pages.
Kansal, "Bluetooth Primer," Copyright 2002, Red-M, 30 pages.
"Specification of the Bluetooth System," Specification vol. 1, v1.0 B, Bluetooth, Dec. 1, 1999 (Part H1) 255pages.
"Specification of the Bluetooth System," Specification vol. 1, v1.0 B, Bluetooth, Dec. 1, 1999 (Parts A-B) 182 pages.
"Specification of the Bluetooth System," Specification vol. 1, v1.0 B, Bluetooth, Dec. 1, 1999 (Parts C-D) 150 pages.
"Specification of the Bluetooth System," Specification vol. 1, v1.0 B, Bluetooth, Dec. 1, 1999 (Parts E-F) 207 pages.
"Specification of the Bluetooth System," Specification vol. 1, v1.0 B, Bluetooth, Dec. 1, 1999 (Parts H2-H4) 57 pages.
"Specification of the Bluetooth System," Specification vol. 1, v1.0 B, Bluetooth, Dec. 1, 1999 (Parts I—Index) 290 pages.
"Bluetooth White Paper 1.1," AU-System, Jan. 2000, 26 pages.
"Bluetooth.com—Learn," http://www.bluetooth.com/Bluetooth/Learn/, copyright 2007 Bluetooth SIG, Inc., printed Oct. 26, 2007, 1 page.
Declaration of V. Michael Bove, Jr., with regard to U.S. Pat. No. 8,214,873, May 16, 2014 (Inter Partes Review No. IPR2014-00766), 41 pages.
Declaration of V. Michael Bove, Jr., with regard to U.S. Pat. No. 8,458,356, May 6, 2014 (Inter Partes Review No. IPR2014-00733), 13 pages.
Declaration of V. Michael Bove, Jr., with regard to U.S. Pat. No. 8,214,873, Sep. 18, 2013 (Inter Partes Review No. IPR2013-00598), 42 pages.
Declaration of V. Michael Bove, Jr., with regard to U.S. Pat. No. 8,230,099, Sep. 18, 2013 (Inter Partes Review No. IPR2013-00597), 35 pages.
"Calendar:1 Service," For UPnP Verson 1.0, Standardized DCP (SDCP) Dec. 10, 2012, Document Version 1.0, Service Template Version 2.00, 39 pages.
"CallManagement:1 Service," For UPnP Verson 1.0, Standardized DCP (SDCP) Mar. 22, 2011, Document Version 1.0, Service Template Version 2.00, 312 pages.
"CallManagement:2 Service," For UPnP Verson 1.0, Standardized DCP (SDCP) Dec. 10, 2012, Document Version 1.0, Service Template Version 2.00, 303 pages.
"CD Player: 1 Sample Service Template for UPnP Version 1.0," Contributing Members of the UPnP Forum, 2001.
"cd3o Network MP3 Player Product Manual," Copyright 2003, cd3o, Inc., 65 pages.
"cd3o Network MP3 Player Quick Installation Guide," cd3o, date unknown, 1 page.
"cd3o Network MP3 Player Voice-Guide Remove Control," cd3o, date unknown, 1 page.
Blackwell, G., "cd3o Wireless Network MP3 Player," date unknown, at least as early as Oct. 12, 2013, (http://www.wi-fiplanet.com/reviews/CD/article.php/3338481/cd3o-Wireless-Network-MP3-Player.htm) 2 pages.
Stone, Glen, "CEA R7.7 Wireless Entertainment Networking," Digital Home Working Group, Aug. 5, 2003.
CEDIA (Custom Electronic Design and Installation Association) Expo 2002, Mineapolis, Sep. 25-29, 2002, Panel, 4 pages.
Jepson, Brian, "Cellular Networking with CDPD," Web Techniques, Nov. 2001.
"ChangeDisc: 1 Sample Service Template for UPnP Version 1.0," Contributing Members of the UPnP Forum, 2000.
"Checklist for UPnP Standard Device Template Version 1.01," Contributing Members of the UPnP Forum, publication date unknown.
"Checklist for UPnP Standard Service Templates Version 1.01," Contributing Members of the UPnP Forum, publication date unknown.

(56) References Cited

OTHER PUBLICATIONS

"Cirrus Logic's Maverick Processor Chosen for Turtle Beach Audiotron Internet Audio Appliance," Cirrus Logic, Inc. Press Release, News Archive 2000, 2 pages.
"CNET Names PRISMIQ MediaPlayer Best of CES," PR Newswire, Jan. 14, 2003, pp. 1-2.
"CNN.com—Breaking News, U.S., World, Weather, Entertainment & Video News," http://www.cnn.com/, copyright 2007 Cable News Network LP, LLLP, printed Feb. 7, 2007, 3 pages.
"CodeName: "Streamer"," Date Unknown, 2 pages.
"Competition Catastrophe: A Device That Will Add 800 Stations to Your Market," Radio Ink, vol. XIV, No. 21—Oct. 11, 1999, 6 pages.
"ConfigurationManagement:1 Service Template Version 1.01," For UPnP Version 1.0, Standardized DCP (SDCP) Jul. 20, 2010, 103 pages.
"ConfigurationManagement:2 Service Template Version 1.01," For UPnP Version 1.0, Standardized DCP (SDCP) Mar. 4, 2013, 160 pages.
Petersson, Justus, "Connected Home—the Home IMS Gateway," Ericsson, Telefonica, Feb. 28, 2007.
"ConnectionManager: 1 Service Template Vrsion 1.01," Contributing Members of the UPnP Forum, Jun. 25, 2002.
"ConnectionManager:1 Service, Annex A—Control Point Requirements," For UPnP Version 1.0, Standardized DCP Annex, Oct. 6, 2010, Service Template Version: 2.00, 4 pages.
"ConnectionManager:2 Service Template Version 1.01," For UPnP Version 1.0, Approved Standard, May 31, 2006, Document Version 1.00, 49 pages.
"ConnectionManager:2 Service, Annex A—Control Point Requirements," For UPnP Version 1.0, Standardized DCP Annex, Oct. 6, 2010, Service Template Version: 2.00, 4 pages.
"ConnectionManager:3 Service," For UPnP Version 1.0, Standardized DCP (SDCP), Dec. 31, 2010, Service Template Version 1.01, 84 pages.
"ConnectionManager1.SyntaxTests.xml," date unknown, 1 page.
"ConnectionManager1.xml," date unknown, 3 pages.
"ConnectionManager2.SyntaxTests.xml," date unknown, 1 page.
"ConnectionManager2.xml," date unknown, 4 pages.
Pope, S. T., et al., "Content Analysis and Queries in a Sound and Music Database," International Computer Music Conference Proceedings (1999) pp. 124-130.
K. Debique, et al., Content Directory:1 Service Template Version 1.01 for UPnP Version 1.0, Standardized DCP, Jun. 25, 2002, Copyright 1999-2002 Contributing Members of the UPnP Forum, 89 pages.
"ContentDirectory:1 Service Annex A—Control Point Requirements," For UPnP Version 1.0, Standardized DCP Annex, Oct. 6, 2010, Service Template Version 2:00, 4 pages.
"ContentDirectory:2 Service Annex A—Control Point Requirements," For UPnP Version 1.0, Standardized DCP Annex, Oct. 6, 2010, Service Template Version 2:00, 4 pages.
"ContentDirectory:2 Service Template Version 1.01," For UPnP Version 1.0, Approved Standard, May 31, 2006, Document Version 1.00, 172 pages.
"ContentDirectory:3 Service Annex A—Control Point Requirements," For UPnP Version 1.0, Standardized DCP Annex, Oct. 6, 2010, Service Template Version 2:00, 5 pages.
"ContentDirectory:3 Service Template Version 1.01," For UPnP Version 1.0, Standardized DCP, Sep. 30, 2008, Document Version 1.00, 248 pages.
"ContentDirectory:4 Service," For UPnP Version 1.0, Standardized DCP (SDCP) Dec. 31, 2010, Service Template Version 1.01, 377 pages.
"ContentDirectory1.SyntaxTests.xml," date unknown, 3 pages.
"ContentDirectory1.xml," date unknown, 6 pages.
"ContentDirectory2.SyntaxTests.xml," date unknown, 3 pages.
"ContentDirectory2.xml," date unknown, 8 pages.
"ContentDirectory3.SyntaxTests.xml," date unknown, 4 pages.
"ContentDirectory3.xml," date unknown, 10 pages.
"ContentSync:1 Service Template Version 1.01, for UPnP Version 1.0," Contributing Members of the UPnP Forum, 2009, 111 pages.
"Continential Automated Buldings Association,Digital Home White Paper, IS 2003-31," Digital Home Working Group, Jun. 2003, 14 pages.
"ControlValve:1 Service Template for UPnP Device Architecture V 1.0," Contributing Members of the UPnP Forum, 2003, 15 pages.
"Creative Introduces The Zen X-Fi and The Zen X-Fi With Wireless Lan—The Only Players to Improve the Quality of MP3 Music Playback With X-Fi Audio Technology," Creative Press Release, Singapore, Jul. 10, 2008, 2 Pages.
"Creative Sound Blaster Wireless Music," User's Guide, Copyright 2003, Creative Technology Ltd. (Version 1.0, Aug. 2003) 66 pages.
Krishnan, V., et al., "Customized Internet Radio," Proceedings of the 9th International World Wide Web Conference on Computer Networks: The International Journal of Computer and Telecommunications Networking, vol. 33, Issue 1-6, Jun. 2000, pp. 609-618.
"CyberLink Reveals UPnP-Compliant Home," PR Newswire, Apr. 12, 2004, pp. 1-3.
"Dating Service—Singles, Personals and Love, Match.com," http://www.match.com/, copyright 2008 Match.com, printed Jan. 16, 2008, 2 pages.
Hermann, R., et al., "DEAPspace—Transient ad hoc Networking of Pervasive Devices," Computer Networks 35 (2001) pp. 411-428.
Decision—Denial of Patent Owner's Request for Rehearing in IPR2013-00312 dated Dec. 18, 2013, 6 pages.
Decision—Institution of Inter Partes Review entered Jan. 24, 2013 for IPR2012-00004, 28 pages.
Decision—Institution of Inter Partes Review entered Jul. 3, 2014 for IPR2013-00175, 21 pages.
Decision—Institution of Inter Partes Review entered Mar. 20, 2014 for IPR2013-00597, 23 pages.
Decision—Institution of Inter Partes Review entered Mar. 20, 2014 for IPR2013-00598, 26 pages.
Kim, Dong-Sung, "Design and Implementation of Home Network Systems Using UPnP Middleware for Networked Appliances," School of Electrical Engineering and Computer Science, Seoul National University, Jul. 22, 2002, 10 pages.
DLNA, "Design Guidelines," Jul. 1, 2004, http://www.dlna.org/resources, 1 page.
"Designing a UPnP AV MediaServer," Version 1.00, Intel Corporation, 2003, 46 pages.
"DeviceProtection:1 Service," For UPnP Version 1.0, Standardized DCP (SDCP), Version 1.0, Feb. 24, 2011, Service Template Version 2.00, 67 pages.
"DeviceSecurity:1 Service Template for UPnP Device Architure 1.0," Contributing Members of the UPnP Forum, 2003, 66 pages.
"DeviceType:V Device Template Version 1.01 for UPnP Version 1.0," Contributing Members of the UPnP Forum, Jan. 16, 2001, 9 pages.
Stone, Glen, "DHWG HNv1 and Use Case Subcommittee Update," Digital Home Working Group, 2004, 35 pages.
Stone, Glen, "DHWG Status to CEA," Digital Home Working Group, Nov. 11, 2003, 10 pages.
"Digilink 4 Control Protocol," Arrakis Systems, Inc., Dec. 14, 2000, 51 pages.
"DigiLink 4 by Arrakis Systems, Inc. Music Library Features," Arrakis Systems, Inc., Jan. 21, 2000, 82 pages.
"Digilink Application Note—Link Groups Feature," Arrakis Systems, Inc., May 12, 2000, 1 page.
"Digilink Application Note—Recording the Latest News, Weather, Sports," Arrakis Systems, Inc., Jun. 26, 2000, 1 page.
"Digilink DC4-100 Whole House Music Library System, 3rd Party Control Systems," Arrakis Systems, Inc., Feb. 15, 2001, 5 pages.
"Digilink DC4-100 Whole House Music Library System, CD Music Management for the Home," Arrakis Systems, Inc., date unknown, 2 pages.
Peter Jansen Associates, "Digital Convergence and Home Entertainment," Apr. 1, 2002, web.archive.org/web/20040619093957/http://www.mediabolic.com/press/i tem.php?id=58, 9 pages.
"Digital Home White Paper," IS 2003-31, Jun. 2003, <www.caba.org. 14 pages.

(56) References Cited

OTHER PUBLICATIONS

Smith, "Digital home group touts convergence spec," The Register, Jun. 23, 2004, 2 pages.
"Digital Home Working Group Design Guidelines," Version 1.0, Working Draft, Apr. 1, 2004, Copyright 2004 Digital Home Working Group, 160 pages.
DHWG/DLNA, "Digital Home Working Group Design Guidelines, Version: 1.0," Digital Home Working Group, Version No. HNv1-0.900, Apr. 1, 2004, 160 pages.
Howard, B., "Digital Jukeboxes," PC Magazine, Oct. 1, 2002, 3 pages.
DHWG/DLNA, "Digital Living Network Alliance Home Networked Device Interoperability Guidelines Version: 1.0," Digital Living Network Alliance, Jun. 2, 2004, pp. 1-151.
"DigitalSecurityCamera:1 Device Template version 1.01," For UPnP Version 1.0, Standardized DCP, Mar. 24, 2005, 8 pages.
"DigitalSecurityCameraMotionImage:1 Service Template Version 1.01," For UPnP Version 1.0, Standardized DCP, Mar. 24, 2005, 23 pages.
"DigitalSecurityCameraSettings:1 Service Template Version 1.01," For UPnP Version 1.0, Standardized DCP, Mar. 24, 2005, 18 pages.
"DigitalSecurityCameraStillImage:1 Service Template Version 1.01," For UPnP Version 1.0, Standardized DCP, Mar. 24, 2005, 20 pages.
"DimmableLight:1 Device Template Version 1.01," For UPnP Version 1.0, Standardized DCP, Nov. 23, 2003, 7 pages.
"Dimming:1 Service Template Version 1.01," For UPnP Version 1.0, Standardized DCP, Nov. 23, 2003, 29 pages.
"D-Link Unveils 1st UPnP-Enabled Central Home Storage Drive," PR Newswire, Sep. 16, 2003, pp. 1-3.
"D-Link Wireless Media Player Validated by Intel to Meet Interoperability Guidelines D-Link is the First Major Networking Device Manufacturer to Earn Intel(R) Networked Media Product Requirements (Intel(R) NMPR) Conformance Validation," PR Newswire, May 4, 2004, 4 pages.
D-Link's New Wireless Media Device Plays Digital Music, Videos, and Photos on Home Television and Stereo New D-Link Digital Home Solution Merges Home Entertainment Center With Home Network for Seamless Delivery of Multimedia Content Anywhere in the Home, Jan. 20, 2004, 4 pages.
Ailara, "DLNA Strides Toward Consumer-Friendly Home Networked Devices With New Interoperability Guidelines," DLNA, Jun. 22, 2004, 4 pages.
"dodgeball.com :: mobile social software," at <http://www.dodgeball.com/>, copyright 2008, Google Inc., printed Jan. 16, 2008, 1 page.
"Don't Dream It. Stream It. Streamium Broadband Internet Micro System MCi200," Copyright 2001, Philips Consumer Electronic Company, 2 pages.
"Downloadable Kerbango Logos," Kerbango, Inc., date unknown, 2 pages.
DV Archive From Wikipedia, the free encyclopedia, en.wikipedia.org/wiki/DVArchive, printed on Sep. 3, 2013.
Brumitt, Barry, "Easy Living: Technologies for Intelligent Environments," The Easy Living Project, Microsoft Research, Handheld and Ubiqitous Computing, 2nd International Symposium, Bristol, UKSep. 2000, 12 pages.
"eHarmony," http://eharmony.com/, copyright 2000-2008 eHarmony.com, printed Jan. 16, 2008, 1 page.
"Enigma Digital and Kerbango Enter Strategic Promotional Relationship to Offer Music Lifestyles at the Touch of a Button," Santa Monica, CA and Cupertino, CA, Mar. 16, 2000, 2 pages.
"Ericsson Review: The Telecommunications Technology Journal," No. 3. 1998, 44 pages.
"Escient and Audio Request Compatibility Memo (ZR-4630)," Niles Audio Corporation, Dec. 4, 2002, 1 page.
"P800/P802," Sony Ericsson White Paper, Jan. 2003, pp. 1-14, 24-25, 36, 70-72, 87-88, 94, and 112 (24 pages).
Expert Report of Dr. Kevin C. Almeroth, ITC Investigation No. 337-TA-882, filed Nov. 12, 2013, 178 pages.

"ExternalActivity:1.0 Service Template Version 1.01," For UPnP version 1.0, Standardized DCP, Sep. 11, 2002, 16 pages.
"Feeder:1.0 Service Template Version 1.01," For UPnP Version 1.0, Standardized DCP, Sep. 11, 2002, 20 pages.
"Flickr," http://www.flickr.com/, copyright 2008 Yahoo! Inc., printed Jan. 16, 2008, 1 page.
Mandayan Raghunath et al., "Fostering a Symbiotic Handheld Environment," IEEE Computer Society, pp. 56-65, Sep. 2003.
"Friendster—Home," http://www.friendster.com/, copyright 2002-2007 Friendster, Inc., printed Jan. 16, 2008, 1 page.
Bonanno, C., "From the Computer Room to the Living Room: The Future of Digital Home Audio," Home Toys Article, Aug. 2000 (Archived at http://web.archive.org/web/200302020092947/http://hometoys.com/htinews/aug00/articles/tbeach/tbeach.htm) 2 pages.
Williams, "Gadgets getting connected with DLNA," PC World Business Centre, Oct. 14, 2004, 3 pages.
"Google AdWords: Regional and Local Targeting," https://adwords.google.com/select/targeting.html, copyright 2008 Google, printed Jul. 17, 2008, 1 page.
"Google Talk," http://www.google.com/talk/, copyright 2008 Google, printed Jan. 16, 2008, 1 page.
"Goombah" Preview, at <http://www.goombah.com/preview.html>, printed Jan. 8, 2008, 5 pages.
"The HAVi Specification Version 1.1 of the Home Audio/Video Interoperability (HAVi) Architecture," HAVi, Inc., May 15, 2001, 529 pages.
Jussi Teirikangas, "HAVi: Home Audio Video Interoperability," Helsinki University of Technology, 2001, 10 pages.
DHWG/DLNA, "HNv1 Approved Phase 1 Use Cases," Digital Home Working Group, Jan. 29, 2004, pp. 1-23.
DHWG/DLNA, "HNv1 Approved Phase 2 Use Cases," Digital Home Working Group, Jan. 29, 2004, pp. 1-18.
"Home Control Via Touch Panel," Elan Home Systems, Copyright 2002, 4 pages.
"2003 Canadian Product Catalog," Home Director, Trusted Technology Advisor for Builders, Version 6.4, Copyright 2003, Home Director, Inc., 30 pages.
"Home Director Announces Availability of AudioPoint Digital Audio Receiver; Play MP3 Digital Music or Streaming Internet Radio on Conventional Stereo Equipment," PR Newswire, Sep. 27, 2002, 4 pages.
"Home Director Announces Availability of AudioPoint Digital Audio Receiver; Play MP3 Digital Music or Streaming Internet Radio on Conventional Stereo Equipment," PR Newswire, Sep. 27, 2002, 2 pages.
"Home Director: Innovations in Home Networking," Home Director, Inc., Copyright 2002 (Archived at web.archive.org/web/20031129164409/http://homedirector.com/) 1 page.
"Home Entertainment Solutions," SimpleDevices, Apr. 13, 2004, http://web.archive.org/web/20040413030604/http://www.simpledevices.co m/homeentertainment.shtml, 1 page.
Peter M. Corcoran et al., "Home Network Infrastructure for Handheld/Wearable Appliances," IEEE Transactions on Consumer Electronics, vol. 48, No. 3, Aug. 2002, pp. 490-495.
DHWG/DLNA, "Home Networked Device Ineroperability Guidelines v1.0," Digital Living Network Alliance, 2004, pp. 1-202.
DHWG/DLNA, "Home Networked Device Ineroperability Guidelines White Paper," Digital Living Network Alliance, Jun. 2004, pp. 1-16.
Wong, W., "Home Networking Opens Its Doors for Business," CNET News, Oct. 19, 1999, 4 pages.
Miller, "Home Networking with Universal Plug and Play," IEEE Communications Magazine, Dec. 2001 vol. 39 No. 12, 16 pages.
"HouseStatus:1 Service Template for UPnP Device Architecture 1.0," Standardized DCP, May 13, 2003, Contributing Members of the UPnP Forum, 17 pages.
"HP Digital Entertainment Center Owner's Guide: DE100C," Copyright 2001, Hewlett-Packard Company, 118 pages.
"HP Digital Media Receiver User's Guide," Copyright 2002, Hewlett-Packard Company, 67 pages.
"HVAC_FanOperatingMode:1 Service Template for UPnP Device Architecture 1.0," Standardized DCP, May 13, 2003, Contributing Members of the UPnP Forum, 12 pages.

(56) References Cited

OTHER PUBLICATIONS

"HVAC_SetpointSchedule:1 Service Template for UPnP Device Architecture 1.0," Contributing Members of the UPnP Forum, 2003, 16 pages.
"HVAC_System:1 Device Template for UPnP Device Architecture 1.0," Contributing Members of the UPnP Forum, 2003, 8 pages.
"HVAC_UserOperatingMode:1 Service Template for UPnP Device Architecture 1.0," Contributing Members of the UPnP Forum, 2003, 15 pages.
"HVAC_ZoneThermostat:1 Device Template for UPnP Device Architecture 1.0," Contributing Members of the UPnP Forum, 2003, 10 pages.
"iChat. Not being there is half the fun," http://www.apple.com/macosx/features/ichat.html, printed Jan. 16, 2008, 1 page.
"icq," http://www.icq.com/, copyright 1998-2008 ICQ Inc., printed Jan. 16, 2008, 2 pages.
Ma; Gibbs; Kaplan, "IDTV Broadcast Applications for a Handheld Device," Panasonic Technologies Co., IEEE Communications Society, pp. 85-89, 2004 IEEE.
"IEEE 802.11—WIkipedia, the free encyclopedia," http://en.wikipedia.org/wiki/IEEE_802.11, printed Oct. 26, 2007, 5 pages.
"iMerge M1000 SoundServer—Specs," iMerge Ltd, Manufactured Nov. 2000-Aug. 2003 (downloaded from the Internet Oct. 12, 2013) <URL:www.imerge.co.uk/products/m1000/m1000_home.php> 2 pages.
"iMerge M1000 SoundServer User Guide," Copyright 2001, iMerge Ltd., 40 pages.
"iMerge S1000 SoundServer—Specs," iMerge Ltd, Manufactured May 2001-Nov. 2002 (downloaded from the Internet Oct. 12, 2013) <URL:www.imerge.co.uk/products/s1000/s1000_home.php> 2 pages.
"iMerge S1000 SoundServer User Guide," Copyright 2001, iMerge Ltd., 60 pages.
"iMerge S2000 SoundServer—Specs," iMerge Ltd, Manufactured Nov. 2002-Aug. 2004 (downloaded from the Internet Oct. 12, 2013) <URL:www.imerge.co.uk/products/s2000/s2000_home.php> 2 pages.
"iMerge S2000 SoundServer Hard Disk Audio System User Guide," Copyright 2002, iMerge Ltd., 48 pages.
"iMerge XiVA Server Utilities Application Note," Copyright 2002, iMerge Ltd., 4 pages.
"iMerge XiVA Server Utilities User Manual," Copyright 2002, iMerge Ltd., 4 pages.
Vacca, John, "I-Mode Crash Course," McGraw-Hill, 2002, 4 pages.
"InboundConnectionConfig:1 Service," For UPnP Version 1.0, Standardized DCP, Sep. 30, 2009, Document Version 1.0, Service Template Version 2.0, 21 pages.
Carroll, J., "Industries Blind to What's Ahead," Globe & Mail, Mar. 12, 2001, 2 pages.
"InferNote is an exploration tool for your music collection," at <http://www.itweaks.com/infdoc/index.html>, copyright 2004, otherslikeyou.com Inc., printed Feb. 7, 2007, 13 pages.
"InputConfig:1 Service," For UPnP Verson 1.0, Standardized DCP (SDCP) Mar. 22, 2011, Document Version 1.0, Service Template Version 2.00, 43 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Intel accelerates the delivery of the digital home with the extended wireless PC initiative," TV Meets the Web, Sep. 10, 2002, pp. 1-2.
Schwartz, Ephraim, "Intel moving into home electronics with new digital initiative; Chipmaker to support Microsoft UPnP as way to connect TVs and stereos," InfoWorld, Sep. 9, 2002, pp. 1-3.
Salvator, Dave, "Intel Pushes Plug and Play Into Homes ; Universal Plug and Play and 802.11 remain the technology Intel is betting on to infiltrate home entertainment networks," ExtremeTech.com, Sep. 10, 2002, pp. 1-3.
"Intel UPnP-Based Remote I/O Developer's Guide," Version 0.4, Intel Corporation, Sep. 12, 2003, 25 pages.
Lemon, Sumner, "Intel: Digital media adapters to hit market in 2003; Dell, Gateway, Mitac, Legend set to launch adapters next year," InfoWorld, Oct. 15, 2002, 2 pages.
"IntelliControl Home Theater Automation System," Niles Audio Corporation, Copyright 2003, 8 pages.
Drummond; Ionescu; Holte, "Intelligent Browsing for Multimedia Applications," University of Ottawa, Proceedings of Multimedia '96, pp. 386-389, 1996 IEEE.
"Intel's Digital Home Vision Moves Closer to Reality With New Industry Enabling Building Blocks," Business Wire, Feb. 28, 2003, pp. 1-4.
"Internet Audio iM Jukebox (PC Link) Set-Up" Quick Reference Guide—Internet Audio Operations, iM Jukebox, Apr. 20, 2001, 2 pages.
"Internet Audio Mini Hi-Fi System," Philips FW-i1000 Manual, EL4965E006/MAC4110/12-98, 106 pages.
Crouch, Cameron, "Internet radio dumps the PC; New stand-alone devices let you listen to Web-based broadcasts, from CDs to radio stations. (Kerbango/AudioRamp.com) (Product Information)," Network World, Feb. 14, 2000, 2 pages.
"Internet Radio Feature Proposal," Anonymous, Date Unknown, 6 pages.
"Internet Relay Chat—Wikipedia, the free encyclopedia," http://en.wikipedia.org/wiki/IRC, printed Nov. 16, 2007, 11 pages.
"InternetGatewayDevice:1 Device Template Version 1.01 for UPnP Version 1.0," Contributing Members of the UPnP Forum, 2001, 15 pages.
"InternetGatewayDevice:2 Device Template Version 1.01," For UPnP Versions 1.0 and 1.1, Standardized DCP (SDCP), Version 1.00, Dec. 10, 2010, 28 pages.
"Interoperable Home Infrastructure," Intel Technology Journal, vol. 6, Issue 04, ISSN 1535-766X, Nov. 15, 2002, 78 pages.
"Introducing the Digital Home Working Group," Digital Home Working Group, 2004, 16 pages.
"IP Multimedia Subsystem," http://en.wikipedia.org/wiki/IP_Multimedia_Subsystem, printed Jul. 8, 2009, 11 pages.
"iPAQ Music Center—Addendum A," Copyright 2002, Compaq Computer Corporation, 38 pages.
"iPronto—Dashboard for the Digital Home," Copyright 2002, Philips Consumer Electronics, 13 pages.
"iPronto tsi6400—Getting Started," Philips, date unknown, 9 pages.
"iPronto tsi6400—Getting Started," Philips, date unknown, 4 pages.
"iPronto tsi6400 Installation Guide," Copyright Royal Philips Electronics NV (date unknown) 67 pages.
"Is Bluetooth Worth the Wait?" The Economist, Dec. 7, 2000, 7 pages.
Carroll, J., "Is This Guy Crazy or Just Way Ahead of His Time," Link Magazine, Jul. 2002, pp. 18-20.
Jeronimo, "It Just Works: UPnP in the Digital Home," Oct. 5, 2004, http://www.artima.com/spontaneous/upnp digihome.html, 16 pages.
"Respondents' and Intervenor's Joint Notice of Prior Art," ITC Investigation No. 337-TA-882, filed Oct. 25, 2013, 49 pages.
"Jabber SoftwareFoundation," http://www.jabber.org/, copyright 1999-2005 the Jabber Software Foundation, printed Jan. 16, 2008, 3 pages.
O'Hara, K., et al., "Jukola: Democratic Music Choice in a Public Space," DIS 2004, Aug. 1-4, 2004, Cambridge, MA pp. 145-154.
"Searching," Kerbango, Inc., date unknown, 4 pages.
"Kerbango," from Wikipedia, the free encyclopedia, en.wikipedia.org/wiki/Kerbango, Last Modified May 16, 2012, 2 pages.
Kerbango AM/FM Internet Radio, Kerbango.com, publication date unknown, DS-01-041100, 2 pages.
Metcalfe, Bob, "Kerbango AM/FM/IM Radio moves us toward The Broadcast Internet," web.archive.org/web/20081229161920/http://www.infoworld.com/articles/op/xml/00/06/12/000612opmetcalfe.html, printed Sep. 2, 2013, 3 pages.
"Kerbango and ApplianceWare Deliver Digital Music Library," Indian Wells, California DEMO 2000, Feb. 7, 2000 (3Com Corporation Press Release) 2 pages.

(56) References Cited

OTHER PUBLICATIONS

"Kerbango and Arbitron Strike Strategic Alliance to Enhance Internet Radio Industry's Most In-Depth Research to Internet Broadcasters and Advertisers," Cupertino, CA and New York, NY, May 23, 2000, 4 pages.
"Kerbango and Interep Interactive Team Up on Advertising for Kerbango Internet Radio," Boston, MA, Radio Ink Internet Conference, May 17, 2000, Kerbango, Inc., 2 pages.
Image of Kerbango Device, rear perspective, date unknown, 1 page.
Image of Kerbango Device, front perspective, date unknown, 1 page.
Image of Kerbango Device, front side perspective, date unknown, 1 page.
Kerbango FAQ web.archive.org/web/20000617123538/http://kerbango.com/radio/faq.html, Jun. 17, 2000, printed Sep. 2, 2013, 2 pages.
"Kerbango Group Photo," Kerbango, Inc., date unknown, 1 page.
"Identity—Ingredient Brand: Sizing and Clear Space," Kerbango, Inc., date unknown (updated 0.02.01-luckow) 2 pages.
Kerbango Internet Radio, "www.gadgetcentral.com/kerbango_intro.html," posted Jan. 2000, 2 pages.
"Kerbango Internet Radio by 3Com Clinches Awards at the 2001 International Consumer Electronics Show: World's First Stand-Alone Internet Radio Appliance Wins CEA Innovations 2001 "Best of Show" Lauren and Dealerscope Magazine's "Editors' Choice" Award," Jan. 8, 2001, 2 pages.
"Kerbango Internet Radio, Product Intro," http://web.archive.org/web/20000824175603, Apr. 1, 2000, 3 pages.
"Kerbango Internet Radio, Product Intro," http://web.archive.org/web/20000522143057, Apr. 1, 2000, 3 pages.
"Kerbango Partner Quotes," Kerbango, Inc., date unknown, 5 pages.
"Kerbango Partners," Kerbango, Inc., date unknown, 1 page.
"Kerbango Photo," Kerbango, Inc., date unknown, 1 page.
"Kerbango Presentation," Kerbango, Inc., date unknown, 18 pages.
"Kerbango Radio AM FM Internet, Model 100E for Broadband Connections, Tuning Service," Copyright 2000, Kerbango, a division of 3Com Corporation, DS-01-091300, 2 pages.
"What the Reviewers Think of Kerbango," Kerbango, Inc., date unknown, 2 pages.
Kerbango Software Screenshot, Kerbango, Inc., date unknown, 1 page.
Kerbango Software Screenshot—Search Results, Kerbango, Inc., date unknown, 1 page.
Kerbango Tuning Service, Kerbango.com, publication date unknown, DS-02-041100, 2 pages.
Kerbango Tuning Service Screenshot, Kerbango, Inc., Mar. 1, 2000, 1 page.
Kerbango Tuning Service Screenshot, Kerbango, Inc., Mar. 1, 2000, (Archived at web.archive.org/web/20000301135348/http://www.kerbango.com/tuner/index.html?fcn_menu=1&tuning_id=0&bwc=) 1 page.
"Kerbango Tuning Service User Guide," Copyright 2000, Kerbango, Inc., (Archived at web.archive.org/web/.../http://www.kerbango.com/help/index.html?play_sound=1) 3 pages.
Kerbango User Guide, web.archive.org/web/20000614154943/http://kerbango.com/help/index.html?bwc=, Kerbango, Inc, 3 pages.
"LANDevice:1 Device Template Version 1.01 for UPnP Version 1.0," Contributing Members of the UPnP Forum, 2001, 9 pages.
"LANHostConfigManagement:1 Service Template Version 1.01 for UPnP Version 1.0," Contributing Members of the UPnP Forum, 2001, 27 pages.
"Lansonic Digital Audio Server DAS-750," Sep. 18, 2000, 21 pages.
"Lansonic DAS-750 Digital Audio Server Operating Instructions, Version 2.2.0," Copyright 2001, Digital Voice Systems, Inc. (Feb. 2, 2002) 104 pages.
"Lansonic DAS-750 Product Photographs," [online] Jun. 19, 2000 [Downloaded from the Internet on Aug. 23, 2013] URL: <web.archive.org/web/20000619153458/http://www.lansonic.com/photos.htm> (p. 7 of Yamaha Corporation of America Exhibit 1013) 1 page.
"Lansonic DAS-750 Product Photographs—Enlarged Front," [online] Jun. 20, 2000 [Downloaded from the Internet on Aug. 23, 2013] URL: <web.archive.org/web/20000620195000/http://www.lansonic.com/images/a_ned_front.jpg> (p. 8 of Yamaha Corporation of America Exhibit 1013) 1 page.
"Lansonic DAS-750 User Manual," [online] Sep. 18, 2000 [Downloaded from the Internet on Aug. 23, 2013] URL: <web.archive.org/web/20000918102806/http://www.lansonic.com/excertps.htm> (pp. 12-17 of Yamaha Corporation of America Exhibit 1013) 6 pages.
"Lansonic DAS-950 Pro Series," [online] Feb. 2, 2002 [Downloaded from the Internet on Jan. 21, 2014] URL: <web.archive.org... http://www.lansonic.com/DAS-950_main.htm> 2 pages.
"Lansonic Digital Audio Server DAS-750," [online] Sep. 18, 2000 [Downloaded from the Internet on Aug. 23, 2013] URL: <web.archive.org/web/20000918102747/http://www.lansonic.com/configuration.htm> (pp. 1-2 of Yamaha Corporation of America Exhibit 1013) 2 pages.
"Lansonic Professional Series—Digital Audio Server—Operating Instructions," Version 2.2.0, Feb. 2002, DAS-750-PRO, 120 pages.
"Lansonic's New 3-Zone Output Digital Audio Server," CEDIA, 2002, Westford, MA, Home Toys, date unknown (CEDIA Expo 2002 held Sep. 25-29, 2002,Minneapolis, MN) 3 pages.
"LAUNCHcast Radio—Yahoo! Messenger," http://messenger.yahoo.com/launch.php, copyright 2007 Yahoo! Inc., printed Nov. 8, 2007, 1 page.
"Layer3Forwarding:1 Service Template Version 1.01 for UPnP Version 1.0," Contributing Members of the UPnP Forum, 2001, 14 pages.
Brumbaugh, Pete, "Leading GPS Innovator Takes Wireless to the Streets," Garmin Int'l, Oct. 1, 1998, 1 page.
Mascia, J. and Reddy, S., "cs219 Project Report—Lifetrak: Music in Tune With Your Life," Department of Electrical Engineering, UCLA '06, Los Angeles, California, copyright 2006, ACM, 11 pages.
"LinkAuthentication:1," Service Template Version 1.01, For UPnP Version 1.0, Standardized DCP, Oct. 17, 2003, 32 pages.
"Linksys Quick Installation Guide—Instant Wireless Series WPC11 ver. 3.0," Date Unknown, QI-WPC11 ver. 3.0-012201NC KL, 9 pages.
"Live365's Extensive Internet Radio Station Collection Coming to 3Com Kerbangosm Tuning Service," Santa Clara, CA, Jan. 8, 2001, 3 pages.
"LowPowerDevice:1 Service Template Version 1.01," For UPnP Version 1.0, Design Complete, Aug. 28, 2007, Document Version 1.00, 23 pages.
"LowPowerProxy:1 Service Template Version 1.01," For UPnP Version 1.0, Standardized DCP, Aug. 28, 2007, Document Version 1.00, 18 pages.
"ManageableDevice:1 Device Template Version 1.01," For UPnP Version 1.0, Standardized DCP (SDCP) Jul. 20, 2010, 14 pages.
"ManageableDevice:2 Device Template Version 1.01," For UPnP Version 1.0, Standardized DCP (SDCP) Feb. 16, 2012, 23 pages.
"Many New ELAN Products Shipping Around CES 2003," Lexington, KY, Home Toys, date unknown (CES 2003 held Jan. 9-19, 2003, Las Vegas, NV) 2 pages.
MCi200 Streamium Broadband Internet Micro System, Philips Electronics, 2001, 2 pages.
MC-i200 Streamium Micro Hi-Fi System manual, Philips Consumer Electronics North America, publication date unknown, 39 pages.
MCi250 Streamium Broadband Internet Micro System, Philips Electronics, 2002, 2 pages.
MC-i250 Wireless Broadband Internet Audio System, Philips Electronics, publication date unknown, 42 pages.
"Mediabolic Incorporates Support for UPnP Technology into the Mediabolic ONE Platform," Business Wire, Jan. 6, 2003, pp. 1-2.
"MediaManagement:1 Service," For UPnP Verson 1.0, Standardized DCP (SDCP) Mar. 22, 2011, Document Version 1.0, Service Template Version 2.00, 228 pages.

(56) References Cited

OTHER PUBLICATIONS

"MediaManagement:2 Service," For UPnP Verson 1.0, Standardized DCP (SDCP) Dec. 10, 2012, Document Version 1.0, Service Template Version 2.00, 192 pages.
Ritchie, J., "MediaRenderer:1 Device Template Version 1.01," For UPnP 1.0, Standardized DCP, Jun. 25, 2002, UPnP Forum, 12 pages.
"MediaRenderer:2 Device Template Version 1.01," For UPnP Version 1.0, Standardized DCP, Sep. 30, 2008, Version 1.0, 26 pages.
"MediaRenderer:3 Device," For UPnP Version 1.0, Standardized DCP (SDCP) Dec. 31, 2010, Device Template Version 1.01, 29 pages.
"MediaRenderer1.xml," date unknown, 1 page.
"MediaRenderer2.xml," date unknown, 1 page.
"MediaServer:1 and Media Render:1." http://upnp.org/specs/av/av1, p. 1, approved Jun. 24, 2002, printed Oct. 2, 2013.
"MediaServer:1 Device Template Version 1.01 for UPnP 1.0," Contributing Members of the UPnP Forum, Jun. 25, 2002, 12 pages.
"MediaServer:2 Device Template Version 1.01," For UPnP Version 1.0, Approved Standard, May 31, 2006, Document Version 1.00, 24 pages.
"MediaServer:3 Device Template Version 1.01," For UPnP Version 1.0, Standardized DCP, Sep. 30, 2008, Document Version 1.0, 26 pages.
"MediaServer:4 Device," For UPnP Version 1.0, Standardized DCP (SDCP) Dec. 31, 2010, Device Template Version 1.01, 29 pages.
"MediaServer1.xml," date unknown, 1 page.
"MediaServer2.xml," date unknown, 1 page.
"MediaServer3.xml," date unknown, 1 page.
"MegaTouch Combo Jukebox Owner's Manual," Copyright 2003, Merit Industries, Inc., PM0378-07, 58 pages.
"MegaTunes Owner's Manual," Copyright 2004, Merit Industries, Inc., PM0396-07, 30 pages.
"Merit Remote Sound System Installation Manual," Copyright 2003, Merit Industries, Inc., PM0397-02, 14 pages.
"Messaging:1 Service," For UPnP Verson 1.0, Standardized DCP (SDCP) Mar. 22, 2011, Document Version 1.0, Service Template Version 2.00, 72 pages.
"Messaging:2 Service," For UPnP Verson 1.0, Standardized DCP (SDCP) Dec. 10, 2012, Document Version 1.0, Service Template Version 2.00, 74 pages.
DHWG/DLNA, "MHS Use Case Proposal Samsung," r1.0, Digital Home Working Group, Feb. 25, 2004, pp. 1-36.
"Microsoft Announces Windows Media Connect Technology, Enabling Seamless Media Transfer Between Windows XP-Based PCs and Consumer Electronics Devices," PR Newswire, Jan. 7, 2004, pp. 1-5.
Maloney, P., "Microsoft's MongoMusic.com "Sounds Like" a Possible Winner," RAIN Radio and Internet Newsletter, Sep. 26, 2000, 6 pages.
"Mobile community, free sms, mobile dating, text flirting and friends networking—playtxt . . . ," http://web.archive.org/web/20070225125113rn_1/www.playtxt.net/playtxt.do, printed Jan. 16, 2008, 1 page.
"Mobile Networking with WAP," Friedr, Vieweg, Sohn, 1st Edition 2000, 4 pages.
"Mobile Use Cases Passed for HNv1," Digital Home Working Group, Oct. 18, 2003, 18 pages.
"MongoMusic.com and Kerbango Team Up to Personalize Internet Radio for Consumers," Cupertino, CA and Menlo Park, CA, Mar. 13, 2000, 3 pages.
"MontaVista's Hard Hat Linux Embedded in World's First Stand-alone Internet Radio," Indian Wells, CA, Demo 2000, Feb. 7, 2000, 2 pages.
Spring, T., "Move MP3s to Home Stereo," Computerworld, Apr. 28, 2000, 3 pages.
Spring, T., "Move MP3s to Your Home Stereo," CNN.com, May 1, 2000, (http://europe.cnn.com/2000/TECH/computing/05/01.mnp3.stereo.idg/index.html) 3 pages.

Hacker, S., "MP3: The Definitive Guide, Sample Chapter 6, Hardware, Portables, Home Stereos, and Kits," 1st Edition Mar. 2000, 32 pages.
"MSN—Music," http://music.msn.com/help/sync, copyright 2007 Microsoft, printed Nov. 16, 2007, 1 page.
Schmid, P., "Multimedia in the Living Room: From DVD Player to Media Center," Mar. 12, 2004 (www.tomsguide.com/us/multimedia-in-the-living-room,review-243-9.html) 4 pages.
Schmid, P., "Multimedia in the Living Room: From DVD Player to Media Center: 7. Cd3o C300," Tom's Guide—Home Theatre—Home Theatre Review, Mar. 12, 2004, 4 pages.
Schmid, P., "Multimedia in the Living Room: From DVD Player to Media Center: 9. Cd3o C300, Continued," Tom's Guide—Home Theatre—Home Theatre Review, Mar. 12, 2004, 4 pages.
"MultiZone Audio Preamplifier Installation & Operation Guide: Four-Source, Six-Zone Preamplifier," A4.6Ci, Copyright 2002, Niles Audio Corporation, 107 pages.
"Multi-Zone With Escient Tune-Base CD Mgmt," AVS Forums, Nov. 11, 2000, Copyright 2013 AVS, 6 pages.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
Rose, "Music in the Home: Interfaces for Music Appliances," Personal Technologies (2000) vol. 4, Issue 1, pp. 45-53.
Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.
Weiss, A., "Music Selection for Internet Radio," Department of Computer Science, University of Cantergury, New Zealand, Nov. 3, 2000, 56 pages.
Brown, B., et al., "Music Sharing as a Computer Supported Collaborative Application," HP Laboratories Bristol, HPL-2001-103, May 2, 2001, 21 pages.
"musicstrands.com—Because Music is Social," brochure, copyright 2006, MusicStrands, Inc., 2 pages.
"MySpace," at <http://www.myspace.com/>, copyright 2003-2008, MySpace.com, printed Jan. 16, 2008, 2 pages.
"MyStrands Download," at <http://www.mystrands.com/overview.vm>, copyright 2003-2007, MediaStrands, Inc., printed Feb. 7, 2007, 3 pages.
"MyStrands Labs: Patent-pending Technologies," at <http://labs.mystrands.com/patents.html>, earliest description from Nov. 2004,printed Feb. 7, 2007, 5 pages.
"Napster—All the Music You Want," at <http://www.napster.com/using_napster/all_the_music_you_want.html>, copyright 2003-2006, Napster, LLC, printed Feb. 7, 2007, 2 pages.
"Napster.co.uk—Napster to Go," http://www.napster.co.uk/ntg.html, copyright 2003-2007 Napster, LLC, printed Nov. 15, 2007, 2 pages.
"National and Local Weather Forecast, Radar, Map and Report," http://www.weather.com/, copyright 1995-2007 The Weather Channel Interactive, Inc., printed Feb. 7, 2007, 3 pages.
NavTalk Cellular Phone/GPS Receiver Bill of Material, Garmin, Sep. 10, 1998.
NavTalk Quick Guide, Revision A, Garmin, Jan. 23, 1999, 3 pages.
"NEC to Demonstrate a Series of Mobile Internet Applications and Service Creation Software for the European Market at 3GSM 2003," JCN Newswire, Feb. 12, 2003, 2 pages.
"Network Gateway Solutions," SimpleDevices, Apr. 13, 2004, http://web.archive.org/web/20040413033546/http://www.simpledevices.co m/network gateway.shtml, 1 page.
"Networked MP3 Player Lineup Bows From cd3o," Twice, Jan. 9, 2003 (www.twice.com/news/networked-mp3-plyaer-lineup-bows-cd3o-0) 1 page.
Lea, Rodger, "Networking Home Entertainment Devices with HAVi," Embedded Systems, Sep. 2000, 9 pages.
"NetX Getting Started Guide," Philips, date unknown, 7 pages.
"New Devices Boost MP3 Use at Home," CNET News, May 24, 2000, 3 pages.
"Omnifi DMSI User Manual," Omnifi Media, Jul. 2003, 36 pages.

(56) References Cited

OTHER PUBLICATIONS

"Online adult dating service and personals—Lavalife—Where Singles Click," at <http://lavalife.com/>, copyright 2006, Lavalife Corp., printed Jan. 16, 2008, 1 page.
"Oregan Networks Demonstrates UPnP Enabled," PR Newswire, Feb. 18, 2003, pp. 1-3.
Intel, "Overview of UPnP AV Architecture: A Digital Media Distribution Technology for the Home," Research and Development at Intel, Version 1.00, Jul. 2, 2003, copyright 2003 Intel Corporation, 10 pages.
"Pandora Internet Radio—Find New Music, Listen to Free Web Radio," at <http://www.pandora.com/>, copyright 2005-2007, Pandora Media, Inc., printed Feb. 7, 2007, 1 page.
Patent Owner's Preliminary Response to Inter Partes Review of U.S. Pat. No. 8,230,099 (Inter Partes Review No. IPR2013-00597) Filed Dec. 26, 2013, 50 pages.
Patent Owner's Preliminary Response to Inter Partes Review of U.S. Pat. No. 8,214,873 (Inter Partes Review No. IPR2013-00598) Filed Dec. 26, 2013, 63 pages.
Petition for Inter Partes Review of U.S. Pat. No. 8,214,873 (Inter Partes Review No. IPR2014-00766) Filed May 16, 2014, 52 pages.
Petition for Inter Partes Review of U.S. Pat. No. 8,028,323 (Inter Partes Review No. IPR2014-00709) Filed Apr. 30, 2014, 65 pages.
Petition for Inter Partes Review of U.S. Pat. No. 8,230,099 (Inter Partes Review No. IPR2014-00711) Filed Apr. 30, 2014, 65 pages.
Petition for Inter Partes Review of U.S. Pat. No. 8,214,873 (Inter Partes Review No. IPR2013-00598) Filed Sep. 18, 2013, 65 pages.
Petition for Inter Partes Review of U.S. Pat. No. 8,214,873 (Inter Partes Review No. IPR2014-00723) Filed May 1, 2014, 66 pages.
Petition for Inter Partes Review of U.S. Pat. No. 8,230,099 (Inter Partes Review No. IPR2013-00597) Filed Sep. 18, 2013, 52 pages.
Petition for Inter Partes Review of U.S. Pat. No. 8,458,356 (Inter Partes Review No. IPR2014-00733) Filed May 6, 2014, 48 pages.
Wallace, Brice, "Philips aims to blur TV-PC line," Deseret Morning News, Jan. 8, 2004, 3 pages.
"Philips Consumer Electronics Unveils 'Connected Planet' Strategy," Pressi.com, Aug. 28, 2003, pp. 1-3.
"PhoneManagement:1," For UPnP Verson 1.0, Standardized DCP (SDCP) Mar. 22, 2011, Document Version 1.0, Service Template Version 2.00, 53 pages.
"PhoneManagement:2," For UPnP Verson 1.0, Standardized DCP (SDCP) Dec. 10, 2012, Document Version 1.0, Service Template Version 2.00, 74 pages.
"PIayCD: 1 Sample Service Template for UPnP Version 1.0," Contributing Members of the UPnP Forum, 2001, 18 pages.
Belmont, "Playlist requirements," Intel, Oct. 29, 2003, pp. 1-3.
"News! Dec. 2001," Practically Networked, Dec. 2001, online <URL:http://www.practically.networked.com/news/news_12_01.htm> 7 pages.
"Presence:1 Service," For UPnP Verson 1.0, Standardized DCP (SDCP) Dec. 10, 2012, Document Version 1.0, Service Template Version 2.00, 37 pages.
"PrintBasic:1 Service Template Version 1.01," For UPnP Version 1.0, Approved Standard, Aug. 8, 2002, 42 pages.
"PrintEnhanced:1 Service Template Version 1.01," For UPnP Version 1.0, Standardized DCP, Oct. 28, 2006, Document Revision 1.01, 83 pages.
Griffith, Eric, "PRISMIQ MediaPlayer," http://www.wi-fiplanet.com/print/reviews/article.php/3091181/PRISMIQ-MediaPlayer.htm, printed Oct. 10, 2013, 2 pages.
PRISMIQ MediaPlayer User Guide, PRISMIQ, Inc. 2003, 44 pages.
PRISMIQ Teams with RealNetworks to Give Consumers Access to Rhapsody on Home Stereos PRISMIQ/Rhapsody Combo on Display During CES; Visit TechHome TechZone (Booth #17695, South Hall 2) and RealNetworks booth (#22611, South Hall) at Las Vegas Convention Center, 5 pages.
Little, T.D.C., et al., "Prospects for Interactive Video-On-Demand," (MCL Technical Report, Feb. 15, 1994) IEEE Multimedia, vol. 1, No. 3, Fall 1994, 22 pages.
Salonidis, T., "Proximity Awareness and Ad Hoc Network Establishment in Bluetooth," Electrical and Computer Engineering Department, University of Maryland; AT&T Labs Research; IBM T.J.Watson Research Center (2001) 26 pages.
"ProxiWeb Fact Sheet," web.archive.org/web/19991022065434/http://www.proxinet.com /products nserv/proxiweb, ProxiNet, Inc. 1999, 1 page.
"Q3 2002 SONICblue Earnings Conference Call—Final," FD (Fair Disclosure) Wire, Nov. 6, 2002, 10 pages.
"QoSDevice:1," For UPnP Version 1.0, Mar. 10, 2005, 28 pages.
"QoSDevice:1 Erratum," UPnP Forum, Jul. 14, 2006, 25 pages.
"QoSManager:1," For UPnP Version 1.0, Mar. 10, 2005, 34 pages.
"QoSManager:1 Erratum," UPnP Forum, Jul. 14, 2006, 31 pages.
"QoSManager:1 Second Erratum," UPnP Forum, Aug. 4, 2008, 2 pages.
"QoSManager:2 Erratum," UPnP Forum, Jul. 31, 2008, 2 pages.
"QoSPolicyHolder 1.0," For UPnP Version 1.02, Mar. 10, 2005, 16 pages.
"QoSPolicyHolder:1 Erratum," UPnP Forum, Jul. 14, 2006, 6 pages.
"Rabble—Social networking for your phone," http://www.rabble.com/, copyright 2005-2008 Intercasting Corp., printed Jan. 16, 2008, 1 page.
"RAClient:1 Device," For UPnP Version 1.0, Standardized DCP, Sep. 30, 2009, Document Version 1.0, Device Template Version 2.00, 13 pages.
"RADAConfig:1 Service," For UPnP Version 1.0, Standardized DCP, Sep. 30, 2009, Document Version 1.0, Device Template Version 2.00, 20 pages.
"RADAConfig:2 Service," For UPnP Version 1.0, Standardized DCP, Apr. 30, 2011, Document Version 1.0, Device Template Version 2.00, 38 pages.
"RADASync:1 Service," For UPnP Version 1.0, Standardized DCP, Sep. 30, 2009, Document Version 1.0, Device Template Version 2.00, 29 pages.
"RADASync:2 Service," For UPnP Version 1.0, Standardized DCP, Apr. 30, 2010, Document Version 1.0, Device Template Version 2.00, 32 pages.
Baig, Edward, "Radio days: Out of the past, into the future," USA Today, Jan. 31, 2001, 4 pages.
Greenberg, K., "Radio the Hard-Drive Way," ADWEEK, Jun. 12, 2000, 2 pages.
"Radiolinja Finland Selects 724 Solutions X-treme Mobility Gateway; XMG Enables New Content-Rich Data Services," Business Wire, Jul. 8, 2003, 2 pages.
"RADiscoveryAgent:1 Device," For UPnP Version 1.0, Standardized DCP, Sep. 30, 2009, Document Version 1.0, Device Template Version 2.00, 13 pages.
"RADiscoveryAgent:2 Device," For UPnP Version 1.0, Standardized DCP, Apr. 30, 2010, Document Version 1.0, Device Template Version 2.00, 13 pages.
"RadiusClient:1, Service Template Version 1.01," For UPnP Version 1.0, Standardized DCP, Oct. 17, 2003, 12 pages.
"RAServer:1 Device," For UPnP Version 1.0, Standardized DCP, Sep. 30, 2009, Document Version 1.0, Device Template Version 2.00, 14 pages.
"RAServer:2 Device," For UPnP Version 1.0, Standardized DCP, Apr. 30, 2011, Document Version 1.0, Device Template Version 2.00, 16 pages.
"RATAConfig:1 Service," For UPnP Version 1.0, Standardized DCP, Sep. 30, 2009, Document Version 1.0, Device Template Version 2.00, 54 pages.
"RCA Radio Photo," RCA, date unknown, 1 page.
RealPlayer 7 Plus User Manual, RealNetworks, Inc. 2000, 117 pages.
RealPlayer 8 Plus User Manual, RealNetworks, Inc. 2000, 112 pages.
"RealPlayer Plus G2 Manual," Copyright 1998-1999, Real Networks, Inc., 82 pages.
"Redband's Broadcasting's Audio Programs Now Available on the Kerbango Internet Tuning Service," San Francisco, CA, Sep. 21, 2000, 2 pages.

(56) References Cited

OTHER PUBLICATIONS

"Reinventing Radio," Kerbango Overview, Jul. 2000, Kerbango, Inc., 3 pages.
"Reinventing Radio: Internet Startup—Kerbango—Debuts at Upside's Launch," Kerbango Resources, Cupertino, California, Oct. 13, 1999, <http://www.tuner.espace.com/press/101399.html> 4 pages.
"Release Noties MC-i200/250," Philips, Date Unknown, 2 pages.
"Remote Access Architecture:1 For UPnP Version 1.0," 2009 UPnP, Sep. 30, 2009, pp. 1-30.
"Remote Access Architecture:2," For UPnP Version 1.0, Standardized DCP, Apr. 30, 2011, Document Version 1.0, Service Template Version 2.00, 53 pages.
Wendorft, Roli, "Remote Execution of HAVi Applications on Inernet-Enabled Devices," Philips Research, IEEE, Jun. 25, 2001, 11 pages.
"RemoteUIClient:1 Service Template Version 1.01," For UPnP version 1.0, Standardized DCP, Sep. 2, 2004, 29 pages.
"RemoteUIClientDevice:1 Device Template Version 1.01," For UPnP version 1.0, Standardized DCP, Sep. 2, 2004, 11 pages.
"RemoteUIServer Device:1 Device Template Version 1.01," For UPnP version 1.0, Standardized DCP, Sep. 2, 2004, 11 pages.
"RemoteUIServer:1 Server Template Version 1.01," For UPnP version 1.0, Standardized DCP, Sep. 2, 2004, 20 pages.
"RenderingControl: 1 Service Template Version 1.01 For UPnP Version 1.0," Contributing Members of the UPnP Forum, Jun. 25, 2002, 63 pages.
"RenderingControl:1 Service Annex A—Control Point Requirements," For UPnP Version 1.0, Standardized DCP Annex, Oct. 6, 2010, Service Template Version 2.00, 5 pages.
"RenderingControl:1 Service Template Version 1.01," For UPnP Version 1.0, Standardized DCP, Jun. 25, 2002, 63 pages.
"RenderingControl:2 Service Annex A—Control Point Requirements," For UPnP Version 1.0, Standardized DCP Annex, Oct. 6, 2010, Service Template Version 2.00, 5 pages.
"RenderingControl:2 Service Template Version 1.01," For UPnP Version 1.0, Approved Standard, May 31, 2006, Document Version 1.00, 84 pages.
"RenderingControl:3 Service," For UPnP Version 1.0, Standardized DCP (SDCP) Dec. 31, 2010, Service Template Version 1.01, 144 pages.
"RenderingControl1.SyntaxTests.xml," date unknown, 6 pages.
"RenderingControl1.xml," date unknown, 11 pages.
"RenderingControl2.SyntaxTests.xml," date unknown, 7 pages.
"RenderingControl2.xml," date unknown, 14 pages.
Palenchar, Joseph, "Replay TV to boost promotions, distribution. (Twice News)," HighBeam Research, Jun. 9, 2003, 2 pages.
ReplayTV From Wikipedia, the free encyclopedia, en.wikipedia.org/wiki/Replaytv, printed on Sep. 3, 2013, 6 pages.
"Rhapsody—Full-length music, videos and more—Free," http://www.rhapsody.com/welcome.html, copyright 2001-2007 Listen.com, printed Feb. 7, 2007, 1 page.
"Rio Advanced Digital Audio Center, User's Guide," SONICblue, Inc., Copyright 2001-2002, 116 pages.
"Rio One User Guide," Copyright 2001, SONICblue Incorporated, 23 pages.
"Rio PMP300 User's Guide," Copyright 1998, Diamond Multimedia Systems, Ltd., 27 pages.
"Rio500 Getting Started Guide," Copyright 1999, Diamond Multimedia Systems, Ltd., 2 pages.
"RioReceiver—Getting Started," Copyright 2002, SONICblue, Inc., 4 pages.
"Rockford's Omnifi(TM) Awarded TechTV's Best of CES," PR Newswire, Jan. 16, 2003, pp. 1-3.
"Roku Control Protocol—Functional Specification," Jul. 13, 2006, Version 2.0, Roku, LLC, 135 pages.
"Roku SoundBridge M1000 and M2000," PCMag.com, http://www.pcmag.com/article2/0,2817,1646246,00.asp, Sep. 20, 2004, 5 pages.

Bell, Ian, "Roku Soundbridge M1000 Review," http://www.digitaltrends.com/media-streamer-reviews/roku-soundbridge-m1000-review, Dec. 14, 2004, 8 pages.
"Roku SoundBridge M1000/M1001 Network Music System," [online] Jul. 18, 2012, <URL:http://www.amazon.com/Roku-SoundBridge-M1001-Network-System/dp/B000B|6AH8//> 6 pages.
"Roku SoundBridge Network Music Player," Copyright 2006, Roku, LLC, 2 pages.
"Roku SoundBridge Network Music Player User Guide," Roku, LLC, date unknown, 67 pages.
"Roku SoundBridge Network Music Player User Guide, Software V. 2.5," Copyright 2006, Roku, LLC, 74 pages.
"SoundBridge Radio Wi-Fi Music System User Guide, Software V. 2.5," Roku, LLC, date unknown, 51 pages.
"Roku SoundBridge Wi-Fi Setup Instructions," Revision 1.2, Aug. 31, 2004, 14 pages.
"Roku Unveils New Award-Winning Network Music Players; Roku SoundBridge Features Sleek Design, Large Display, Apple iTunes Support," http://www.businesswire.com/news/home/20040107005285/en, Jan. 7, 2004, 3 pages.
"Roku Unveils SoundBridge Music Player," Online Reporter, Jan. 10, 2004, pp. 1-2.
"User Guide for Software Release 1.5.18, HD1000," Copyright 2004, Roku, LLC (Revised Apr. 29, 2004) 34 pages.
"Roxio The Boom Box Music and recording reviews—CNET Reviews," http://reviews.cnet.com/music-and-recording/roxio-the-boom-box/4505-3669_7-3141440 . . . , printed Nov. 15, 2007, 4 pages.
"SB1—SqueezeboxWiki," Copyright 2012, Logitech (http://wiki.slimdevices.com/index.php?title=SB1&oldid=10934) 1 page.
"Scan:1.0 Service Template Version 1.01," For UPnP Version 1.0, Standardized DCP, Sep. 11, 2002, 54 pages.
"Scanner:1.0 Device Template Version 1.01," For UPnP Version 1.0, Standardized DCP, Sep. 11, 2002, 9 pages.
"ScheduledRecording:1 Service Annex A—Control Point Requirements," For UPnP Version 1.0, Standardized DCP Annex, Oct. 6, 2010, Service Template Version: 2.00, 5 pages.
"ScheduledRecording:1 Service Template Version 1.01," For UPnP Version 1.0, Approved Standard, May 31, 2006, Document Version 1.00, 267 pages.
"ScheduledRecording:2 Service," For UPnP Version 1.0, Standardized DCP (SDCP) Dec. 31, 2010, Service Template Version 1.01, 245 pages.
"ScheduledRecording:2 Service Annex A—Control Point Requirements," For UPnP Version 1.0, Standardized DCP Annex, Oct. 6, 2010, Service Template Version: 2.00, 5 pages.
"ScheduledRecording:2 Service Template Version 1.01," For UPnP Version 1.0, Standardized DCP, Sep. 30, 2008, Document Version 1.0, 273 pages.
"ScheduledRecording1.SyntaxTests.xml," date unknown, 4 pages.
"ScheduledRecording1.xml," date unknown, 7 pages.
"ScheduledRecording2.SyntaxTests.xml," date unknown, 4 pages.
"ScheduledRecording2.xml," date unknown, 7 pages.
"SecurityConsole:1 Service Template for UPnP Device Architure 1.0," Contributing Members of the UPnP Forum, 2003, 20 pages.
Bussey, H., et al., "Service Architecture, Prototype Description, and Network Implications of a Personalized Information Grazing Service," INFOCOM '90, Ninth Annual Joint Conference of the IEEE Computer and Communication Societies, pp. 1046-1053.
"ServiceType:V Formatting (MS Word) Guidelines," Contribuing Members of the UPnP Forum, 2008, 26 pages.
"Set-top Solutions," SimpleDevices, Apr. 13, 2004, http://web.archive.org/web/20040413044713/http://www.simpledevices.com/settop.shtml, 1 page.
Smyers, Scott, "Sharing Digital Content in the Home," Digital Home Working Group, Oct. 7, 2003, 17 pages.
Stone, Glen, "Sharing Digital Content in the Home," Digital Home Working Group, Oct. 23, 2003, 23 pages.
"SimpleCenter," SimpleDevices, May 2, 2004, http://web.archive.org/web/20040502165145/http://simpledevices.com/sim plecenter.shtml, 1 pages.

(56) References Cited

OTHER PUBLICATIONS

"SimpleDevices Announces New Partnerships for its SimpleWare Integration and Interoperability Program," Business Wire, Jan. 15, 2004, pp. 1-3.
"SimpleDevices has developed a flexible, standards-based media server software development kit that transforms a gateway device into an intelligent and powerful media server," SimpleDevices, Apr. 13, 2004, http://web.archive.org/web/20040413143346/http://, 1 page.
"SimpleDevices Product Showcase," SimpleDevices, Apr. 14, 2004, http://web.archive.org/web/20040414041500/http://www.simpledevices.co m/showcase.shtml, 1 page.
"SimpleDevices Product Solutions," SimpleDevices, Apr. 14, 2004, http://web.archive.org/web/20040414072007/http://www.simpledevices.co m/solutions.shtml, 1 page.
"SimpleDevices Releases New Ver. Software, SimpleWare 2.0," PR Newswire, Jan. 9, 2003, pp. 1-4.
"SimpleDevices Releases New Version of its Software, SimpleWare 2.0," Jan. 9, 2002, http://web.archive.org/web/20040413144147/http://simpledevices.com/pre ss releases/01 09 2003simpleware.shtml, 2 pages.
"Simplefi Wireless Digital Audio Receiver, Installation & User Guide," Copyright 2001, Motorola, Inc., 111 pages.
"SimpleWare Software Technologies," SimpleDevices, Apr. 13, 2004, http://web.archive.org/web/20040413042557/http://www.simpledevices.co m/products.shtml, 1 page.
"SimpleWare Software Technologies," SimpleDevices, Jul. 10, 2004, http://web.archive.org/web/20040710135809/http://www.simpledevices.co m/products.shtml, 1 page.
Gibbs, M., "Sit Back and Listen to the Tunes," Network World, Aug. 19, 2002, 5 pages.
SL300i Wifi Wireless Multimedia Link Instructions for use, www.philips.com/streamium, publication date unknown, 54 pages.
SL300i Wireless Multimedia Link, Philips Electronics, 2003, 2 pages.
"SL400i," SimpleDevices, Apr. 13, 2004, http://web.archive.org/web/20040413145728/http://simpledevices.com/sho wcase philips.shtml, 1 page.
SL400i Wifi Wireless Multimedia Link Instructions for use, www.philips.com/streamium, publication date unknown, 55 pages.
SL400i Wireless Multimedia Link, Philips Electronics, 2003, 2 pages.
SliMP3—SqueezeboxWiki, Copyright 2012, Logitech (http://wiki.slimdevices.com/index.php?title=SLIMP3&oldid=10936) 1 page.
"SliMP3 Ethernet MP3 Player Owner's Manual," Slim Devices, Inc. 2002, 16 pages.
"SliMP3 Network MP3 Player," Slim Devices, Inc. 2002, 2 pages.
"SliMP3 Network MP3 Player Owner's Manual," Copyright 2003, Slim Devices Inc., Revision Apr. 5, 2003, 15 pages.
"SmallPlanet: Home," http://web.archive.org/web/20061105030323/http://www.smallplanet.net/, copyright 2005 SmallPlanet.net, printed Jan. 16, 2008, 1 page.
"Smart Energy Reference Architecture," Microsoft, Oct. 14, 2009, 130 pages.
Nwana, H. S., "Software Agents: An Overview," Knowledge Engineering Review, vol. 11, No. 3, pp. 205-244, Oct./Nov. 1996, 49 pages.
"SoftwareManagement:1 Service Template Version 1.01," For UPnP Version 1.0, Standardized DCP (SDCP) Jul. 20, 2010, 76 pages.
"SoftwareManagement:2 Service Template Version 1.01," For UPnP Version 1.0, Standardized DCP (SDCP) Feb. 16, 2012, 88 pages.
"SolarProtectionBlind:1 Device Template Version 1.01," For UPnP Version 1.0, Standardized DCP, Sep. 9, 2008, 7 pages.
"Solutions for Content Providers," SimpleDevices, Inc., Apr. 13, 2004, http://web.archive.org/web/20040413025938/http://www.simpledevices.co m/content provider.shtml, 1 page.

"Solutions for Internet Service Providers," SimpleDevices, Apr. 13, 2004, http://web.archive.org/web/20040413031950/http://www.simpledevices.co m/isp.shtml, 1 page.
Townley, J., "Sonicbox Releases iM Software Tuner," InternetNews.com, Apr. 11, 2000, 2 pages.
"Sony Unveils Palm-Powered Handheld Strategy," CNET News, Jul. 13, 2000, 5 pages.
"SoundBridge User Guide: Wireless Network Music Player, Software Version 2.5," Copyright 2006, Roku, LLC, 37 pages.
"Squeezebox (Network Music Player)," from Wikipedia, the free encyclopedia, en.wikipedia.org/wiki/Squeezebox_(network_music_player), Last Modified Mar. 31, 2012, 5 pages.
"Squeezebox Owner's Guide," Slim Devices, Inc., 2003, 22 pages.
"Squeezebox The wireless MP3 player for your digital stereo," Slim Devices, Inc., 2003, 2 pages.
Berniker, Mark, "StarSight launches stand-alone program guide receiver. (StarSight Telecast's CB1500 for cable television operators) (Brief Article)," Broadcasting & Cable, HighBeam Research, Dec. 5, 1994, 1 page.
Walton, Brian, "StarSight: The Future of Television Today," Washington Informer, HighBeam Research, Jun. 22, 1995, 2 pages.
"Start Listening with Last.fm," at <http://www.last.fm/>, date unknown but may date back as early as 2002, 1 page.
"Start Listening with Last.fm—Scrobbling You Say?" http://www.last.fm/, 1 page, Jul. 23, 2008.
Tatarinov, I., "Static Caching in Web Servers—Abstract," Proceedings of the 6th International Conference on Computer Communications and Networks, Sep. 22-25, 1997, 2 pages.
Ng, W.C.T., et al., "Streaming Multimedia Content Over Home Network With an Intelligent Controller," The 29th Annual Conference of the IEEE, Nov. 2-6, 2003, Copyright 2003 IEEE, pp. 1802-1807.
"Streamium MC-i200 Getting Started," Philips, May 31, 2002, 2 pages.
"Streamium Micro Hi-Fi System MC-i200 Manual," Philips, Date Unknown, 39 pages.
"Streamium Micro Hi-Fi System MC-i200 Manual—English/French/Spanish Language Version," Philips, Date Unknown, 55 pages.
Nichols; Myers, "Studying the Use of Handhelds to Control Smart Appliances," School of Computer Science, Carnegie Mellon University, Proceedings of the 23rd International Conference on Distributed Computing Systems Workshops (ICDCSW'03), 2003 IEEE, 6 pages.
"Supercomm Products," Connected Planet, May 14, 2001, 1 page.
"SwitchPower:1 Service Template Version 1.02," For UPnP Version 1.0, Standardized DCP, May 1, 2011, 11 pages.
Cardoza, P., "Take a Look at the Latest Integrated PDA/Cell Phone Devices," [online] Tech Republic, Apr. 8, 2002 (downloaded on Jun. 11, 2013) Downloaded from the Internet: URL: <http://www.techrepublic.com/article/take-a-look-at-the-latest-integrated-pda-cell-phone-devices/>, 3 pages.
"Technology—Geo Targeting," http://www.invidi.com/pages/itc_technology_05.html, copyright 2007, printed Nov. 18, 2008, 1 page.
"Telephony:1 Security Best Practice," For UPnP Verson 1.0, Standardized DCP (SDCP) Mar. 22, 2011, Document Version 1.0, Service Template Version 2.00, 27 pages.
"TelephonyArchitecture:1," For UPnP Verson 1.0, Standardized DCP (SDCP) Mar. 22, 2011, Document Version 1.0, Service Template Version 2.00, 24 pages.
"TelephonyArchitecture:2," For UPnP Verson 1.0, Standardized DCP (SDCP) Dec. 10, 2012, Document Version 1.0, Service Template Version 2.00, 23 pages.
"TelephonyClient:1 Device," For UPnP Verson 1.0, Standardized DCP (SDCP) Mar. 22, 2011, Document Version 1.0, Service Template Version 2.00, 12 pages.
"TelephonyClient:2 Device," For UPnP Verson 1.0, Standardized DCP (SDCP) Dec. 10, 2012, Document Version 1.0, Service Template Version 2.00, 9 pages.
"TelephonyServer:1 Device," For UPnP Verson 1.0, Standardized DCP (SDCP) Mar. 22, 2011, Document Version 1.0, Service Template Version 2.00, 13 pages.

(56) References Cited

OTHER PUBLICATIONS

"TelephonyServer:2 Device," For UPnP Verson 1.0, Standardized DCP (SDCP) Dec. 10, 2012, Document Version 1.0, Service Template Version 2.00, 10 pages.
"TemperatureSensor:1 Service Template for UPnP Device Architecture 1.0," Contributing Members of the UPnP Forum, 2003, 13 pages.
"TemperatureSetpoint:1 Service Template for UPnP Device Architecture 1.0," Contributing Members of the UPnP Forum, 2003, 17 pages.
Roli G. Wendorf; Maarten P. Bodlaender, "THAM 13.2 Remote Execution of HAVi Applications on Internet-Enabled Devices," IEEE 2001, 2 pages.
"The BroadcastWeb Network and Kerbango Sign Co-Marketing Agreement," Boca Raton, FL, Feb. 7, 2000, 3 pages.
Van Winkle, W., "The Easy Upgrade," CCNews, Mar. 11, 2003 (Archived at http://www.archive.org/web/20030311134950/http://www.ccnmag.com/index.php?sec+mag&id=134.0) 4 pages.
"The History of Broadcasting and Growth of Internet Audio," Kerbango, Inc., date unknown, 2 pages.
Scherf, K., "The Home Network Market: Data and Multimedia Connectivity, a Parks Associates White Paper," Copyright Sep. 2003, Parks Associates, 13 pages.
Ian Goldberg, Steven D. Gribble, David Wagner, and Eric A. Brewer, "The Ninja Jukebox," Proceedings of USITS' 99: The 2nd USENIX Symposium on Internet Technologies & Systems Boulder, Colorado, USA, Oct. 11-14, 1999, 11 pages.
Gilligan, Gregory, "The TV Is the Center of the Digital Home Connected Electronic Products That Work Together Are Highlight of Show," Richmond Times Dispatch, Jan. 9, 2004.
"Thomson Multimedia Expands Reach of Digital Audio With Plans to Offer Internet Radio Products," Paris, Indianapolis, IN, Jun. 27, 2000, 4 pages.
Brandt, E., et al., "Time in Distributed Real-Time Systems," Carnegie Mellon University, Research Showcase, Computer Science Department, School of Computer Science, Paper 498, Jan. 1, 1999, 5 pages.
"Join LinkedIn and See How You are Connected to TouchTunes. It's Free," TouchTunes—LinkedIn (date unknown) Downloaded on Jul. 18, 2012 (downloaded from the Internet: <URL:www.linkedin.com/company/touchtunes>) 2 pages.
"TouchTunes Software Manual," Copyright 2003, Merit Industries, Inc., PM0377-03, 22 pages.
Busby, C., "TouchTunes Tyranny: Why the Digital JukeBox Revolution is Revolting," http://www.thebollard.bangordailynews.com/2009/10/07/touchtunes-tyranny.com) Oct. 7, 2009, 6 pages.
"TuneBase Pro MK-II A CD Library Management System, User's Guide," Document Version 05311999, May 31, 1999, Escient, 56 pages.
LaBanca, R., "Turtle Beach AudioTron," The Home Automation Forum, Copyright 1999 (Archived at http://www.archive.org/web/20021205173424/http://www.homeautomationforum.com/reviews/atron/atron.html) 2 pages.
LaBanca, R., "Turtle Beach AudioTron Continued: But wait, there's more!" The Home Automation Forum, Oct. 23, 2002 (Archived at http://www.archive.org/web/20021023235309/http://www.homeautomationforum.com/reviews/atron/atron2.html) 3 pages.
LaBanca, R., "Turtle Beach AudioTron Continued: But What About Automation?" The Home Automation Forum, Nov. 4, 2002 (Archived at http://www.archive.org/web/20021104171610/http://www.homeautomationforum.com/reviews/atron/atron3.html) 2 pages.
Bell, I., "Turtle Beach AudioTron Review," Apr. 17, 2002 (Archived at http://web.archive.org/web/20030103061851/http://www.designtechnica.com/reviews.php?op=showcontent&id=23&page=3) 2 pages.
Bell, I., "Turtle Beach AudioTron Review," By Corsair, Apr. 17, 2002 (Archived at http://web.archive.org/web/20030212134345/http://www.designtechnica.com/reviews.php?op=showcontent&id=23) 2 pages.

"Turtle Beach AudioTron Review," WhiningDog.net, Jul. 31, 2002 (Archived at http://web.archive.org/web/20030202100233/http://www.whiningdog.net/Reviews/Gadgets/Audio/MP3/20020801-AudioTron/page1.htm) 2 pages.
"Turtle Beach AudioTron Review: Navigation and Playback," WhiningDog.net, Jul. 31, 2002 (Archived at http://web.archive.org/web/20030302225111/http://www.whiningdog.net/Reviews/Gadgets/Audio/MP3/20020801-AudioTron/page4.htm) 3 pages.
"Turtle Beach AudioTron Review: Other Stuff," WhiningDog.net, Jul. 31, 2002 (Archived at http://web.archive.org/web/20030310213307/http://www.whiningdog.net/Reviews/Gadgets/Audio/MP3/20020801-AudioTron/page5.htm) 3 pages.
"Turtle Beach AudioTron Review: Package Contents," WhiningDog.net, Jul. 31, 2002 (Archived at http://web.archive.org/web/20030212215140/http://www.whiningdog.net/Reviews/Gadgets/Audio/MP3/20020801-AudioTron/page2.htm) 4 pages.
"Turtle Beach AudioTron Review: Web Server Interface," WhiningDog.net, Jul. 31, 2002 (Archived at http://web.archive.org/web/20030107223623/http://www.whiningdog.net/Reviews/Gadgets/Audio/MP3/20020801-AudioTron/page3.htm) 3 pages.
Bell, I., "Turtle Beach AudioTron Review," By XMS, Apr. 17, 2002 (Archived at http://web.archive.org/web/20030220223536/http://www.designtechnica.com/reviews.php?op=showcontent&id=23&page=2) 2 pages.
"TV Meets the Web," Financial Times Information Limited, Sep. 10, 2002, 2 pages.
"Two-way Radio for Netizens," Computers Today, Mar. 6, 2000, 2 pages.
"TwoWayMotionMotor:1 Service Template Version 1.01," For UPnP Version 1.0, Standardized DCP, Jul. 27, 2007, 30 pages.
Mohanty, "UCS Report Digital Home Working Group Board of Directors Meeting," Digital Home Working Group, May 12, 2004, pp. 1-43.
Van der Heijden; Taylor, "Understanding WAP Wireless Applications, Devices, and Services," Artech House, 2000, pp. 98-99 (4 pages total).
UPnP, "Universal Plug and Play Device Architecture," Version 1.0, ftp://vtm.upnp.org/upnp/specs/arch/UPnPDA10_20000613.htm, Jun. 8, 2000, pp. 1-54.
Liu, "UPnP and Home Networking at Intel Developer Forum—Fall 2002," UPnPWorld Archives, Jul. 12, 2002, pp. 1-3.
Kang, Dong-Oh, "UPnP AV Architectural Multimedia System with an OSGi Platform," IEEE 2004, 5 pages.
Ritchie, J., et al., "UPnP AV Architecture Version 1.0," Jun. 25, 2002, URL:<http://upnp.org/specs/av/UPnP-av-AVArchitecture-v1-20020625.pdf> 22 pages.
Ritchie, J., et al., "UPnP AV Architecture: 0.83 for UPnP Version 1.0," Preliminary Design, Jun. 12, 2002, Copyright 2000 Contributing Members of the UPnP Forum, 22 pages.
"UPnP AV Architecture: 1 for UPnP Version 1.0," Standardized DCP, Document Version 1.1, Sep. 30, 2008, 30 pages.
"UPnP AV Architecture: 2 for UPnP Version 1.0," Standardized DCP, Dec. 31, 2010, 35 pages.
"UPnP AV Datastructure Template: 1," for UPnP Version 1.0, Standardized DCP, Document Version 1.0, Sep. 30, 2008, 28 pages.
"UPnP AVTransport:1 Service Template Version 1.01," for UPnP Version 1.0, Standardized DCP, Jun. 25, 2002, 67 pages.
Jeronimo, "UPnP Design by Example, A Software Developer's Guide to Universal Plug and Play," Intel Press, Intel Corp. 2003, 109 pages.
Jeronimo, Weast, "UPnP Design by Example," http://intel.com/intelpress/upnp/index.htm, Dec. 20, 2003, 1 page.
"UPnP Device and Services Templates," ISO-IEC, Nov. 30, 2012, 156 pages.
"UPnP Device Architecture 1.0," UPnP Forum, Oct. 15, 2008, 80 pages.
"UPnP Device Architecture 1.1," UPnP Forum, Oct. 15, 2008, 136 pages.
"UPnP Device Architecture 1.1 Annex A—IP Version 6 Support," Mar. 15, 2011, 15 pages.
"UPnP Device Architecture V1.0 Annex A—IP Version 6 Support," Contributing Members of the UPnP Forum, 1999-2002 Microsoft Corporation, 11 pages.

(56) References Cited

OTHER PUBLICATIONS

"UPnP FanSpeed:1 Service Template Version 1.01," For UPnP Device Architecture 1.0, Standardized DCP, Sep. 21, 2007, 13 pages.
"UPnP Implementers Corporation Certifies First Product in the New AV Device Category; Arcadyan Wireless Home A/V Platform to Display UPnP Certification Logo," Business Wire, Aug. 12, 2003, 3 pages.
"UPnP Low Power Architecture," For UPnP Version 1.0, Design Complete, Aug. 28, 2007, Document Version 1.00, 44 pages.
"UPnP Printer:1 Device Template Version 1.01," For UPnP Device Architecture 1.0, Standardized DCP, Oct. 15, 2008, 7 pages.
"UPnP Printer:1 Device Template Version 1.01, Annex A—Optional Service Addition Version 1.0," For UPnP Device Architecture 1.0, Standardized DCP, Oct. 15, 2008, 4 pages.
"UPnP QoS Architecture:1.0," For UPnP Version 1.0, Mar. 10, 2005, 28 pages.
"UPnP QoS Architecture:2," For UPnP Version 1.0, Standardized DCP, Oct. 16, 2006, Document Version: 1.00, 33 pages.
"UPnP QoSDevice:2 Service Template Version 1.01," For UPnP Version 1.0, Standardized DCP, Oct. 16, 2006, Document Version 1.00, 39 pages.
"UPnP QoSDevice:3 Service Template Version 1.01," For UPnP Version 1.0, Standardized DCP, Nov. 30, 2008, 113 pages.
"UPnP QoSDevice:3 Underlying Technology Interface Addendum Service Template Version 1.01," For UPnP Version 1.0, Standardized DCP, Nov. 30, 2008, 22 pages.
"UPnP QoSManager:2 Service Template Version 1.01," For UPnP Version 1.0, Standardized DCP, Jul. 31, 2008, Document Version 1.00, 37 pages.
"UPnP QoSManager:3 Service Template Version 1.01," For UPnP Version 1.0, Standardized DCP, Nov. 30, 2008, 89 pages.
"UPnP QoSPolicyHolder:2 Service Template Version 1.01," For UPnP Version 1.0, Standardized DCP, Oct. 16, 2006, Document Version 1.00, 16 pages.
"UPnP QoSPolicyHolder:3 Service Template Version 1.01," For UPnP Version 1.0, Standardized DCP, Nov. 30, 2008, 36 pages.
"UPnP Security Ceremonies Design Document for UPnP Device Architecture 1.0," Contributing Members of the UPnP Forum, 2003, 18 pages.
UPnP, "UPnP Vendor's Implementation Guide," http://www.upnp.org/download/UPnP_Vendor_Implementation_Guide, Jan. 5, 2001, pp. 1-8.
"UPnP Vendor's Implementation Guide," Jan. 5, 2001, 5 pages.
UPnP AV Working Committee, "UPnP XML Data Files for Testing," Jun. 25, 2002, 1 page.
UPnP, UPnPF Membership Database Showing Current 2013 and pre May 2004, 30 pages.
UPnP, UPnPF Membership Database as of Sep. 2003, 92 pages.
"UPnP-av-SchemaFiles," Dec. 31, 2010, 46 pages.
"UPnP-av-SchemaFiles," Mar. 31, 2013, 13 pages.
"UPnP-av-SchemaFiles," Nov. 28, 2007, 12 pages.
"UPnP-av-TestFiles," Dec. 31, 2010, 86 pages.
"UPnP-av-TestFiles," Sep. 27, 2007, 142 pages.
"UPnP-basic-testFiles," Dec. 11, 2002, 3 pages.
"UPnP-cs-SchemaFiles," Mar. 6, 2008, 4 pages.
"UPnP-cs-TestFiles," Mar. 2, 2009, 147 pages.
"UPnP-dm-SchemaFiles," Feb. 16, 2012, 5 pages.
"UPnP-dm-SchemaFiles," Jan. 14, 2010, 4 pages.
"UPnP-dm-TestFiles," Feb. 16, 2012, 194 pages.
"UPnP-dm-TestFiles," Jan. 14, 2010, 233 pages.
"UPnP-gw-IGD-TestFiles," Dec. 10, 2010, 85 pages.
"UPnP-gw-IGD-TestFiles," Feb. 24, 2011, 96 pages.
"UPnP-gw-IGD-TestFiles," Sep. 21, 2001, 62 pages.
"UPnP-gw-SchemaFiles," Feb. 24, 2011, 3 pages.
"UPnP-gw-SchemaFiles," Nov. 3, 2009, 4 pages.
"UPnP-gw-WLAN-TestFiles," Oct. 17, 2003, 45 pages.
"UPnP-ha-DigitalSecurityCameraTestFiles," Mar. 24, 2005, 19 pages.
"UPnP-ha-HVAC-TestFiles," May 13, 2003, 31 pages.
"UPnP-ha-Lighting-TestFiles," Nov. 23, 2003, 14 pages.
"UPnP-ha-SolarProtectionBlind-TestFiles," Sep. 9, 2008, 7 pages.
"UPnP-lp-SchemaFiles," Apr. 4, 2007, 4 pages.
"UPnP-lp-TestFiles," Nov. 14, 2008, 7 pages.
"UPnP-phone-SchemaFiles," Dec. 10, 2012, 14 pages.
"UPnP-phone-SchemaFiles," Mar. 22, 2011, 3 pages.
"UPnP-phone-TestFiles," Dec. 10, 2012, 9 pages.
"UPnP-phone-TestFiles," Mar. 22, 2011, 18 pages.
"UPnP-pntr-SchemaFile," May 9, 2005, 110 pages.
"UPnP-pntr-TestFile," Oct. 28, 2009, 8 pages.
"UPnP-QoS Architecture:3," For UPnP Version 1.0, Standardized DCP, Nov. 30, 2008, 47 pages.
"UPnP-qos-SchemaFiles," Oct. 16, 2006, 13 pages.
"UPnP-qos-SchemaFiles," Dec. 5, 2008, 28 pages.
"UPnP-qos-TestFiles," Aug. 4, 2008, 26 pages.
"UPnP-qos-TestFiles," Nov. 23, 2008, 10 pages.
"UPnP-qos-TestFiles," Oct. 16, 2006, 14 pages.
"UPnP-ra-SchemaFiles," Sep. 30, 2009, 4 pages.
"UPnP-ra-TestFiles," Apr. 30, 2011, 36 pages.
"UPnP-ra-TestFiles," Sep. 30, 2009, 24 pages.
"UPnP-rui-TestFiles," Nov. 14, 2008, 9 pages.
"UPnP-scnr-TestFiles," Sep. 11, 2002, 21 pages.
"UPnP-sec-SchemaFiles," Nov. 20, 2003, 22 pages.
"UPnP-sec-TestFiles," Nov. 14, 2008, 15 pages.
"UpTo11.net—Music Recommendations and Search," at <http://www.upto11.net/>, copyright 2005-2006, Upto11.net, printed Feb. 7, 2007, 1 page.
DHWG/DLNA, "1. Use Case Ecosystem Selection Criteria for Home Networking version 1.0 Guidelines," Version 1.0 draft Aug. 6, 2003, pp. 1-3.
DHWG/DLNA, "DHWG Use Case Proposal," Version 1.1, Digital Media Network Business, Samsung Electronics Co., Ltd, Aug. 28, 2003, pp. 1-15.
DHWG/DLNA, "Use Case Technical Selection Criteria for Home Networking version 1.0 Guidelines," Version 1.0 draft Aug. 11, 2003, pp. 1-2.
DHWG/DLNA, "Use Cases Passed for HNv1," DHWG, Sep. 11, 2003, pp. 1-74.
Gowan, M., "Use Your PC to Serve Up Music: Turn Your PC Into a Music Server with Turtle Beach's Great-Sounding, Networked Digital-Music Player," PC World, Feb. 2, 2001, 2 pages.
"User's Guide ProxiWeb for Palm OS," web.archive.org/web/20000916115046/http://www.proxinet.com/products_n_serv/guidepalm/#Toc465146931, printed on Sep. 4, 2013, 14 pages.
"UUIDS and GUIDS," Paul J. Leach, Microsoft, Feb. 24, 1997, 16 pages.
"Via DJ Digital Music Server," Copyright 2003, Elan Home Systems, 2 pages.
"Via DJ Digital Music Server Installation Manual," Copyright 2003, Elan Home Systems, 16 pages.
"Via DJ Digital Music Server Users Guide," Copyright 2003, Elan Home Systems, 33 pages.
"Virtual Replay TV for your PC," www.dvarchive.org, last updated Jul. 12, 2006, printed Sep. 3, 2013, 3 pages.
"WANCableLinkConfig:1 Service Template Version 1.01 for UPnP Version 1.0," Contributing Members of the UPnP Forum, 2001, 25 pages.
"WANCommonInterfaceConfig:1 Service Template Version 1.01 for UPnP Version 1.0," Contributing Members of the UPnP Forum, 2001, 24 pages.
"WANConnectionDevice:1 Device Template Version 1.01 for UPnP Version 1.0," Contributing Members of the UPnP Forum, 2001, 13 pages.
"WANConnectionDevice:2 Device Template Version 1.01," For UPnP Versions 1.0 and 1.1, Standardized DCP (SDCP), Version 1.00, Sep. 10, 2010, 13 pages.
"WANDevice:1 Device Template Version 1.01," For UPnP Version 1.0, Standardized DCP, Nov. 12, 2001, 12 pages.
"WANDevice:2 Device Template Version 1.01," For UPnP Versions 1.0 and 1.1, Proposed DCP (PDCP), Version 1.0, Sep. 10, 2010, 11 pages.

(56) References Cited

OTHER PUBLICATIONS

"WANDSLLinkConfig:1 Service Template Version 1.01 for UPnP Version 1.0," Contributing Members of the UPnP Forum, 2001, 27 pages.
"WANEthernetLinkConfig:1 Service Template Version 1.01 for UPnP Version 1.0," Contributing Members of the UPnP Forum, 2001, 10 pages.
"WANIPConnection:1 Service Template Version 1.01 for UPnP Version 1.0," Contributing Members of the UPnP Forum, 2001, 74 pages.
"WANIPConnection:2 Service," For UPnP Version 1.0, Standardized DCP (SDCP) Sep. 10, 2010, Service Template Version 2.00, 85 pages.
"WANIPv6FirewallControl:1 Service," For UPnP Version 1.0, Standardized DCP (SDCP), version 1.00, Dec. 10, 2010, Service Template Version: 2.00, 39 pages.
"WANPOTSLinkConfig:1 Service Template Version 1.01 for UPnP Version 1.0," Contributing Members of the UPnP Forum, 2001, 21 pages.
"WANPPPConnection:1 Service Template Version 1.01 for UPnP Version 1.0," Contributing Members of the UPnP Forum, 2001, 89 pages.
"Webjay—Playlist Community," at <http://www.webjay.org/>, copyright 2006, Yahoo! Inc., printed Feb. 7, 2007, 5 pages.
"Welcome to Kerbango! Entertainment," Kerbango, Inc., Apr. 8, 2000 (Archived at <URL:http://www.kerbango.com/tuner/index.html?fcn_menu=1&tuning_id=10&bwc=) 1 page.
"Welcome to Kerbango! Music," Kerbango, Inc., May 11, 2000 (Archived at <URL:http://www.kerbango.com/tuner/index.html?fcn_menu=1&tuning_id=1&bwc=) 1 page.
"Welcome to Kerbango! News," Kerbango, Inc., May 11, 2000 (Archived at <URL:http://www.kerbango.com/tuner/index.html?fcn_menu=1&tuning_id=7&bwc=) 1 page.
"Welcome to the Merit Technical Center," Merit Industries, Inc., Revised Aug. 24, 2004, 1 page.
"Windows Live Messenger—Overview," http://get.live.com/messenger/overview, copyright 2007 Microsoft Corp., printed Nov. 28, 2007, 1 page.
Ricca-Smith, "Science & Technology: Wired for sound and Video," Independent (UK) Ltd., Jan. 14, 2004, 4 pages.
Manes, S., "Wired Jukeboxes," Forbes, Dec. 10, 2001, 4 pages.
Frodigh, M., et al., "Wireless Ad Hoc Networking—The Art of Networking Without a Network," Ericsson Review No. 4, 2000, 16 pages.
Lakhani, Amit, "Wireless Application Protocol (WAP) and I-Mode: An insight," Stevens Institute of Technology, Apr. 7, 2001, 10 pages.
Bard, "Wireless Convergence of PC and Consumer Electronics in the e-Home," Connected and Extended PC Lab, Intel. Corp., Intel Technology Journal Q2, 2001, 11 pages.
"Wireless LAN Networking—Whitepaper," U.S. Robotics, IEEE Computer Society (2009) 12 pages.
Hartwig, Stephan, "Wireless Microservers," Pervasivie Computing, IEEE, 2002, 9 pages.
"WLANAccessPointDevice:1 Device Template Version 1.01," For UPnP Version 1.0, Standardized DCP, Oct. 17, 2003, 15 pages.
"WLANConfiguration:1, Service Template Version 1.01," For UPnP Version 1.0, Standardized DCP, Oct. 17, 2003, 71 pages.
"World's First Standalone Internet Radio Unveiled by Kerbango," PR Newswire, Indian Wells, California, DEMO 2000, Feb. 7, 2000, 4 pages.
"World-Wide Internet Radio: Internet Audio Mini Hi-Fi System," FW-I 1000, Jun. 2001, Royal Philips Electronics N.V., 2 pages.
"www.com and Kerbango, Inc. Joint Forces to Take Internet Radio Beyond the Computer," Los Angeles, May 22, 2000, 3 pages.
"Xantech IR-DC4 (IR/RS232 Interface Module) Installation Instructions," Xantech, Nov. 16, 1998, 4 pages.
"XHTML-Print Photo Templates for UPnP PrintEnhanced:1," For UPnP Version 1.0, Design Complete-Version 1.0, May 4, 2005, 79 pages.
"XHTML-Print/CSS Print Profile Guidelines for PrintEnhanced:1," For UPnP Version 1.0, Design Complete Version 1.0, May 4, 2005, 55 pages.
"Yahoo! Messenger," http://messenger.yahoo.com/webmessengerpromo.php, copyright 2007 Yahoo! Inc., printed Oct. 26, 2007, 1 page.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo! Personals," http://personals.yahoo.com/us/homepage/splash, copyright 2008 Yahoo! Inc., printed Jan. 16, 2008, 2 pages.
"Zen Portable Media Center User's Guide," Creative Technology Ltd., Jul. 2004, 52 pages.
"Zoned Audio/Video Z Series," Elan Home Systems, Copyright 2003, 8 pages.
"Zune," http://www.zune.net/en-US/, copyright 2008 Microsoft Corporation, printed Jan. 16, 2008, 1 page.

\* cited by examiner

METHOD AND DEVICE FOR SHARING A PLAYLIST AT A DEDICATED MEDIA PLAYER DEVICE

RELATED APPLICATIONS

This patent application is a continuation of co-pending U.S. patent application Ser. No. 13/893,599, filed May 14, 2013, entitled, "SYSTEM AND METHOD FOR SHARING PLAYLISTS," which is a continuation of co-pending U.S. patent application Ser. No. 13/555,557, filed Jul. 23, 2012, entitled, "SYSTEM AND METHOD FOR SHARING PLAYLISTS," which is a continuation of U.S. patent application Ser. No. 12/114,286, filed May 2, 2008, entitled "SYSTEM AND METHOD FOR SHARING PLAYLISTS," now U.S. Pat. No. 8,230,099, which is a divisional of U.S. patent application Ser. No. 10/840,110, filed May 5, 2004, entitled "METHOD AND DEVICE FOR OBTAINING A PLAYLIST BASED ON USER PROFILE MATCHING," now U.S. Pat. No. 8,028,038, each of which is hereby incorporated herein by reference in its entirety. This patent application is also related to U.S. patent application Ser. No. 10/840,104, filed May 5, 2004, entitled "HYBRID SET-TOP BOX FOR DIGITAL ENTERTAINMENT NETWORK," now abandoned; U.S. patent application Ser. No. 10/840,109, filed May 5, 2004, entitled "METHOD AND SYSTEM FOR EMPLOYING A FIRST DEVICE TO DIRECT A NETWORKED AUDIO DEVICE TO OBTAIN A MEDIA ITEM," now U.S. Pat. No. 8,028,323; U.S. patent application Ser. No. 13/207,113, filed Aug. 10, 2011, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST," now U.S. Pat. No. 8,214,873; U.S. patent application Ser. No. 13/539,923, filed Jul. 2, 2012, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST;" U.S. patent application Ser. No. 10/840,108, filed May 5, 2004, entitled "DEVICE DISCOVERY FOR DIGITAL ENTERTAINMENT NETWORK;" U.S. patent application Ser. No. 12/114,273, filed May 2, 2008, entitled "SYSTEM AND METHOD FOR SHARING PLAYLISTS," now abandoned, which is a divisional of the above-referenced U.S. patent application Ser. No. 10/840,110; and U.S. patent application Ser. No. 12/019,015, filed Jan. 24, 2008, entitled "DEVICE DISCOVERY FOR DIGITAL ENTERTAINMENT NETWORK," which is a divisional of the above-referenced U.S. patent application Ser. No. 10/840,108, each of which is hereby incorporated by reference in its entirety.

FIELD

The present invention relates generally to the sharing of playlists. The present invention relates more particularly to a system and method for sharing playlists wherein a dedicated media player is configured to receive, store, and display playlists and to play selections from playlists.

BACKGROUND

Playlists for music and movies are well known. A playlist is a list of a user's favorite selections. Popular personal computer (PC) media playing programs, such as Windows Media Player (a trademark of Microsoft Corporation), offer the capability for a user to compile a playlist. The user may subsequently select items to be played from the playlist and the media playing program then plays the selected items. The use of such a playlist simplifies the selection process and thus makes listening to music or viewing movies easier and more enjoyable.

Typically, such selection is accomplished by viewing a playlist within the media playing program and by designating which selection is to be played. The selection to be played may be designated by clicking on it with a mouse, for example.

Playlists also facilitate the playing of a plurality of selections in a particular order. That is, the playlist may be compiled in an order in which the playing of selections therefrom is desired. The selections may then be automatically played sequentially from the playlist. Typically, selections may also be played randomly from a playlist.

Playlists are typically compiled by reviewing a list of selections available for play and then choosing those selections that the user would like to have on the playlist. Thus, a user may review songs that are stored on a personal computer's hard drive and compile a playlist therefrom, for example.

The playlist may subsequently be edited or updated as new selections become available and/or the user's preferences change. Thus, a user's playlist may reflect a group of selections that was compiled over an extended length of time, such as several years.

The sharing of playlists is also known. Popular file sharing programs, such as Kazaa (a trademark of Sharman Networks), facilitate the sharing of playlists. Using such systems, it is possible for a user to download a list of songs or movies that another individual has compiled. This list may then be used to make or modify a playlist for the user.

Although such playlists and playlist sharing systems have proven generally suitable for their intended purposes, they possess inherent deficiencies, which detract from their overall effectiveness and desirability. For example, according to contemporary methodology, playlists are only communicated to and used with general purpose computers, such as IBM compatible personal computers (PCs) and Apple computers.

Further, there is no contemporary system for easily identifying people who have similar interest, such that their playlist can be downloaded. Rather, according to contemporary methodology, playlists are obtained by searching on keywords, such as the titles of selections contained within the playlists. However, the mere fact that the person's playlist has a particular selection in it does not necessarily mean that the playlist contains other selections that a user may enjoy.

As such, although the prior art has recognized, to a limited extent, the problems of finding and using playlists, the proposed solutions have, to date, been ineffective in providing a satisfactory remedy. Therefore, it is desirable to provide a system and method for sharing playlists, wherein the playlists are communicated to, stored in, and displayed upon player devices other than general purpose computers. It is also desirable to provide a method for identifying playlists that are likely to contain selections that will be enjoyed by a user.

SUMMARY

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. More particularly, according to one aspect the present invention comprises a system for sharing playlists, wherein the system comprises a dedicated media player that is configured to receive a playlist and to display the playlist. Selections from the playlist may thus be chosen and played, as desired.

As used herein, a dedicated media player is defined as a media player other than a general purpose computer. Further details on the use of this term and examples of dedicated media players are provided below.

According to another aspect, the present invention comprises a system for sharing playlists, wherein the system comprises a network and a player device. The player device typically comprises either a dedicated media player or a remote control for a dedicated media player.

The player device is in communication with the network and the player device is configured to receive a playlist, store the playlist, display the playlist, and play a selection from the playlist.

The network may comprise any desired type of network. Preferably, the network comprises a wide area network (WAN), such as the Internet. However, the network may alternatively comprise a local area network (LAN).

Player devices include music players, video players, and remote controls for music players and video players. More specific examples of player devices include MP3 players, cellular telephones, set top boxes, a stereos, televisions, car stereos, video monitors, and video storage player devices, as well as remote controls for any of these devices. One example of a video storage player device is TiVo (a trademark of TiVo, Inc.).

The player device may be a portable player device that is configured to receive streaming audio. The player device may also be a non-portable player device that is configured to receive streaming audio and/or a remote control therefor.

The player device may comprise a network adapter, such as an Ethernet card, to facilitate communication with a network. The player device may comprise either a wired or wireless network adapter. Examples of wireless network adapters include those that comply with the Bluetooth (a trademark of Bluetooth SIG, Inc.) standard and those that comply with the WiFi (a trademark of the WiFi Alliance) standard.

The player device preferably comprises an LCD display for displaying the playlist. However, any other suitable type of display may similarly be utilized.

The player device is preferably configured to facilitate searching for playlists. That is, the player device upon which the playlists are stored and displayed is preferably also capable of locating, requesting and retrieving playlists, preferably by merely pushing a button.

Alternatively, playlists may be located and requested via the use of a general purpose computer or the like. Playlists do not have to be requested by the same device that receives the playlist. For example, a general purpose computer may be used to request playlists that are then communicated from other general purpose computers or other dedicated media players to the user's player device.

According to one aspect, the present invention comprises a server upon which a plurality of playlists is stored and the player device is configured to receive playlists from the server. Thus, the player device may participate in the network as a client according to a client/server model of the network.

According to another aspect, the present invention does not include a server. Rather, the present invention comprises a plurality of other player devices and/or general purpose computers upon which a plurality of playlists are stored and the user's player device is configured to receive playlists from the other player devices and/or general purpose computers. Thus, the user's player device may participate in the network as a peer according to a peer-to-peer model of the network.

Preferably, the player device is configured to store a plurality of different playlists. Thus, the user may select a particular playlist according to the user's location, whom the user is with, the type of player device the selection is to be played upon, or the preference of the user based upon any objective or subjective criteria or merely based upon a whim.

According to another aspect, the present invention comprises a player device defined by a dedicated media player and/or a remote control for the media player, wherein the player device comprises a receiving circuit for receiving playlists and a display for displaying the playlists.

According to another aspect, the present invention comprises a server within which is stored a plurality of playlists. The server is configured to communicate the playlist to a player device that is not a general purpose computer.

According to another aspect, the present invention comprises a method for sharing playlists, wherein the method comprises communicating a playlist to a player device comprising a dedicated media player and/or a remote control for the dedicated media player.

According to another aspect, the present invention comprises a method for sharing playlists, wherein the method comprises communicating a playlist to a player device that is not a general purpose computer.

Preferably, the method comprises defining a user profile for a recipient of the playlist and matching that user profile to a user profile of another person, wherein the communicated playlist is the playlist of the other person.

The profile preferably includes the type of music listened to, at least one artist, at least one selection, at least one instrument, at least one record company, a region, a country, a state, a city, a school, and/or an ethnicity. Thus, a user may enhance the likelihood of finding a playlist that contains selections enjoyed by another person living in the same city as the user and having the same ethnicity, for example.

According to another aspect, the present invention comprises a method of defining a playlist, wherein the method comprises defining a user profile and the user profile is used to determine selections that may be enjoyed by a user.

The user profile is preferably compared to user profiles of others to determine a match. Then, a playlist of the other person for which a match was determined is communicated to the user and used to at least partially define a playlist for the user.

Optionally, the user profile is used to define a statistical aggregate of other users and the playlist is determined by the statistical aggregate. Thus, the playlist represent an average of the selections enjoyed by a group of other people.

Optionally, the user profile comprises a list of selections enjoyed by the user and a frequency of which these selections are played. For example, the user profile may comprise a list of selections enjoyed by the user and a rating of the selections by the user.

The method optionally comprises defining a period of time and using the period of time to determine which selections were popular then. The playlist comprises at least some of these selections.

As one example, the method further comprises defining a playlist, which comprises at least some selections that were popular during approximately the last week. As a further example, the method further comprises defining a playlist, which comprises at least some selections that were popular during approximately the last month. As yet a further example, the method further comprises defining a playlist, which comprises at least some selections that were popular during approximately the last year.

Thus, a user may enhance the likelihood of finding a playlist that contains selections enjoyed by another person, wherein the selections were released within the last month, for example.

The playlist may optionally be edited to add or remove selections therefrom.

The user's playlist may optionally be updated by adding selections that have been added to the playlist of another. Similarly, the user's playlist may optionally be updated by removing selections that have been removed from the playlist of another. Such updating may optionally be performed automatically.

Optionally, selections may automatically be added to a playlist when those selections are played in excess of a predetermined rate by the player. Similarly, selections may automatically be deleted from a playlist when those selections are played less than a predetermined rate by the player.

Optionally, one or more selections on a playlist may be designated as private. Any selections on the playlist that are designated as private are not shared with others.

Optionally, any selections on the playlist that are not compatible with the player with which the playlist is associated are removed therefrom. Compatibility may be due to hardware limitations of the player. For example, an MP3 player may not be able to play other formats of audio and may not be able to play the audio tracks of a video selection (such as a movie). Therefore, if such material is included in a playlist, it may automatically be deleted therefrom. Optionally, such deletion may require user approval.

Further, a music player may have limitations that the user desires to be taken into account when a playlist is made or updated. For example, a portable audio player may not be able to adequately reproduce bass sounds. Thus, a user may prefer that a playlist for that device not contain selections for which good base reproduction is considered to be desirable. Therefore, if such material is initially included in a playlist, it may automatically be deleted therefrom. Optionally, such deletion may require user approval.

Further, the present invention may be configured so as to remove selections from a playlist that are not considered by the user to be compatible with the location. That is, some selections may not play well do to ambient acoustics. Further, some selections may not be appropriate for a given location. For example, selections that contain material that is not considered by the user to be suitable for minors may be omitted from a player that is located in a family area.

Either individual selections or categories of selections may be removed from a playlist in the above described manner. Thus, an entire genre may be removed from a playlist, if desired.

Optionally, one or more selections on a playlist may be designated as preferred, so as to indicate that the selections are particularly enjoyable for the user. Indeed, a user's playlist may contain only those selections that have been designated as preferred on the playlists of others.

According to the present invention, playlists may be made and used with a variety of different types of media players. For example, playlists comprising audio selections such as music, speeches, comedy routines, and the like may be made and used with audio players. Similarly, playlists comprising movies, filmstrips, videos, and the like may be made and used with video players.

Indeed, audio playlist may contain video selections and vice-versa. As those skilled in the art will appreciate, in some instances it may be desirable to the play the audio tracks of a movie on an audio player and it may similarly be desirable to play songs (without any accompanying video) on a video player. For example, it may be desirable to play the soundtrack from a movie on an audio player.

The present invention is not limited to audio and video selection. According to the present invention, playlists of games, software applications, or any other desired items or information might similarly be made and used. For example, lists of nightclubs or restaurants that have been enjoyed by others may be obtained by using profiles according to the present invention.

According to another aspect, the present invention comprises a method for managing media content on a network, wherein the method comprises using information about a user's previous playing to define a playlist and communicating the playlist to a player device other than a general purpose computer with which the playlist can be stored, displayed, and selections made for playing therefrom.

According to another aspect, the present invention comprises a method for defining a playlist, wherein the method comprises finding at least one other person with similar tastes and communicating a list of selections played by the other user to a player device other than a general purpose computer. The playlist may be updated by communicating an updated list of selections played by the other person to the player device.

According to another aspect, the present invention comprises a method for defining a playlist for a user, wherein the method comprises finding at least one other person with similar tastes by matching a profile of the user to a profile of the other person.

According to another aspect, the present invention comprises a data structure comprising a playlist defined by a method comprising communicating the playlist to a player device that is not a general purpose computer.

According to another aspect, the present invention comprises a data structure comprising a playlist defined by a method comprising defining a user profile and using the user profile to determine selections that may be enjoyed by a user.

According to another aspect, the present invention comprises a computer readable media having stored thereon a data structure comprising a playlist defined by a method comprising communicating the playlist to a player device that is not a general purpose computer.

According to another aspect, the present invention comprises a computer readable media having stored thereon a data structure comprising a playlist defined by a method comprising defining a user profile and using the user profile to determine selections that may be enjoyed by a user.

According to another aspect, the present invention comprises a computer readable media having stored thereon a method for defining a playlist, wherein the method comprises communicating the playlist to a player device that is not a general purpose computer.

According to another aspect, the present invention comprises a computer readable media having stored thereon a method for defining a playlist, wherein the method comprises defining a user profile and using the user profile to determine selections that may be enjoyed by a user.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
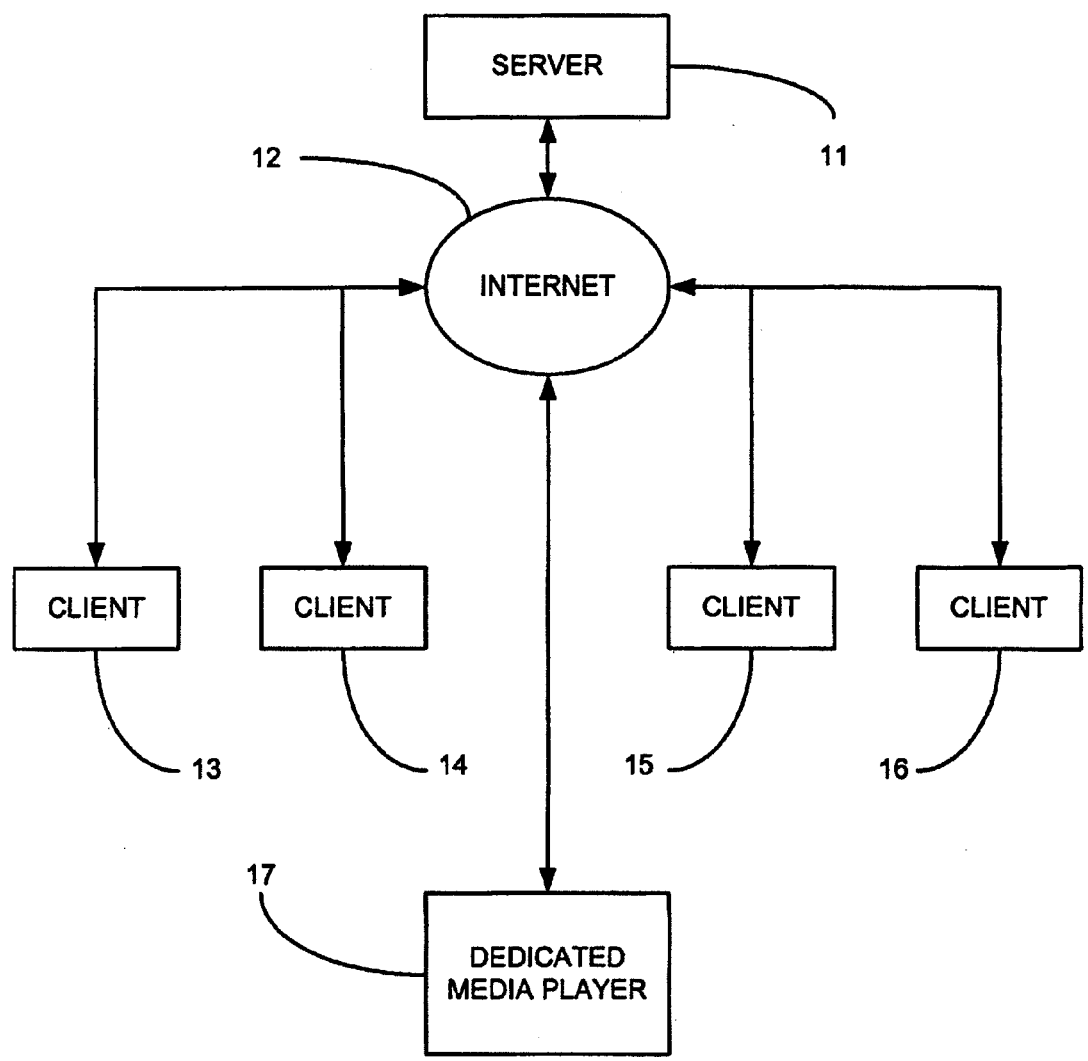
FIG. 1 is a block diagram of an exemplary system for sharing playlists according to the present invention, wherein a server provides playlist to a dedicated media player and wherein the playlists have been obtained from client computers or other devices.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

Although generally discussed herein as being applicable to music and music players, those skilled in the art will appreciate that the system and method for sharing playlists of present invention is likewise applicable to video and video players, as well as games and game players. Indeed, the system and method for sharing playlists of the present invention may find application in a wide variety of information, data, and software arenas. Thus, discussion herein as being applicable to music and music players is by way of example only, and not by way of limitation.

The present invention is illustrated in FIGS. 1-6, which depict presently preferred embodiments thereof. Referring now to FIG. 1, according to one aspect the present invention comprises a server 11 upon which a plurality of playlists from a plurality of different users is stored.

Each client 13-16 may communicate a playlist to the server via a network, such as the Internet 12. The clients 13-16 may be general purpose computers or may be devices other than general purpose computers. The clients 13-16 may be any combination of general purpose computers and devices other than general purpose computers. Thus, the clients 13-16 may be dedicated media players that are network compatible.

For example, the clients 13-16 may be dedicated music players that are configured according to the present invention so as to communicate with the Internet. In this instance, the clients are not general purpose computers. That is, their primary purpose is that of playing music and not of running a wide variety of different types of applications programs, such as is the case with general purpose computers.

As used herein, the term "dedicated" indicates the primary function of a device and the device typically does not perform any other of the functions that a general purpose computer may perform, such as word processing, general data base management and general Internet browsing. However, it is contemplated the a dedicated device may perform some such functions and still remain a dedicated device in the same sense that some cellular telephones facilitate some degree of general purpose computer functionality, such as limited Internet browsing and email, yet they remain primarily telephones and not general purpose computers.

Thus, examples of dedicated media players include music players such as MP3 players, video players such as set top boxes, video recording devices such as TiVo and game players such as X-Box (a trademark of Microsoft Corporation) and PlayStation (a trademark of Sony Computer Equipment, Inc.).

According to one aspect of the present invention, playlists are communicated via the network to a dedicated media player 17 and the dedicated media player 17 is not a general purpose computer. According to another aspect of the present invention, the media player 17 may be a general purpose computer and playlist are obtained by matching user profiles, as discussed in detail below.

After the playlist has been communicated to the dedicated media player 17, the playlist may be displayed thereon and thus used to choose which selection therefrom is to be played.

Figure 2:
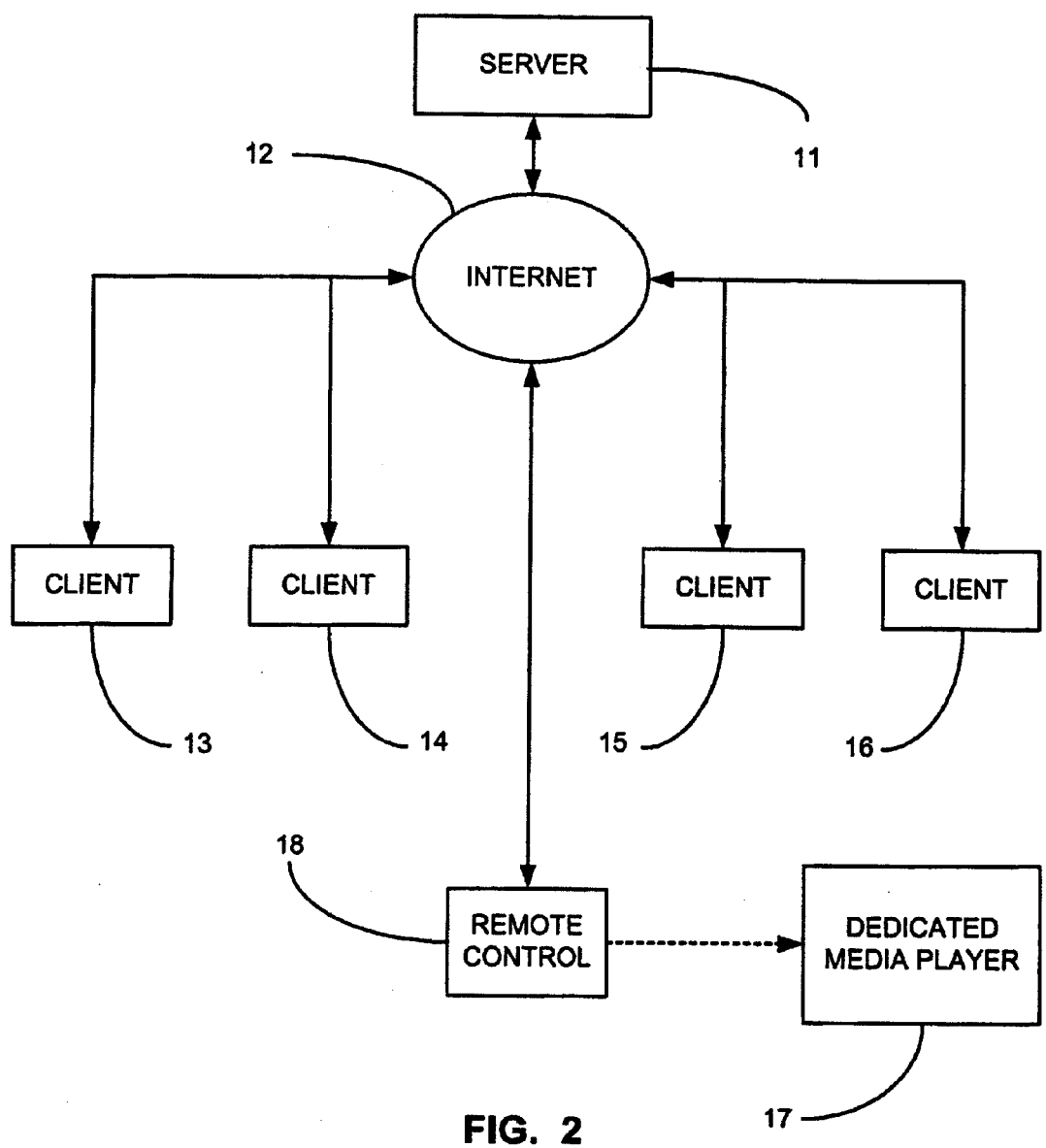
FIG. 2 is a block diagram of another exemplary system for sharing playlists according to the present invention, wherein a server provides playlist to a remote control of a dedicated media player and wherein the playlists have been obtained from client computers or other devices.

Referring now to FIG. 2, rather than communicating a playlist to the dedicated media player 17, the playlist may alternatively be communicated to a remote control 18 for the dedicated media player.

After the playlist has been communicated to the remote control 18, the playlist may be displayed thereon and thus used to choose which selection therefrom is to be played by the dedicated media player 17.

Optionally, playlists that were communicated to the dedicated media player 17 (as shown in FIG. 1) may be further communicated to a remote control therefore. This communication may be from the dedicated media player 17 or from any other source (such as from the server 11 via the Internet 12).

Similarly, playlists that were communicated to the remote control 18 (as shown in FIG. 2) may be further communicated to the dedicated media player 17 associated therewith. This communication may be from the remote control 18 or from any other source (such as from the server 11 via the Internet 12).

Thus, playlists may be stored in, displayed upon, and used to make selections from either the dedicated media player 17, the remote control 18, or both.

Of course, in some instances the dedicated media player 17 will not have a remote control. For example, portable media players, such as MP3 players, will not typically have a remote control. In such instances, the playlist is generally communicated only to the dedicated media player 17 itself.

In any instance, other devices, including both dedicated devices and general purpose computers, may receive additional copies of the playlists.

Figure 3:
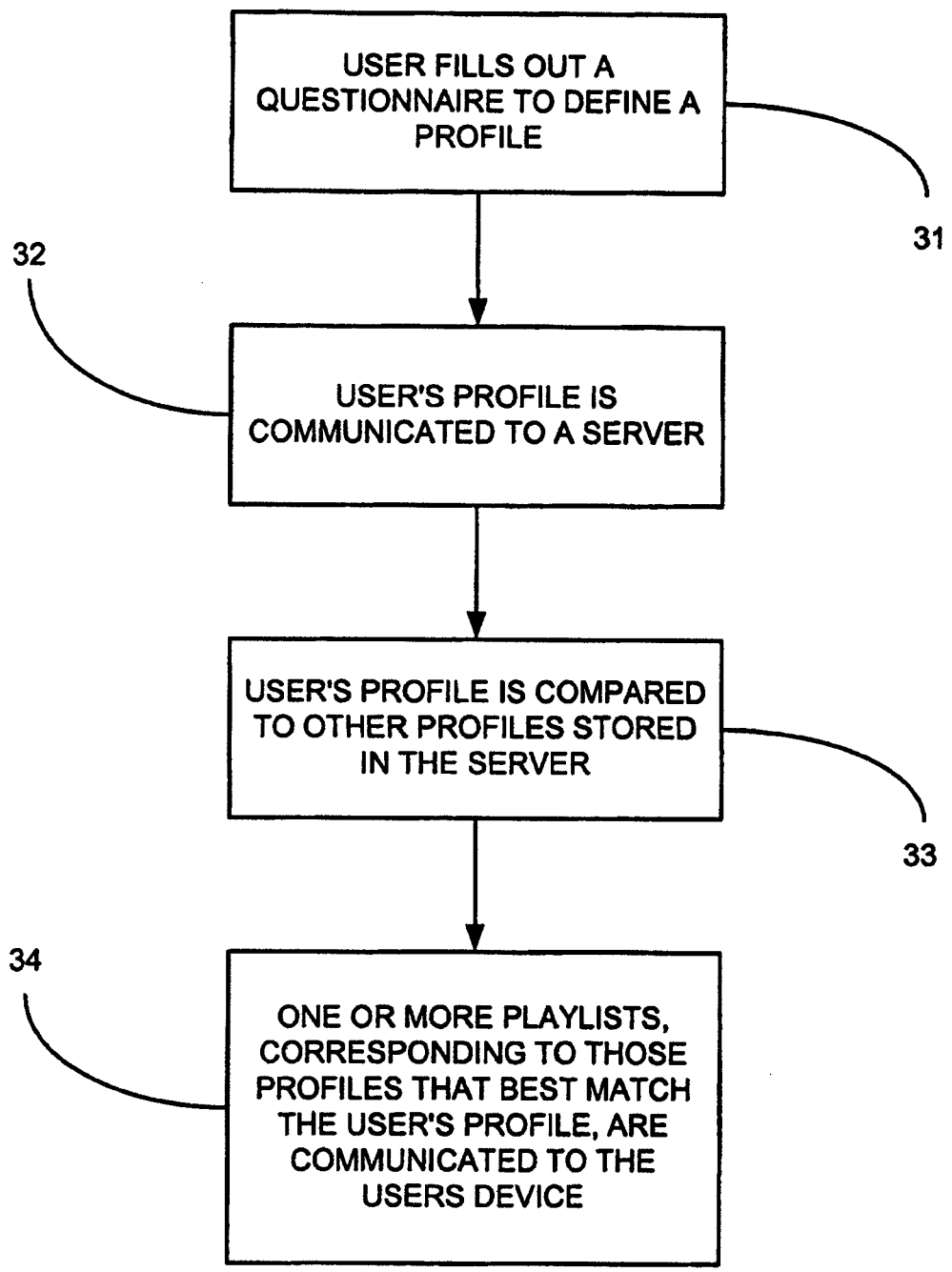
FIG. 3 is a flowchart showing an exemplary method for obtaining playlists, such as a method that may be practiced when using the systems of FIG. 1 or FIG. 2.

Referring now to FIG. 3, a user preferably fills out a questionnaire so as to define a user profile as shown in block 31. The user profile contains information that will facilitate matching of the user to another user having similar tastes and interests, as discussed above.

The user's profile is communicated to a server (such as server 11 of FIGS. 1 and 2), as shown in block 32. At the server, the user's profile is compared to the profiles of other users as shown in block 33. An attempt is made to match the user's profile to the profile of one or more other users, so as to identify other users having similar tastes and interests.

The playlists of one or more other users, whose profiles best match the user's profile, are communicated to the user's device as shown in block 34. Any desired method or algorithm for such matching may be used. For example, each time the responses to two questionnaires match, a number could be added to a score for that particular matching process. The matching processes that result in the highest scores could be considered close enough matches to cause a playlist to be sent. Alternatively, any matching process that result in a score that exceeds a predetermined threshold value may be considered a match.

Optionally, the responses could be weighted such that some responses contribute more to the matching score than other responses. For example, it may be desirable to have matches for selections, artists, or style count more than matches for location or time.

The user's device may be, for example, the dedicated media player 17 of FIGS. 1 and 2 or may alternatively be the remote control 18 for FIG. 2. The playlist may be communicated to both the dedicated media player 17 and the remote control 18, as discussed above.

Both FIGS. 1 and 2 show an exemplary use of the present invention in a client/server network. However, the present invention may also be used in a peer-to-peer network, as discussed below.

Figure 4:
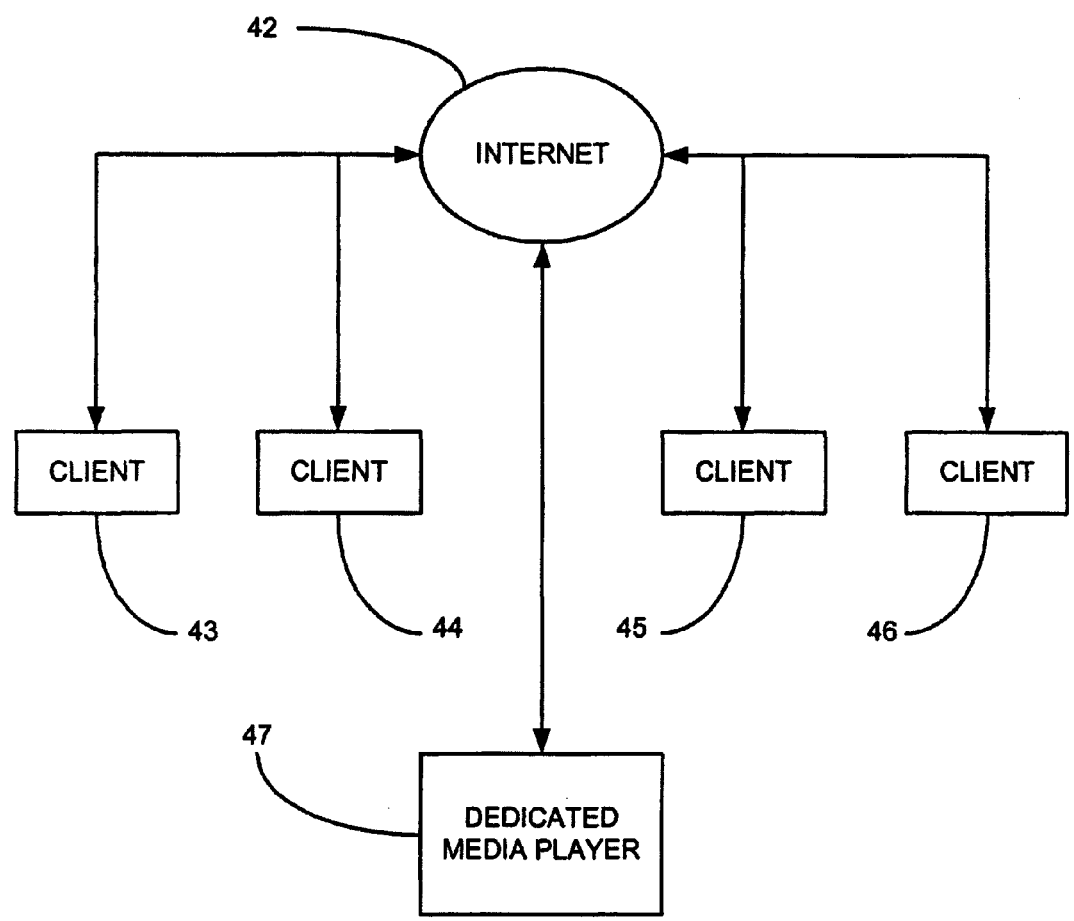
FIG. 4 is a block diagram of another exemplary system for sharing playlists according to the present invention, wherein a peer provides a playlist to a dedicated media player without the use of a server.

Referring now to FIG. 4, a plurality of clients 43-46 communicates via a network, such as the Internet 42, with a dedicated media player 47. As before, the clients 43-46 may be either general purpose computers or devices other than general purpose computers.

Since there is no server in this instance, the dedicated player 47 must communicate with the clients 43-46 on a peer-to-peer basis. For example, the user's profile may be communicated to each of the clients 43-46 and when a match is found, the playlist of the client is communicated back to the user's dedicated media player 47, as shown in FIG. 4.

Alternatively, the dedicated media player 47 may poll each of a plurality of different clients to request their user profiles. The dedicated media player 47 may perform a comparison of the user profiles. Then, the playlists associated with the best matches of the user's profile to the profile of the clients 43-46 are requested and communicated to the dedicated media player.

Figure 5:
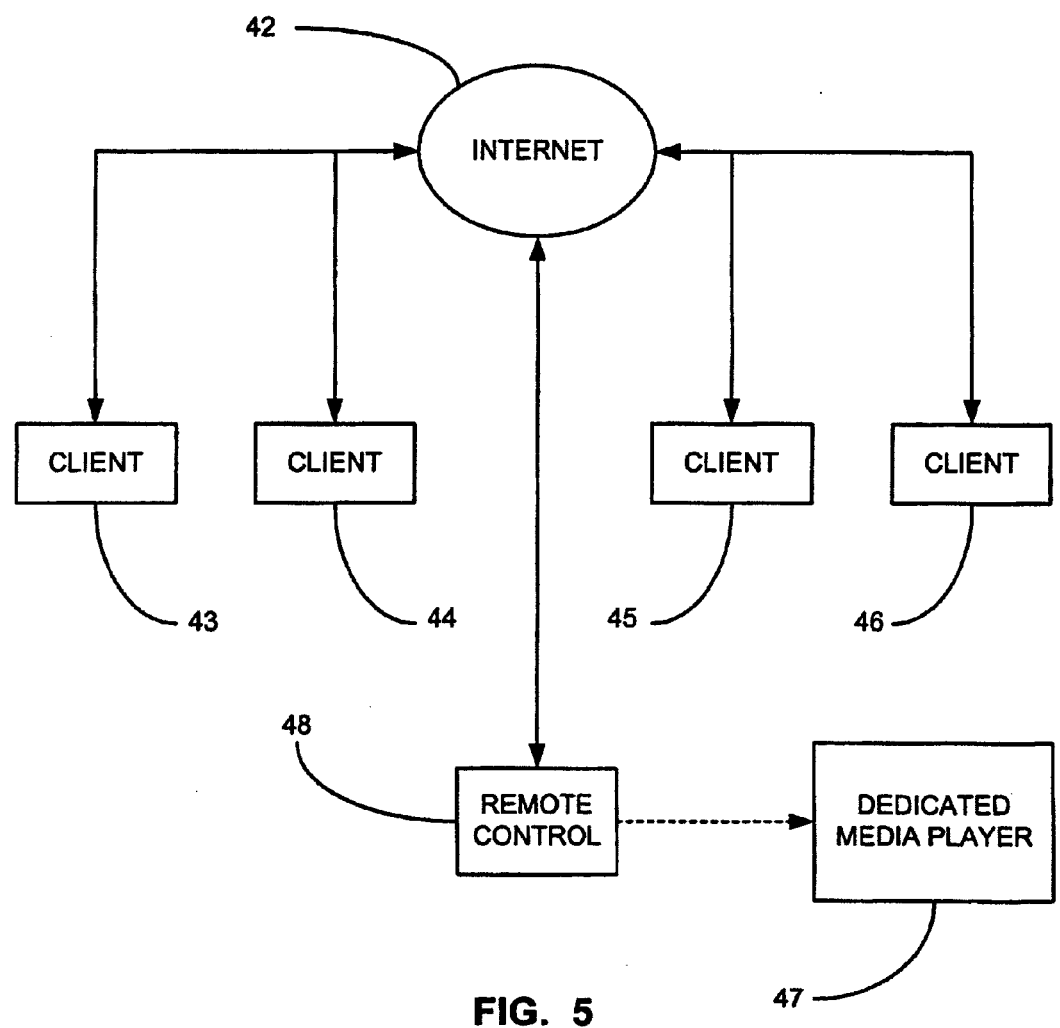
FIG. 5 is a block diagram of another exemplary system for sharing playlists according to the present invention, wherein a peer provides a playlist to a remote control of a dedicated media player without the use of a server.

Referring now to FIG. 5, rather than communicating a playlist to the dedicated media player 47, the playlist may alternatively be communicated to a remote control 48 for the dedicated media player. Thus, the clients 43-46 may communicate their user profiles to the remove control 48, where the comparison is performed and where playlists may be stored and used. As before, playlists may subsequently be forwarded to another device, such as the dedicated media player 47.

After the playlist has been communicated to the remote control 48, the playlist may be displayed thereon and thus used to choose which selection therefrom is to be played.

As before, playlists that were communicated to the dedicated media player 47 (as shown in FIG. 4) may optionally be further communicated to a remote control therefore. This communication may be from the dedicated media player 47 or from any other source (such as from one of the clients 43-46 via the Internet 42).

Similarly, playlists that were communicated to the remote control 48 (as shown in FIG. 5) may be further communicated to the dedicated media player 47 associated therewith. This communication may be from the remote control 48 or from any other source (such as from one of the clients 43-46 via the Internet 12).

Figure 6:
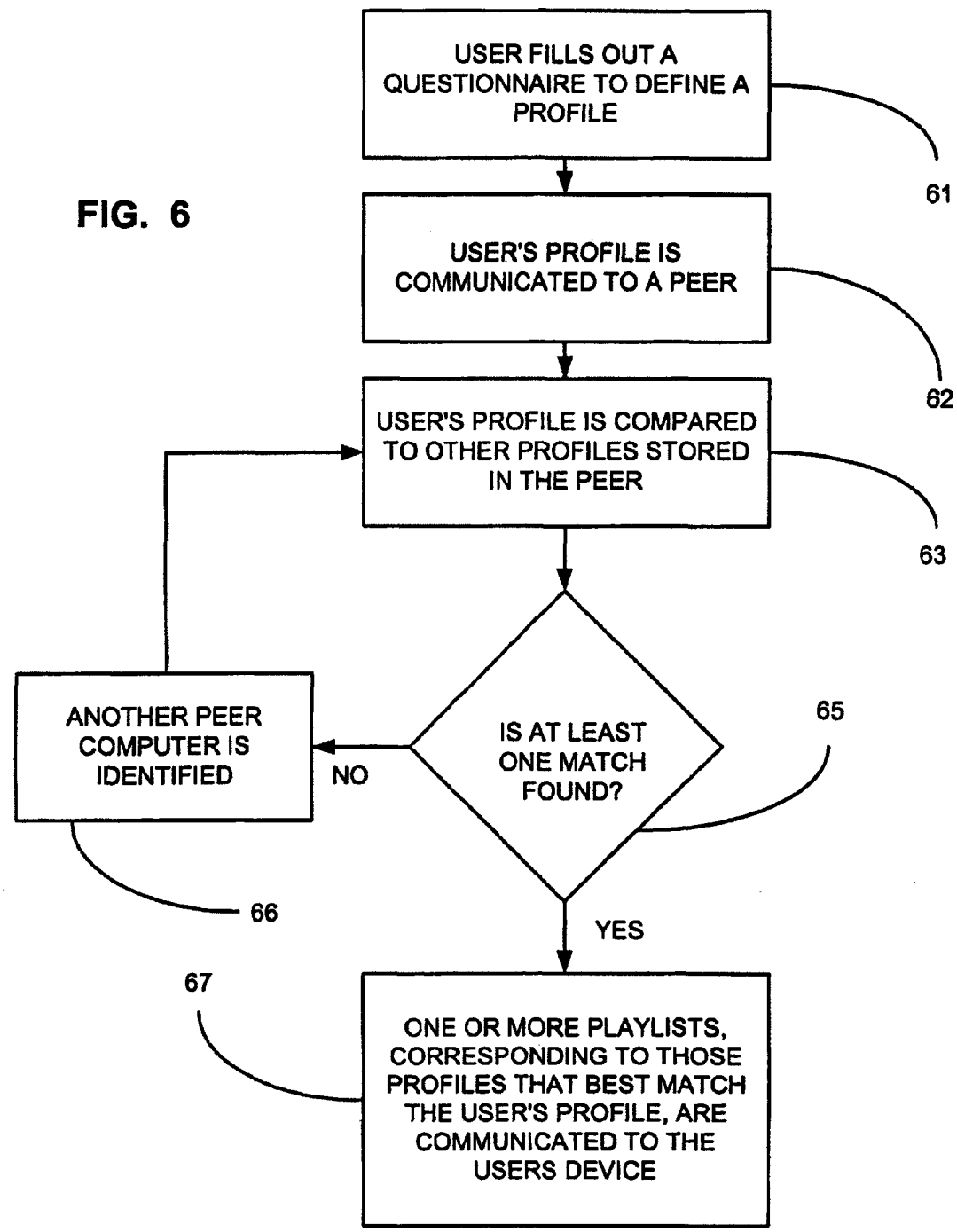
FIG. 6 is a flowchart showing another exemplary method for obtaining playlists, such as a method that may be practiced when using the systems of FIG. 4 or FIG. 5.

Referring now to FIG. 6, one example of how a user's profile may be used to obtain playlists is shown. In a peer-to-peer network, such as those shown in FIGS. 4 and 5, a user again fills out a questionnaire as shown in block 61. However, this time the questionnaire is communicated to a peer as shown in block 62. The user's profile is compared to other profiles stored in the peer, as shown in block 63.

The process is continued until at least one match is found, as shown in block 65. The process may be continued until any desired number of matches are found or until it is determined that further searching is not likely to result in matches.

When it is desirable to continue the searching process, another peer is identified as shown in block 66 and the user's profile is compared to the other profiles as shown in block 63.

Thus, one or more playlists, corresponding to those profiles that best match the user's profile, are communicated to the user's device as shown in block 67.

The present invention provides the ability for non-computer devices to display and play playlists from a central computer running on the Internet. These playlists can be created on one device and shared or sent to another device immediately for playing.

People in the community can be found by comparing listing habits of the community. Once people are found in the community to have similar tastes, playlist can then be shared between the users and then played on their own personal playing devices in real time.

Thus, the present invention provides a system and method for sharing playlists, wherein the playlists are communicated to, stored in, and displayed upon player devices other than general purpose computers. The present invention also provides a method for identifying playlists that are likely to contain selections that will be enjoyed by a user.

It is understood that the exemplary system and method for sharing playlists described herein and shown in the drawings represents only presently preferred embodiments of the invention. Indeed, various modifications and additions may be made to such embodiments Thus, various modifications and additions may be obvious to those skilled in the art and may be implemented to adapt the present invention for use in a variety of different applications.

What is claimed is:

1. A method comprising:
   receiving, at a media player device based on information identifying a user-association to a playlist at a remote playlist source, a playlist from the remote playlist source coupled to the media player device over an Internet network connection, the playlist comprising a plurality of item identifiers identifying a corresponding plurality of items;
   communicating the playlist from the media player device to a wireless handheld remote control, the wireless handheld remote control coupled to the media player device over a LAN connection using the Transmission Control Protocol/Internet Protocol (TCP/IP);
   receiving, from the wireless handheld remote control, at least one item identifier; and
   rendering, by the media player device, at least one item corresponding to the at least one item identifier;
   wherein the media player device, the wireless handheld remote control, and the remote playlist source are all separate devices, the item identifiers comprising the playlist are selected from items having been played during a time duration, and the time duration is chosen from the group consisting of today, a past week, a past month, and a past year.

2. The method of claim 1 wherein the information identifying a user-association to a playlist at a remote playlist source is received at the media player device.

3. The method of claim 2, wherein the information identifying a user-association to a playlist at a remote playlist source is received at the media player device from the wireless handheld remote control.

4. The method of claim 3, wherein the information identifying a user-association to a playlist at a remote playlist source is received at the media player device from a user of the wireless handheld remote control.

5. The method of claim 1, wherein the media player device is a dedicated media player device.

6. The method of claim 5, wherein the dedicated media player is chosen from a group consisting of a cellular phone, a car stereo, a stereo, a music player, a game player, a video player, a set top box, a television, and a digital video recorder.

7. The method of claim 1, wherein the media player includes functionality for operating as at least one of a cellular phone, a car stereo, a stereo, a music player, a game player, a video player, a set top box, a television, and a digital video recorder.

8. The method of claim 1, wherein communicating the playlist from the media player device to a wireless handheld remote control includes communicating with the wireless handheld remote using Wi-Fi.

9. The method of claim 1, wherein the wireless handheld remote control is a cellular phone.

10. The method of claim 1, wherein receiving a playlist from the remote playlist source includes receiving a list referencing at least one of videos and songs.

11. The method of claim 1, wherein receiving a playlist from the remote playlist source includes receiving a computer-generated playlist.

12. The method of claim 11, wherein receiving a playlist from the remote playlist source includes requesting a computer-generated playlist from the remote playlist source.

13. The method of claim 12, wherein requesting a computer-generated playlist from the remote playlist source includes providing with the request user input to be used for generating the computer-generated playlist.

14. The method of claim 12, wherein requesting a computer-generated playlist from the remote playlist source includes providing with the request at least one of information identifying a user and the information identifying the user-association to the playlist at the remote playlist source.

15. The method of claim 13, wherein providing with the request user input to be used for generating the computer-generated playlist includes providing with the request user input to be used for modifying the playlist.

16. The method of claim 12, wherein requesting a computer-generated playlist from the remote playlist source includes requesting a computer-generated playlist to be generated based on a profile of a user.

17. The method of claim 16, wherein the profile of the user is comprised of a play history list of items previously experienced by the user.

18. The method of claim 16 wherein the profile of the user is determined from at least one of factors including type, artist, region, country, state, city, school, and ethnicity.

19. The method of claim 16, wherein requesting a computer-generated playlist from the remote playlist source includes requesting generation of the playlist based on matching the profile of the user to a profile of another user.

20. The method of claim 1, wherein the playlist is a statistical aggregation of playlists.

21. The method of claim 1, wherein the playlist is computer modified.

22. The method of claim 21, wherein the modification is to remove items not available to the user.

23. The method of claim 21, wherein the modification is committed based on confirmation input received from the user.

24. The method of claim 21, wherein the playlist is automatically updated based on contents of other playlists.

25. The method of claim 21, wherein the playlist is computer modified based on a geographic location of the media player device.

26. The method of claim 1, wherein the information identifying a user-association to a playlist at a remote playlist source includes a profile of the user.

27. The method of claim 1, wherein the playlist is a play history list of items previously experienced by the user.

28. The method of claim 1, wherein the playlist is a play history list of items previously experienced by another user.

29. The method of claim 1, wherein the playlist is a list of user favorites.

30. The method of claim 29, wherein the playlist is constructed over a period of several years.

31. The method of claim 1, wherein the playlist is a list of items complied by another user.

32. The method of claim 1, wherein the remote playlist source is another media player device.

33. The method of claim 1, wherein content identified by the playlist is received from a content server, the content server being separate from the remote playlist source, the media player device, and the wireless handheld remote control.

34. The method of claim 1, wherein the playlist is determined based on a geographic location of the media player device.

35. The method of claim 1, wherein the item identifiers comprising the playlist are selected from those items having been played in excess of a predetermined rate.

36. A media player device comprising:
a communication interface adapted to communicatively couple the media player device to a remote playlist source over an Internet network connection and a wireless handheld remote control over a LAN connection, the LAN connection using the Transmission Control Protocol/Internet Protocol (TCP/IP); and
a control system associated with the communication interface and adapted to:
receive, at the media player device based on information identifying a user-association to a playlist at the remote playlist source, a playlist from the remote playlist source, the playlist comprising a plurality of item identifiers identifying a corresponding plurality of items;
communicate the playlist from the media player device to the wireless handheld remote control;
receive, from the wireless handheld remote control, at least one item identifier; and
render, by the media player device, at least one item corresponding to the at least one item identifier;
wherein the media player device, the wireless handheld remote control, and the remote playlist source are all separate devices, the item identifiers comprising the playlist are selected from items having been played during a time duration, and the time duration is chosen from the group consisting of today, a past week, a past month, and a past year.

37. The media player device of claim 36, wherein the information identifying a user-association to a playlist at a remote playlist source is received at the media player device.

38. The media player device of claim 36, wherein the information identifying a user-association to a playlist at a remote playlist source is received at the media player device from the wireless handheld remote control.

39. The media player device of claim 36, wherein the information identifying a user-association to a playlist at a remote playlist source is received at the media player device from a user of the wireless handheld remote control.

40. The media player device of claim 36, wherein the media player device is a dedicated media player device.

41. The media player device of claim 40, wherein the dedicated media player is chosen from a group consisting of a cellular phone, a car stereo, a stereo, a music player, a game player, a video player, a set top box, a television, and a digital video recorder.

42. The media player device of claim 36, wherein the media player includes functionality for operating as at least one of a cellular phone, a car stereo, a stereo, a music player, a game player, a video player, a set top box, a television, and a digital video recorder.

43. The media player device of claim 36, wherein the communication interface is adapted to communicatively couple the media player device and the wireless handheld remote control using Wi-Fi.

44. The media player device of claim 36, wherein the wireless handheld remote control is a cellular phone.

45. The media player device of claim 36, wherein the playlist source is a list referencing media items including at least one of videos and songs.

46. The media player device of claim 36, wherein the control system and the communication interface are adapted to receive a computer-generated playlist.

47. The media player device of claim 46, wherein the control system and the communication interface are adapted to request a computer-generated playlist from the remote playlist source.

48. The media player device of claim 47, wherein the control system and the communication interface are adapted to provide with the request user input to be used for generating the computer-generated playlist.

49. The media player device of claim 47, wherein the control system and the communication interface are adapted to provide with the request at least one of information identifying a user and the information identifying the user-association to the playlist at the remote playlist source.

50. The media player device of claim 49, wherein the control system and the communication interface are adapted to provide with the request user input to be used for modifying the playlist.

51. The media player device of claim 47, wherein the control system and the communication interface are adapted to requesting a computer-generated playlist to be generated based on a profile of a user.

52. The media player device of claim 51, wherein the profile of the user is comprised of a play history list of items previously experienced by the user.

53. The media player device of claim 51 wherein the profile is determined from a group of factors comprising type, artist, region, country, state, city, school, and ethnicity.

54. The media player device of claim 51, wherein the control system and the communication interface are adapted to request generation of the playlist based on matching the profile of the user to a profile of another user.

55. The media player device of claim 36, wherein the playlist is a statistical aggregation of playlists.

56. The media player device of claim 36, wherein the playlist is computer modified.

57. The media player device of claim 56, wherein the modification is to remove items not available to the user.

58. The media player device of claim 56, wherein a modification is committed based on confirmation input received from the user.

59. The media player device of claim 56, wherein the playlist is automatically updated based on contents of other playlists.

60. The media player device of claim 56, wherein the playlist is computer modified based on a geographic location of the media player device.

61. The media player device of claim 36, wherein the information identifying a user-association to a playlist at a remote playlist source includes a profile of the user.

62. The media player device of claim 36, wherein the playlist is a play history list of items previously experienced by the user.

63. The media player device of claim 36, wherein the playlist is a play history list of items previously experienced by another user.

64. The media player device of claim 36, wherein the playlist is a list of user favorites.

65. The media player device of claim 64, wherein the playlist is constructed over a period of several years.

66. The media player device of claim 36, wherein the playlist is a list of items complied by another user.

67. The media player device of claim 36, wherein the remote playlist source is another media player device.

68. The media player device of claim 36, wherein the control system and the communication interface are adapted to receive content identified by the playlist from a content server, the content server being separate from the remote playlist source, the media player device, and the wireless handheld remote control.

69. The media player device of claim 36, wherein the playlist is determined based on a geographic location of the media player device.

70. The media player device of claim 36, wherein the item identifiers comprising the playlist are selected from those items having been played in excess of a predetermined rate.

* * * * *